(12) United States Patent
Sarikhani

(10) Patent No.: US 11,901,845 B2
(45) Date of Patent: Feb. 13, 2024

(54) INTEGRATED ASSEMBLY OF AN ELECTRIC WINDING EXCHANGER SYSTEM AND A MULTIPHASE ELECTRIC MOTOR

(71) Applicant: Ali Sarikhani, Mission Viejo, CA (US)

(72) Inventor: Ali Sarikhani, Mission Viejo, CA (US)

( * ) Notice: Subject to any disclaimer, the term of this patent is extended or adjusted under 35 U.S.C. 154(b) by 10 days.

(21) Appl. No.: 17/882,988

(22) Filed: Aug. 8, 2022

(65) Prior Publication Data

US 2023/0283213 A1 Sep. 7, 2023

Related U.S. Application Data

(60) Provisional application No. 63/316,225, filed on Mar. 3, 2022.

(51) Int. Cl.
*H02P 5/00* (2016.01)
*H02P 25/18* (2006.01)
*H02P 6/182* (2016.01)

(52) U.S. Cl.
CPC ............ *H02P 25/182* (2013.01); *H02P 6/182* (2013.01)

(58) Field of Classification Search
CPC ........ H02P 25/182; H02P 6/182; H02P 25/18; H02P 2201/09
See application file for complete search history.

(56) References Cited

U.S. PATENT DOCUMENTS

| | | |
|---|---|---|
| 11,088,642 B2 | 8/2021 | Sarikhani |
| 2004/0131342 A1 | 7/2004 | Masino |
| 2005/0206263 A1 | 9/2005 | Cai et al. |
| 2007/0018598 A1 | 1/2007 | Nichols |
| 2009/0128071 A1 | 5/2009 | Brown |

FOREIGN PATENT DOCUMENTS

| | | | |
|---|---|---|---|
| CN | 216770276 U | * | 6/2022 |
| EP | 0123807 B1 | | 10/1988 |

* cited by examiner

*Primary Examiner* — Karen Masih

(57) ABSTRACT

An integrated assembly of an electric winding exchanger system and a multiphase electric motor comprises a housing, the multiphase electric motor, and the electric winding exchanger system. Further, the housing comprises a first housing portion, a second housing portion, and a partition. Further, the first housing portion comprises a first interior space and the second housing portion comprises a second interior space. Further, the first housing portion houses the multiphase electric motor and the second housing portion houses the electric winding exchanger system. Further, the electric winding exchanger system comprises a back electromotive force (EMF) boosting circuit comprising switches and bus bars. Further, the partition comprises openings. Further, leads of coils of the multiphase electric motor enters the second interior space through a first opening of the openings for connecting terminals of the leads to the bus bars.

20 Claims, 36 Drawing Sheets

INTEGRATED ASSEMBLY OF AN ELECTRIC WINDING EXCHANGER SYSTEM AND A MULTIPHASE ELECTRIC MOTOR

FIELD OF THE INVENTION

Generally, the present disclosure relates to the field of an electrical generator or motor structure. More specifically, the present disclosure relates to an integrated assembly of an electric winding exchanger system and a multiphase electric motor.

BACKGROUND OF THE INVENTION

Multi-phase electric motor-controllers-battery systems are widely used in gasoline vehicles, electric vehicles, and hybrid electric vehicles. These multi-phase motor-controller-battery systems, such as 3-phase or 5-phase or 6-phase or 9-phase systems, have fully controllable torque and speed on the shaft of motors for a wide operation range but with limited boundary. The first basic boundary of multi-phase motor-controller-battery is the boundary of maximum electrical motor torque for specified duration (for example: lower than 10 seconds) from low to medium speed which is mainly due to the limits of controller and battery current rated values for specified duration and to the limit of motor maximum torque for specified volume. The second basic boundary of multi-phase motor-controller-battery is maximum electrical motor speed for any duration which is mainly due to the limit of battery voltage value.

Thus, it is very desirable to exceed beyond above mentioned torque and speed boundaries without changing the motor volume, the current of controller and the voltage of the battery. This present invention provides an electric winding exchanger system to overcome the limits and go beyond the boundaries. The electric winding exchanger is designed as a new hardware-software device for use in electric drive modules of electric vehicles, plug in hybrid electric vehicles, and hybrid electric vehicles. The electric winding exchanger system is physically located between a multi-phase electric motor and a motor control unit. The electric winding exchanger system is a controllable device from vehicle or controller. Controlling and exchanging to the optimal configuration of electric winding of motor is the method for overcoming the limits and going above torque and speed boundaries. Other desirable features and characteristics of the present disclosure will become apparent from the subsequent detailed description and the appended claims, taken in conjunction with the accompanying drawings and this background discussion.

Multi-phase Induction motors (IM), Permanent magnet synchronous motors (PMSM), Synchronous reluctance motors (SRM) are widely used in motion, propulsion, and electrical powertrains. These multi-phase motors are electrically connected to the multi-phase inverters and closed loop controllers to provide controllability over torque and speed on the shaft for a wide operation range. However, these controllers provide controllability over a very narrow range of torque and speed.

Therefore, there is a need for an integrated assembly of an electric winding exchanger system and a multiphase electric motor that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is an integrated assembly of an electric winding exchanger system and a multiphase electric motor, in accordance with some embodiments. Accordingly, the integrated assembly may include a housing, the multiphase electric motor, and the electric winding exchanger system. Further, the housing may include a first housing portion, a second housing portion, and a partition. Further, the first housing portion may include a first interior space and the second housing portion may include a second interior space. Further, the partition separates the first interior space from the second interior space. Further, the first housing portion may be configured for housing the multiphase electric motor in the first interior space. Further, the second housing portion may be configured for housing the electric winding exchanger system in the second interior space. Further, the multiphase electric motor may include N number of neutrals. Further, the electric winding exchanger system may include a back electromotive force (EMF) boosting circuit. Further, the back EMF boosting circuit may include a plurality of switches and a plurality of bus bars. Further, a state of each of the plurality of switches may be transitionable between an on state and an off state. Further, the plurality of bus bars may be configured for connecting the plurality of switches. Further, the partition may include a plurality of openings for facilitating integrating the multiphase electric motor with the electric winding exchanger system. Further, a plurality of leads of a plurality of coils of the multiphase electric motor enters the second interior space through a first opening of the plurality of openings for connecting a plurality of terminals of the plurality of leads of the plurality of coils to the plurality of bus bars.

Further disclosed herein is an integrated assembly of an electric winding exchanger system and a multiphase electric motor, in accordance with some embodiments. Accordingly, the integrated assembly may include a housing, the multiphase electric motor, the electric winding exchanger system, and a plurality of sensors. Further, the housing may include a first housing portion, a second housing portion, and a partition. Further, the first housing portion may include a first interior space and the second housing portion may include a second interior space. Further, the partition separates the first interior space from the second interior space. Further, the first housing portion may be configured for housing the multiphase electric motor in the first interior space. Further, the second housing portion may be configured for housing the electric winding exchanger system in the second interior space. Further, the multiphase electric motor may include N number of neutrals. Further, the electric winding exchanger system may include a back electromotive force (EMF) boosting circuit. Further, the back EMF boosting circuit may include a plurality of switches and a plurality of bus bars. Further, a state of each of the plurality of switches may be transitionable between an on state and an off state. Further, the plurality of bus bars may be configured for connecting the plurality of switches. Further, the partition may include a plurality of openings for facilitating integrating the multiphase electric motor with the electric winding exchanger system. Further, a plurality of leads of a plurality of coils of the multiphase electric motor enters the second interior space through a first opening of the plurality of openings for connecting a plurality of terminals of the plurality of leads of the plurality of coils to the plurality of bus bars. Further, the plurality of sensors may be disposed in the first interior space. Further, a plurality of leads of the plurality of sensors enters the second interior space through a second opening of the plurality of openings for connecting a plurality of terminals of the plurality of leads to at least one low-voltage terminal mounted on the second housing portion.

Further, disclosed herein is an integrated assembly of an electric winding exchanger system and a multiphase electric motor, in accordance with some embodiments. Accordingly, the integrated assembly may include a housing, the multiphase electric motor, the electric winding exchanger system, and a plurality of sensors. Further, the housing may include a first housing portion, a second housing portion, and a partition. Further, the first housing portion may include a first interior space and the second housing portion may include a second interior space. Further, the partition separates the first interior space from the second interior space. Further, the first housing portion may be configured for housing the multiphase electric motor in the first interior space. Further, the second housing portion may be configured for housing the electric winding exchanger system in the second interior space. Further, the multiphase electric motor may include N number of neutrals. Further, the electric winding exchanger system may include a back electromotive force (EMF) boosting circuit. Further, the back EMF boosting circuit may include a plurality of switches and a plurality of bus bars. Further, a state of each of the plurality of switches may be transitionable between an on state and an off state. Further, the plurality of bus bars may be configured for connecting the plurality of switches. Further, the partition may include a plurality of openings for facilitating integrating the multiphase electric motor with the electric winding exchanger system. Further, a plurality of leads of a plurality of coils of the multiphase electric motor enters the second interior space through a first opening of the plurality of openings for connecting a plurality of terminals of the plurality of leads of the plurality of coils to the plurality of bus bars. Further, the second housing portion may include at least one housing opening leading into the second interior space. Further, a plurality of leads of a three phase electric motor controller disposed exterior to the housing enters the second interior space through the at least one housing opening for connecting a plurality of terminals of the plurality of leads of the three phase electric motor controller to the back EMF boosting circuit. Further, the plurality of terminals may include three terminals. Further, each of the three terminals may be attached to the third bus bar of each of the three sets of bus bars. Further, the plurality of sensors may be disposed in the first interior space. Further, a plurality of leads of the plurality of sensors enters the second interior space through a second opening of the plurality of openings for connecting a plurality of terminals of the plurality of leads to at least one low-voltage terminal mounted on the second housing portion.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
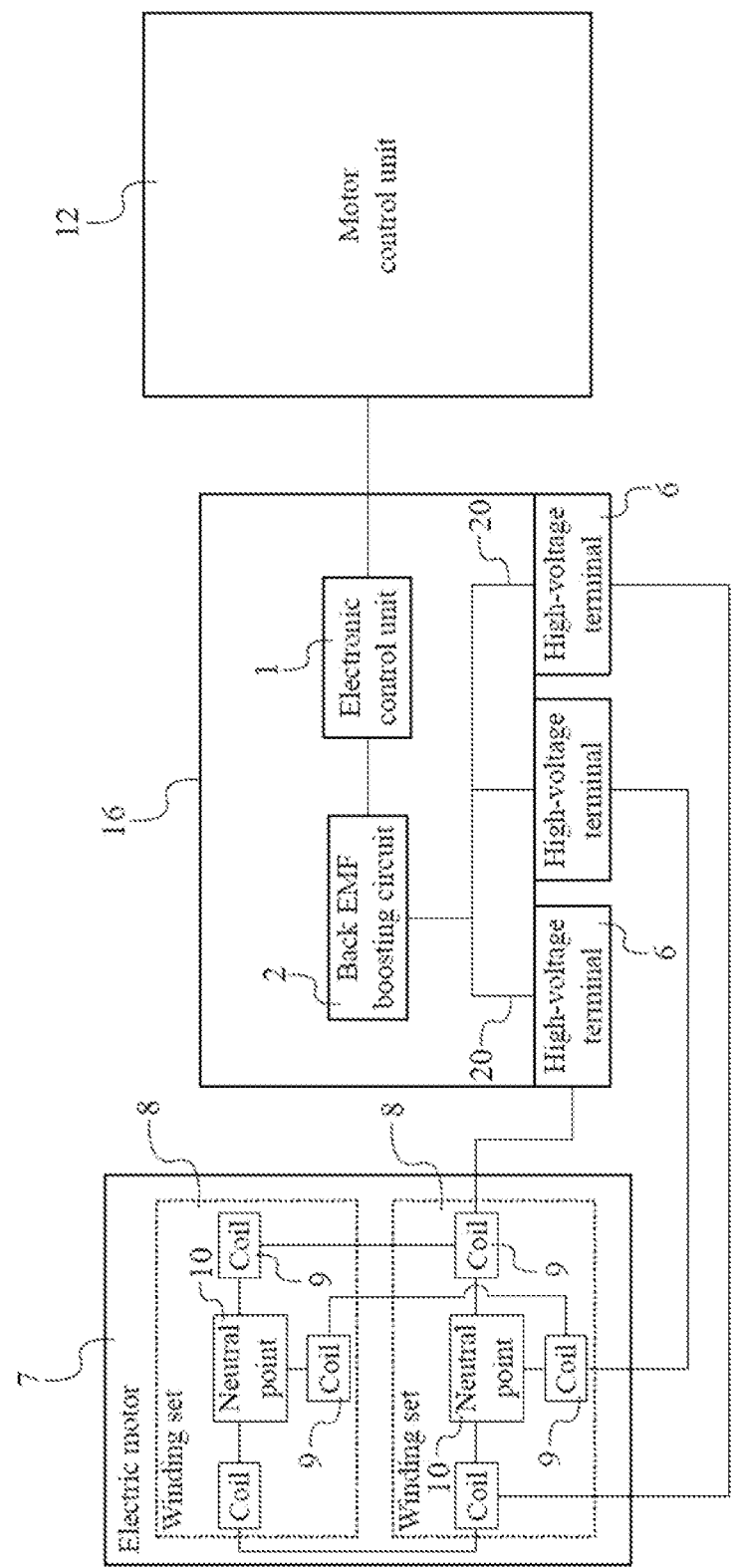
FIG. 1 is a schematic diagram illustrating the overall system of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of an integrated assembly of an electric winding exchanger system and a multiphase electric motor, embodiments of the present disclosure are not limited to use only in this context.

Overview:

The present disclosure describes an integrated assembly of an electric winding exchanger system and a multiphase electric motor.

Further, the present disclosure describes the electric coil exchanger system (electric winding exchanger system) that is to be added as an interface between motor (multiphase motor) and inverter to improve the limits of a multi-phase motors inverter system such as a limit of Max multi-phase Electric Motor torque (N.m) due to a limit of multi-phase inverter current [A] and battery current at constant torque region and a limit of Max multi-phase Motor speed due to the limit of Battery voltage.

Further, the present disclosure describes an electric coil exchanger system that is an interface device between the motor and the inverter that is either integrated with the multi-phase motor.

Further, the present disclosure describes a new assembly of an electric winding exchanger system with integrated housing with an electric motor housing.

Further, Integrated housing with motor housing provides ease of assembly in electric COIL assembly integrated with electric motor assembly. Further, Integrated housing with motor housing reduces the number of terminals from electric motor terminals to the electric winding exchanger system. Further, Integrated housing provides ease of access to the electric motor COIL terminals. Further, Integrated housing provides ease of access to the electric motor thermal sensor. Further, Integrated housing provides ease of access to the rotor position sensor. Further, Integrated housing provides ease of integration in low voltage terminal assembly. Further, Integrated housing comprises ease of access to the power inverter module [motor control unit] terminal terminals.

Further, the present disclosure describes an integration of an electric coil exchanger system assembly with an electric motor assembly. Further, the electric coil exchanger system is axially integrated with the motor package. Further, the electric coil exchanger system has a low voltage signal terminals comprising the electric motor assembly resolver, thermal sensor, and electric coil exchanger control. Further, the electric coil exchanger system comprises a back emf boosting circuit. Further, the back emf boosting circuit is made of nine electrically isolated high voltage controllable switches. Further, each switch has two isolated terminals. each controllable switch has an off and an on state. Further, the terminals of high voltage controlled switches are connected together using ten electrically conductive bus bars. Further, one neutral point of the multi-phase electric motor is located inside the motor and the second neutral point of the motor assembly is formed inside the back emf booster circuit. Further, the high voltage controlled switches are assembled in a housing and axially integrated with an electric motor assembly housing. Further, terminals of the electric motor coil leads are passed through a window between the electric motor assembly and the electric coil exchanger system assembly. Further, terminals of electric motor thermal sensor and rotor position sensor are passed through a window between electric motor assembly and back emf boosting circuit assembly housing. Further, all of the electric motor coil's terminals are connected to the emf boosting circuit bus bars at nine different points. Further, the back emf boosting circuit is connected to the terminals of a 3-phase electric motor controller in 3 points. Further, the terminals of a 3-electric motor controller are passed through a window back into the electric coil exchanger system. Further, the coil is allocated in the electric coil exchanger system housing. Further, the high voltage controlled switches are controlled by 3 mechanical arms in a fashion to enable a different sequence of states in switches of emf boosting circuit. Further, mechanical arms are controlled by a motorized electromechanical actuator. Further, controlled switches may include a motorized actuation mechanism where phases A, B, and C are controlled simultaneously using 3 mechanical arms. Electric winding exchanger system housing is integrated with the electric motor housing. Two openings are placed in the housing for the exit of terminals of motor coils, resolver, and thermal sensor. The terminals of the motor control unit are passing through a window allocated between the electric winding exchanger system and the motor control unit.

Further, the present disclosure describes an electric winding exchanger system. Further, the electric winding exchanger system may include an electronic control unit, a back electromotive force (EMF) boosting circuit, a plurality of high-voltage terminals, an electric motor, and a motor control unit. Further, the electric motor comprises a plurality of winding sets. Further, each of the plurality of winding sets comprises a plurality of coils and a neutral point. Further, the motor control unit is electronically connected to the electronic control unit. Further, the electronic control unit is electronically connected to the back EMF boosting circuit. Further, the electric motor is configured to operate through a plurality of electrical phases, wherein each of the plurality of electrical phases is associated with a corresponding high-voltage terminal from the plurality of high-voltage terminals and a corresponding coil from the plurality of coils. Further, the neutral point is selectively and electrically connected to each of the plurality of coils. Further, the corresponding coil is selectively and electrically connected to the back EMF boosting circuit by the corresponding high-voltage terminal. Further, the corresponding coil for an arbitrary winding set is selectively and electrically connected to the corresponding coil for another winding set, wherein the arbitrary winding set and the other winding set are from the plurality of winding sets.

Further, the electric winding exchanger system may include a housing and at least one low-voltage terminal. Further, the electric motor and the motor control unit are externally positioned to the housing. Further, the at least one low-voltage terminal and the plurality of high-voltage terminals are being mounted into the housing. Further, the electronic control unit and the back EMF boosting circuit are mounted within the housing. Further, the at least one low-voltage terminal is positioned offset from the plurality of high-voltage terminals about the housing. Further, the motor control unit is electronically connected to the electronic control unit by the at least one low-voltage terminal. Further, the housing is externally mounted to the electric motor, and a central axis of the housing is positioned collinearly to a rotation axis of the electric motor.

In one embodiment, the location of the electric winding exchanger system is disclosed for an electric motor-controller-battery system. The electric motor-controller-battery system defines the base system. The electric motor-controller-battery system includes a n-phase electric motor, a n-phase motor control unit, and a high-voltage battery system integrated and characterized inside the vehicle. The electric motor-controller-battery system also includes a n-phase cable between a motor and a controller. The system includes a DC cable between the controller and a battery. The system also includes an electric motor terminal block. The electric winding exchanger system is physically located between a multi-phase motor and a multi-phase motor control unit. The system may structurally be integrated with the multi-phase electric motor housing. High-voltage circuits of the electric winding exchanger system are connected to the electric motor from one side and form the other side of the motor control unit.

In another embodiment, operation states of the electric winding exchanger system are disclosed. The operation states include five operation states. Operation state 1 is a normal torque mode. Operation state 2 is a high-torque mode. Operation state 3 is a high-speed mode. Operation mode 4 is a disconnected state. And operation mode 5 is a transient state allowing transition from any state to another state.

In another embodiment, a principle of operation of the electric winding exchanger system is disclosed. The principle of operation includes the description of four major operation modes of an electric winding (coil) exchanger. The system includes the principle of operation for overcoming the boundaries of torque and speed without increasing the limits of the motor control unit, the battery current, electric motor peak torque, and/or the battery voltage.

The system includes a set of high-power n-phase terminals to be connected to the controller side. The set of high-power terminals is to be connected to the motor winding sets. The hardware also includes a housing, a back EMF boosting circuit, an electronic control unit, several high-power controlled relays, and a low voltage control terminal. The back EMF boosting circuit adjusts the winding arrangements of the electric motor in order to change the state of the electric motor. The plurality of high-voltage terminals transfers high voltage electrical energy from the back EMF boosting circuit to the electric motor and vice versa.

In an additional embodiment, the system includes the winding arrangement of the electric motor for connection to the electric winding exchanger at the motor terminal ports. The winding arrangement includes the winding segments or coils, the number of permanently connected neutrals, and a table comprising different winding arrangements for the motor which are suitable for connection to the electric winding exchanger.

In an additional embodiment, the utilization of electric winding for torque boosting, speed boosting, and disconnection of the electric power circuit between the motor control unit and the electric motor is disclosed. This utilization includes the basic operation of an electric winding (coil) exchanger in a vehicle.

Further, the electric motor comprises a plurality of winding sets, and each of the plurality of winding sets comprises a plurality of coils and a neutral point. The motor control unit is electronically connected to the electronic control unit. This allows commands to be relayed from the motor control unit and to the electronic control unit. The electronic control unit is electronically connected to the back EMF boosting circuit. This allows the electronic control unit to manage the back EMF boosting circuit. The electric motor is configured to operate through a plurality of electrical phases. Each of the plurality of electrical phases is associated with a corresponding high-voltage terminal from the plurality of high-voltage terminals and a corresponding coil from the plurality of coils. The neutral point is selectively and electrically connected to each of the plurality of coils. In further detail, each of the plurality of coils can be electrically grounded by the neutral point if the connection between the neutral point and each of the plurality of coils is closed. The corresponding coil is selectively and electrically connected to the back EMF boosting circuit by the corresponding high-voltage terminal. In further detail, the corresponding coil can be electrically powered by the back EMF boosting circuit via the corresponding high-voltage terminal. Further, the corresponding coil for an arbitrary winding set is selectively and electrically connected to the corresponding coil for another winding set. The arbitrary winding set and the other winding set are from the plurality of winding sets. In further detail, electrical energy can be transferred from one coil to another coil. Thus, the electrical phases can be adjusted by adjusting the electrical connections between the corresponding coil for an arbitrary winding set and the corresponding coil for another winding set, the electrical connections between the corresponding coil and the corresponding high-voltage terminal, and the electrical connections between the neutral point and each of the plurality of coils. Dependent on the adjustments to the electrical phases, improved torque or speed performance can be outputted by the electrical motor.

Further, a plurality of first switches open or close electrical connections between the neutral point and each of the plurality of coils. The neutral point is electrically connected to the corresponding coil by a corresponding first switch from the plurality of first switches. Thus, the plurality of first switches can be used to open or close the electrical connection between the neutral point and each of the plurality of coils. The back EMF boosting circuit is electronically connected to each of the plurality of first switches. Thus, the back EMF boosting circuit can manage each of the plurality of first switches dependent on commands relayed from the electronic control unit.

Further, the electric coil exchanger system assembly may include an integrated housing and an electric coil exchanger system. Further, the integrated housing axially houses the electric coil exchanger system. Further, the integrated housing integrates with a motor housing of the electric motor assembly for axially integrating the electric coil exchanger system with an electric motor of the electric motor assembly. Further, integration of the integrated housing with the motor housing provides ease of assembly in an electric coil assembly of the electric coil exchanger system integrated with the electric motor assembly. Further, the integration of the integrated housing with the motor housing reduces the number of terminals from the terminals of the electric motor to the electric coil exchanger system. Further, the integration of the integrated housing provides ease of access to coil terminals of the electric motor. Further, the integration of the integrated housing provides ease of access to a thermal sensor of the electric motor. Further, the integration of the integrated housing provides ease of access to a rotor position sensor associated with the electric motor. Further, the integration of the integrated housing provides ease of integration in low voltage terminal assembly. Further, the integration of the integrated housing comprises ease of access to terminal terminals of a power inverter module (motor control unit) associated with the electric motor.

Further, in some embodiments, the electric coil exchanger system may include one or more low voltage signal terminals comprising an electric motor assembly resolver, a thermal sensor, and an electric coil exchanger control. Further, the one or more low voltage signal terminals may be disposed on the integrated housing. Further, in an embodiment, the integrated housing may include two openings for allowing terminals of coils of the electric motor, the resolver, and the thermal sensor to exit the integrated housing.

Further, in some embodiments, the electric coil exchanger system may include a back electromotive force (EMF) boosting circuit. Further, the back EMF boosting circuit may be disposed in the integrated housing.

Further, in an embodiment, the back EMF boosting circuit may include nine electrically isolated high voltage controllable switches (such as high voltage controllable switches, switches, etc.). Further, each switch of the nine electrically isolated high voltage controllable switches may include two isolated terminals. Further, each switch of the nine electrically isolated high voltage controllable switches may be associated with an off state and an on state.

Further, in an embodiment, terminals of one or more electrically isolated high voltage controllable switches are connected together using ten electrically conductive bus bars (bus bars). Further, a first neutral point of the electric motor assembly (multi-phase electric motor) may be located inside the electric motor and a second neutral point of the electric motor assembly is formed inside the back EMF booster circuit.

Further, in an embodiment, the one or more electrically isolated high voltage controllable switches may be assembled in the integrated housing. Further, the one or more electrically isolated high voltage controllable switches may be axially integrated with the motor housing based on the integration of the integrated housing with the motor housing.

Further, in an embodiment, terminals of the electrical motor coil leads of the electric motor may pass through a window between the electric motor assembly and the electric coil exchanger system assembly. Further, in an embodiment, the integrated housing may include a first opening and the motor housing may include a second opening juxtaposed to the first opening. Further, the first opening and the second opening form the window for allowing the passing of the terminals of the electrical motor coil leads of the electric motor based on the integration of the integrated housing with the motor housing.

Further, in an embodiment, terminals of the thermal sensor and the rotor position sensor may pass through a window between the electric motor assembly and a back electromotive force (EMF) boosting circuit assembly housing associated with the back EMF boosting circuit. Further, in an embodiment, the integrated housing may include a first opening and the motor housing may include a third opening juxtaposed to the first opening. Further, the first opening and the third opening form the window for allowing the passing of the terminals of the thermal sensor and the rotor position sensor based on the integration of the integrated housing with the motor housing.

Further, in an embodiment, the coil terminals of the electric motor may be connected to bus bars of the back EMF boosting circuit at nine different points.

Further, in an embodiment, the back EMF boosting circuit may be connected to terminals of a 3-phase electric motor controller associated with the electric motor assembly in 3 points.

Further, in an embodiment, the terminals of a 3-electric motor controller may pass through a window back into the electric coil exchanger system. Further, a coil may be allocated in the integrated housing. Further, in an embodiment, the integrated housing may include a first opening and the motor housing may include a second opening juxtaposed to the first opening. Further, the first opening and the second opening form the window for allowing the passing of the terminals of a 3-electric motor controller based on the integration of the integrated housing with the motor housing. Further, in an embodiment, the terminals of the 3-electric motor controller may pass through the window allocated between the electric winding exchanger system and the 3-electric motor controller.

Further, in an embodiment, one or more high voltage controllable switches may be controlled by 3 mechanical arms in a fashion to enable a different sequence of states in switches of the back EMF boosting circuit. Further, in an embodiment, the one or more high voltage controllable switches may include a motorized actuation mechanism where phases A, B, and C are controlled simultaneously using the 3 mechanical arms.

Further, in an embodiment, the mechanical arms may be controlled by a motorized electromechanical actuator.

Further, the present disclosure describes an electric coil exchanger system assembly integrated with an electric motor assembly. Further, the present disclosure describes an integration of the electric coil exchanger system with the electric motor.

Further, the present disclosure describes an electric winding exchanger system for a multiphase electric motor with multiple isolated neutrals and multiple parallel coil paths. Further, the multiphase electric motor may include any number of neutrals.

In one embodiment, the location of the electric winding exchanger system is disclosed for an electric motor-controller-battery system. The electric motor-controller-battery system defines the base system. The electric motor-controller-battery system includes an n-phase electric motor, an n-phase motor control unit, and a high-voltage battery system integrated and characterized inside the vehicle. The electric motor-controller-battery system also includes an n-phase cable between the motor and controller. The system includes a DC cable between the controller and the battery. The system also includes an electric motor terminal block. The electric winding exchanger system is physically located between a multi-phase motor and a multi-phase motor control unit. The system may structurally be integrated with the multi-phase electric motor housing. High-voltage circuits of the electric winding exchanger system are connected to the electric motor from one side and form the other side of the motor control unit.

In another embodiment, the operation states of the electric winding exchanger system are disclosed. The operation states include five operation states. Operation state 1 is a normal torque mode. Operation state 2 is a high-torque mode. Operation state 3 is a high-speed mode. Operation mode 4 is a disconnected state. And operation mode 5 is a transient state allowing transition from any state to another state.

In another embodiment, a principle of operation of the electric winding exchanger system is disclosed. The principle of operation includes the description of four major operation modes of the electric winding exchanger. The system includes the principle of operation for overcoming the boundaries of torque and speed without increasing the limits of the motor control unit, the battery current, the electric motor peak torque, and/or the battery voltage.

The system includes a set of high-power n-phase terminals to be connected to the controller side. The set of high-power terminals is to be connected to the motor winding sets. The hardware also includes a housing, a back EMF boosting circuit, an electronic control unit, several high-power controlled relays, and a low voltage control terminal.

In another embodiment, an electronic control unit is disclosed. The electronic control unit includes a SERIAL communication, two low voltage relays, a DC voltage regulator, and a microcontroller for main command evaluations. Additionally, the control board comprises three terminals. The first terminal includes an input Ground, 12 direct current voltage (VDC), clock ports, serial communication ports [RX, TX], and analog command inputs. The second terminal is for data programming of the microcontroller. The third terminal includes hall sensor ports, 5 VDC supply for hall sensors, and two output commands.

In an additional embodiment, electric winding exchanger software embedded inside the microcontroller of the electronic control unit of the electric winding exchanger system is disclosed. The software includes commands block, fault diagnosis block, excitation signal block, send and receive block, and switching block. Each block includes several sub-functions enabling the output of that block. The send-receive block includes a function that evaluates and receives commands from the motor control unit or vehicle. The send-receive block includes another function that sends the feedback received from either fault diagnosis block, excitation block, and command block.

In an additional embodiment, the system includes the winding arrangement of the electric motor for connection to the electric winding exchanger at the motor terminal ports. The winding arrangement includes the winding segments or coils, the number of permanently connected neutrals, and a table comprising different winding arrangements for the motor which are suitable for connection to the electric winding exchanger.

In an additional embodiment, the utilization of electric winding for torque boosting, speed boosting, and disconnection of the electric power circuit between the motor control unit and the electric motor is disclosed. This utilization includes the basic operation of an electric winding exchanger in the vehicle.

In reference to FIGS. 1 through 12, the present invention is an electric winding exchanger system that increases torque or speed performance of multi-phase electric motors and electric drive modules. A preferred embodiment of the present invention comprises an electronic control unit 1, a back electromotive force (EMF) boosting circuit 2, a plurality of high-voltage terminals 6, an electric motor 7, and a motor control unit 12. The electronic control unit 1 receives and processes commands from the motor control unit 12. The back EMF boosting circuit 2 adjusts the winding arrangements of the electric motor 7 in order to change the state of the electric motor 7. The plurality of high-voltage terminals 6 transfers high voltage electrical energy from the back EMF boosting circuit 2 to the electric motor 7 and vice versa. The motor control unit 12 allows a user to input commands in order to activate increased torque or speed performance for the electric motor 7. The electric motor 7 is preferably a multi-phase electric motor of an electric or hybrid vehicle.

The general configuration of the aforementioned components allows the present invention to increase torque or speed performance of multi-phase electric motors and electric drive modules. With reference to FIG. 1, the electric motor 7 comprises a plurality of winding sets 8, and each of the plurality of winding sets 8 comprises a plurality of coils 9 and a neutral point 10. The motor control unit 12 is electronically connected to the electronic control unit 1. This allows commands to be relayed from the motor control unit 12 and to the electronic control unit 1. The electronic control unit 1 is electronically connected to the back EMF boosting circuit 2. This allows the electronic control unit 1 to manage the back EMF boosting circuit 2. The electric motor 7 is configured to operate through a plurality of electrical phases. Each of the plurality of electrical phases is associated to a corresponding high-voltage terminal from the plurality of high-voltage terminals 6 and a corresponding coil from the plurality of coils 9. The neutral point 10 is selectively and electrically connected to each of the plurality of coils 9. In further detail, each of the plurality of coils 9 can be electrically grounded by the neutral point 10 if the connection between the neutral point 10 and each of the plurality of coils 9 is closed. The corresponding coil is selectively and electrically connected to the back EMF boosting circuit 2 by the corresponding high-voltage terminal. In further detail, the corresponding coil can be electrically powered by the back EMF boosting circuit 2 via the corresponding high-voltage terminal. Further, the corresponding coil for an arbitrary winding set is selectively and electrically connected to the corresponding coil for another winding set. The arbitrary winding set and the other winding set are from the plurality of winding sets 8. In further detail, electrical energy can be transferred from one coil to another coil. Thus, the electrical phases can be adjusted by adjusting the electrical connections between the corresponding coil for an arbitrary winding set and the corresponding coil for another winding set, the electrical connections between the corresponding coil and the corresponding high-voltage terminal, and the electrical connections between the neutral point 10 and each of the plurality of coils 9. Dependent of the adjustments to the electrical phases, improved torque or speed performance can be outputted by the electrical motor.

Figure 2:
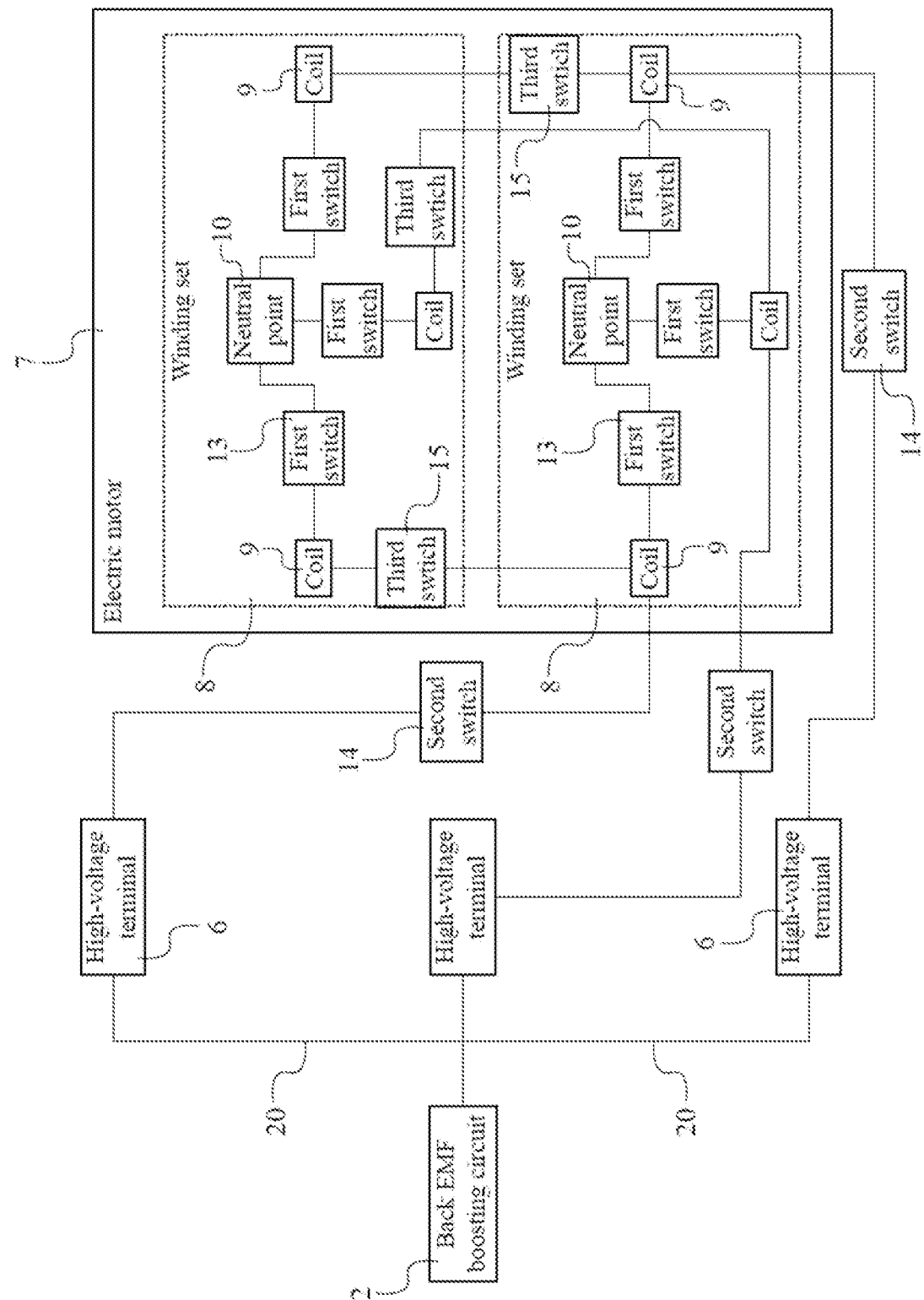
FIG. 2 is a schematic diagram illustrating the system of the present invention with the plurality of first switches, the plurality of second switches, and the plurality of third switches.

With reference to FIG. 2, the present invention may further comprise a plurality of first switches 13 in order to open or close electrical connections between the neutral point 10 and each of the plurality of coils 9. The neutral point 10 is electrically connected to the corresponding coil by a corresponding first switch from the plurality of first switches 13. Thus, the plurality of first switches 13 can be used to open or close the electrical connection between the neutral point 10 and each of the plurality of coils 9. The back EMF boosting circuit 2 is electronically connected to each of the plurality of first switches 13. Thus, the back EMF boosting circuit 2 can manage each of the plurality of first switches 13 dependent on commands relayed from the electronic control unit 1.

Figure 4:
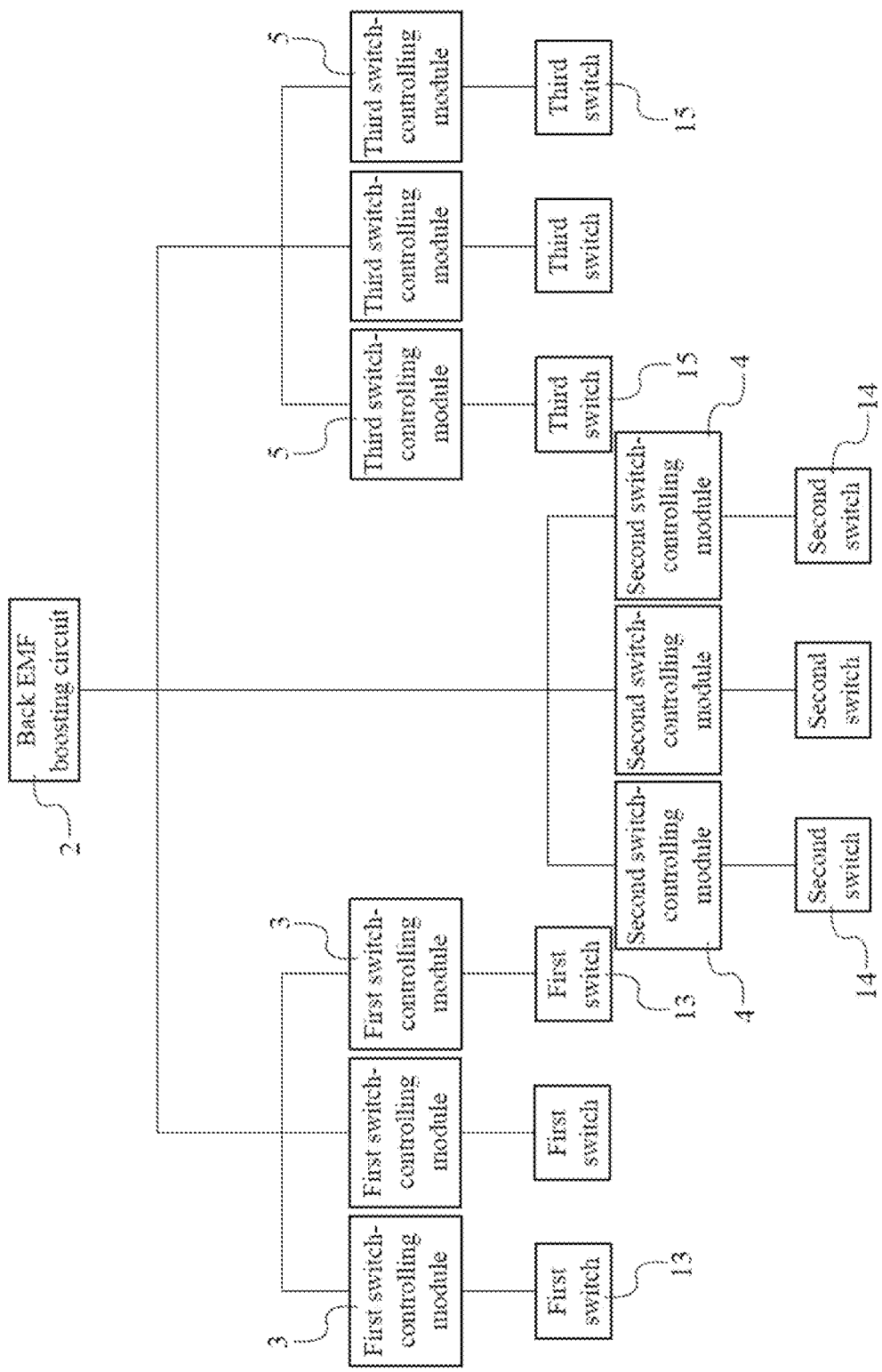
FIG. 4 is a schematic diagram illustrating the electrical and electronic connections between the back EMF boosting circuit and the plurality of first switches, the plurality of second switches, and the plurality of third switches.
Figure 10:
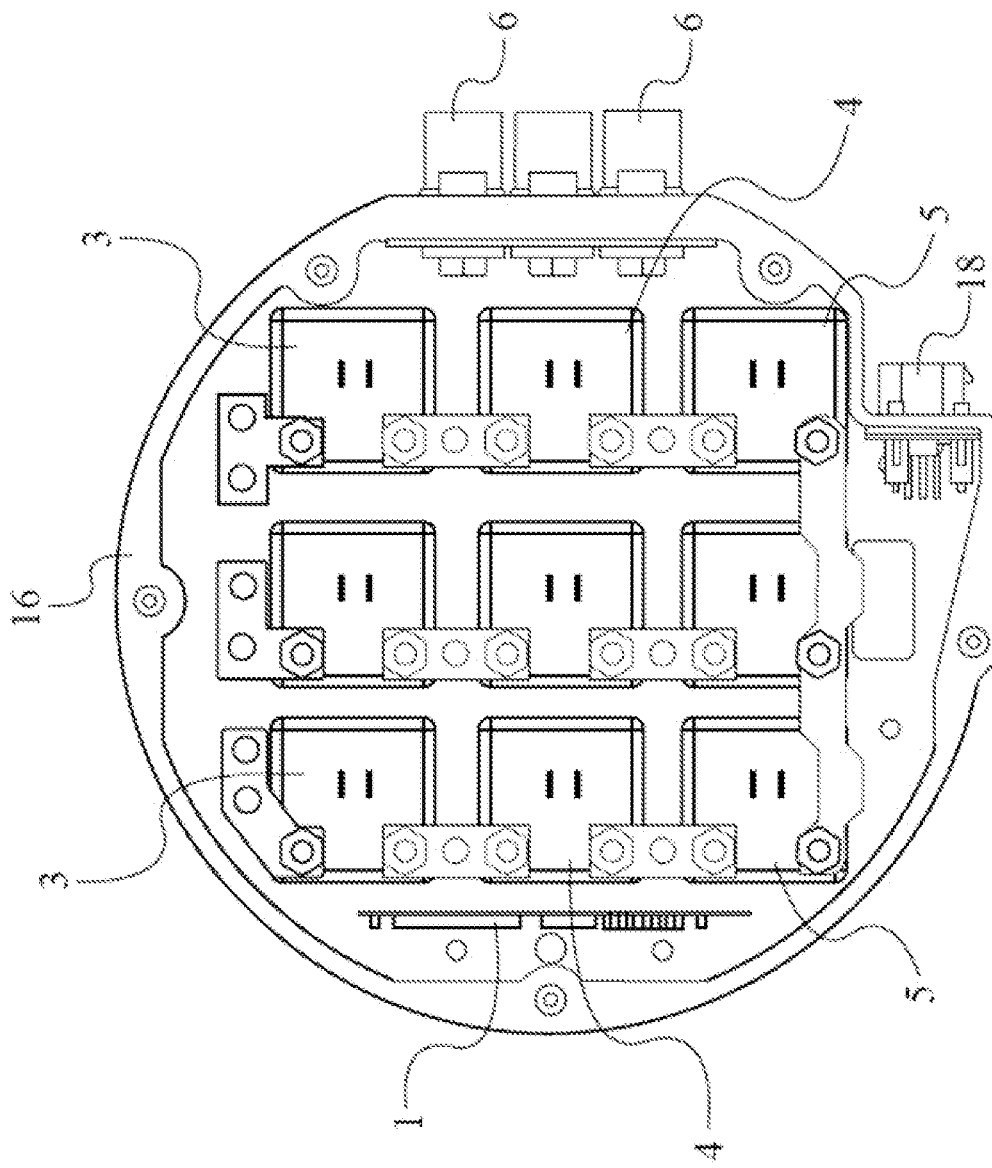
FIG. 10 is an open side view of the housing displaying the plurality of first switch-controlling modules, the plurality of second switch-controlling modules, and the plurality of third switch-controlling modules.

In order for the present invention to efficiently manage each of the plurality of first switches 13 and with reference to FIGS. 4 and 10, the back EMF boosting circuit 2 may comprise a plurality of first switch-controlling modules 3. The electronic control unit 1 is electronically connected to each of the plurality of first switch-controlling modules 3. This allows commands to be relayed from the electronic control unit 1 to each of the plurality of first switch-controlling modules 3. Further, each of the plurality of first switch-controlling modules 3 is electronically connected to a corresponding first switch from the plurality of first switches 13. In further detail, the present invention provides a single first switch-controlling module for each of the plurality of first switches 13 in order for the plurality of first switches 13 to be precisely controlled.

Similarly and with reference to FIG. 2, the present invention may further comprise a plurality of second switches 14 in order to open or close electrical connections between the corresponding coil and the corresponding high-voltage terminal. The corresponding coil is electrically connected to the corresponding high-voltage terminal by a corresponding second switch from the plurality of second switches 14. Thus, the plurality of second switches 14 can be used to open or close the electrical connection between the corresponding coil and the corresponding high-voltage terminal. The back EMF boosting circuit 2 is electronically connected to the each of the plurality of second switches 14. Thus, the back EMF boosting circuit 2 can manage each of the plurality of second switches 14 dependent on commands relayed from the electronic control unit 1.

In order for the present invention to efficiently manage each of the plurality of second switches 14 and with reference to FIGS. 4 and 10, the back EMF boosting circuit 2 may further comprise a plurality of second switch-controlling modules 4. The electronic control unit 1 is electronically connected to each of the plurality of second switch-controlling modules 4. This allows commands to be relayed from the electronic control unit 1 to each of the plurality of second switch-controlling modules 4. Further, each of the plurality of second switch-controlling modules 4 is electronically connected to a corresponding second switch from the plurality of second switches 14. In further detail, the present invention provides a single second switch-controlling module for each of the plurality of second switches 14 in order for the plurality of second switches 14 to be precisely controlled.

Similar to the plurality of first switches 13 and the plurality of second switches 14 and with reference to FIG. 2, the present invention may further comprise a plurality of third switches 15 in order to open or close electrical connections between the corresponding coil for the arbitrary winding set and the corresponding coil for the other winding set. The corresponding coil for the arbitrary winding set is electrically connected to the corresponding coil for the other winding set by a corresponding third switch from the plurality of third switches 15. Thus, the plurality of third switches 15 can be used to open or close the electrical connection between the corresponding coil of the arbitrary winding set and the corresponding coil for the other winding set. The back EMF boosting circuit 2 is electronically connected to the each of the plurality of third switches 15. Thus, the back EMF boosting circuit 2 can manage each of the plurality of third switches 15 dependent on commands relayed from the electronic control unit 1.

In order for the present invention to efficiently manage each of the plurality of third switches 15 and with reference to FIGS. 4 and 10, the back EMF boosting circuit 2 may further comprise a plurality of third switch-controlling modules 5. The electronic control unit 1 is electronically connected to each of the plurality of third switch-controlling modules 5. This allows commands to be relayed from the electronic control unit 1 to each of the plurality of third switch-controlling modules 5. Further, each of the plurality of third switch-controlling modules 5 is electronically connected to a corresponding third switch from the plurality of third switches 15. In further detail, the present invention provides a single third switch-controlling module for each of the plurality of third switches 15 in order for the plurality of third switches 15 to be precisely controlled.

Figure 5:
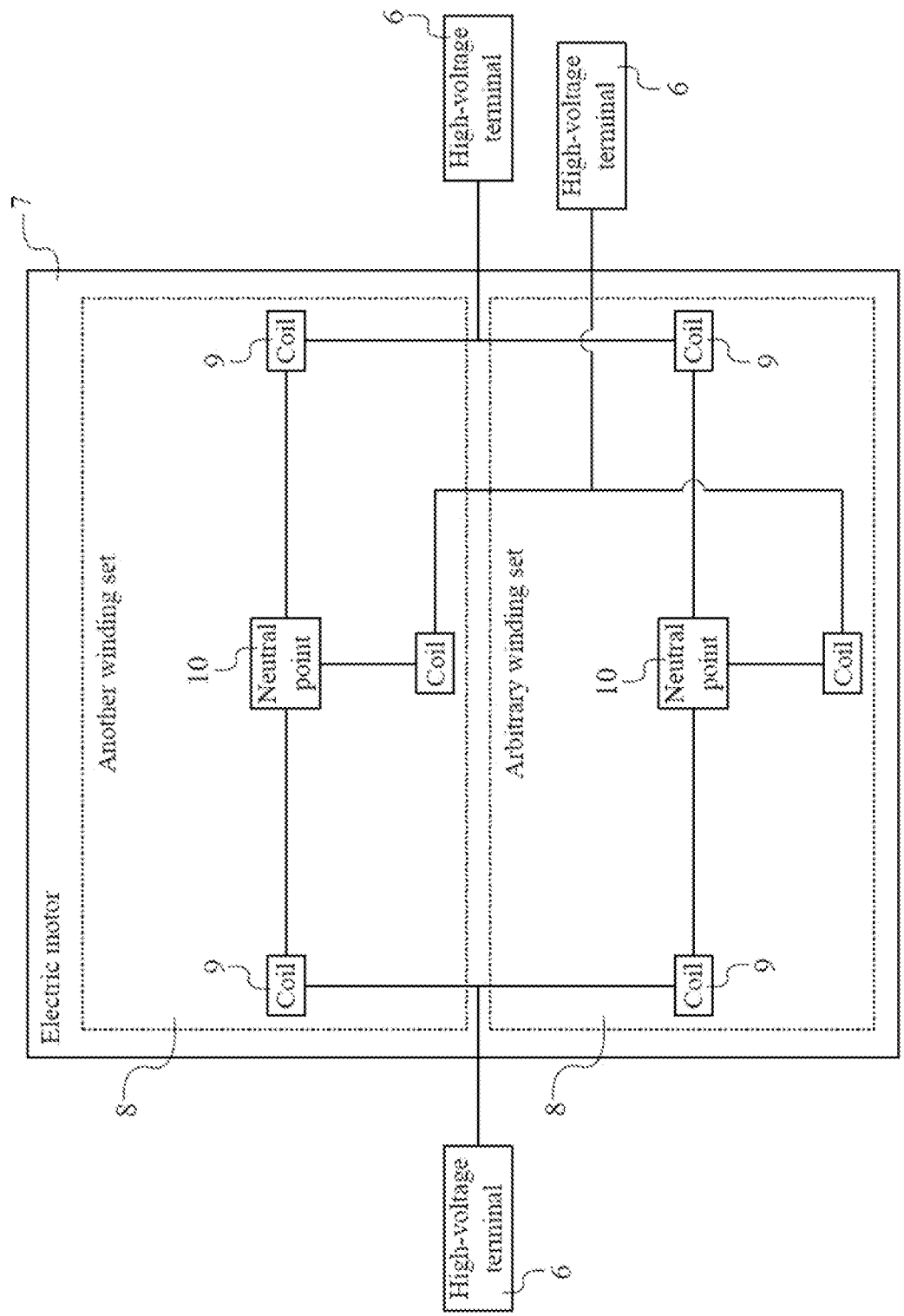
FIG. 5 is a schematic diagram illustrating the electric motor in the normal state.

With reference to FIG. 5, the present invention can be used to operate the electric motor 7 in a normal state. The normal state is the default state of the electric motor 7 where the electric motor 7 operates at the standard performance attributes of the electric motor 7. In the normal state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically connected to each of the plurality of coils 9 for the other winding set. Thus, the corresponding first switch between the neutral point 10 of the other winding set and the corresponding coil of the arbitrary winding set is in a closed position in order to electrically ground each of the plurality of coils 9 for the other winding set. Moreover, the corresponding coil for the arbitrary winding set and the corresponding coil for the other winding set is electrically connected in parallel with the corresponding high-voltage terminal. As a result of this electrical connection, the corresponding second switch between the corresponding coil of the arbitrary winding set and the corresponding high-voltage terminal is in a closed position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 6:
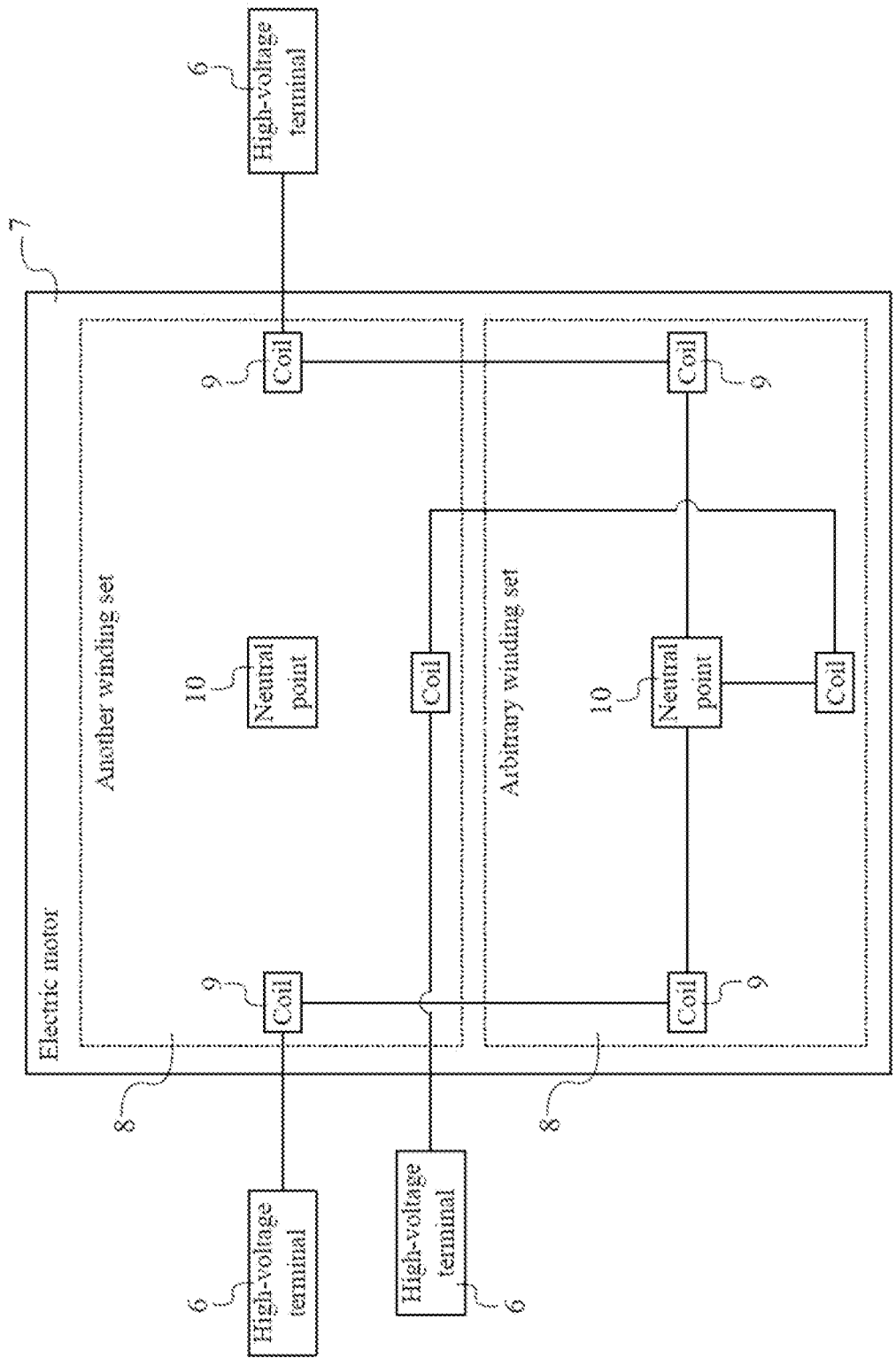
FIG. 6 is a schematic diagram illustrating the electric motor in the high-torque state.

With reference to FIG. 6, the present invention can be used to operate the electric motor 7 in a high-torque state. The high-torque state is the improved state of the electric motor 7 where the electric motor 7 operates at the higher torque performance attributes of the electric motor 7. In the high-torque state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, the corresponding first switch between the neutral point 10 of the other winding set and the corresponding coil of the arbitrary winding set is in an open position in order to not electrically ground each of the plurality of coils 9 for the other winding set. Moreover, the corresponding coil for the arbitrary winding set and the corresponding coil for the other winding set is electrically connected in series with the corresponding high-voltage terminal. As a result of this electrical connection, the corresponding second switch between the corresponding coil of the arbitrary winding set and the corresponding high-voltage terminal is in an open position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in a closed position.

Figure 7:
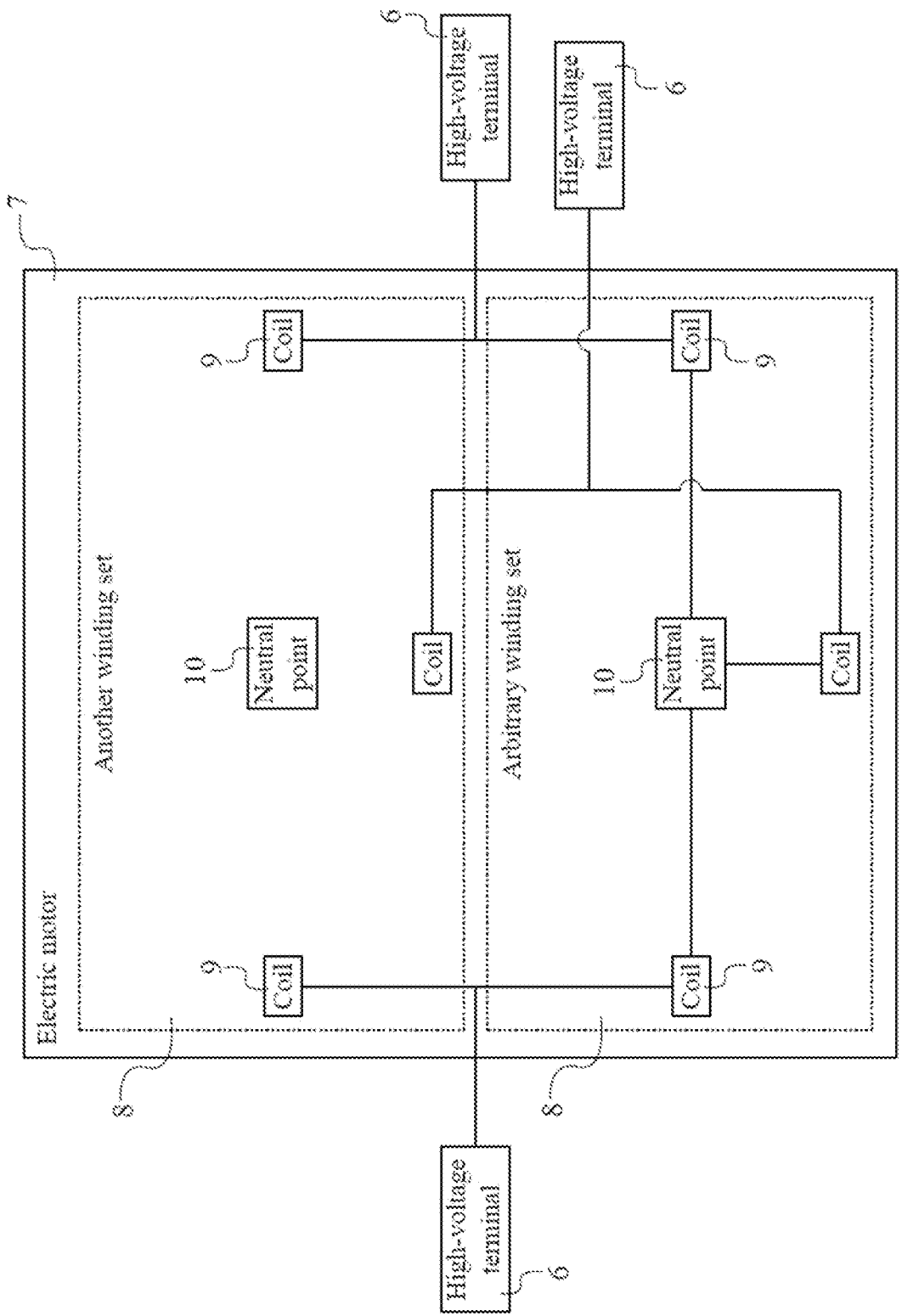
FIG. 7 is a schematic diagram illustrating the electric motor in the transient state.

With reference to FIG. 7, the present invention can be used to switch the electric motor 7 to a transient state. The transient state is the intermediate state of the electric motor 7 where the electric motor 7 switches between one state to another. In the transient state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, the corresponding first switch between the neutral point 10 of the other winding set and the corresponding coil of the arbitrary winding set is in an open position in order to not electrically ground each of the plurality of coils 9 for the other winding set. Moreover, the corresponding coil for the arbitrary winding set and the corresponding coil for the other winding set is electrically connected in series with the corresponding high-voltage terminal. As a result of this electrical connection, the corresponding second switch between the corresponding coil of the arbitrary winding set and the corresponding high-voltage terminal is in a closed position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 8:
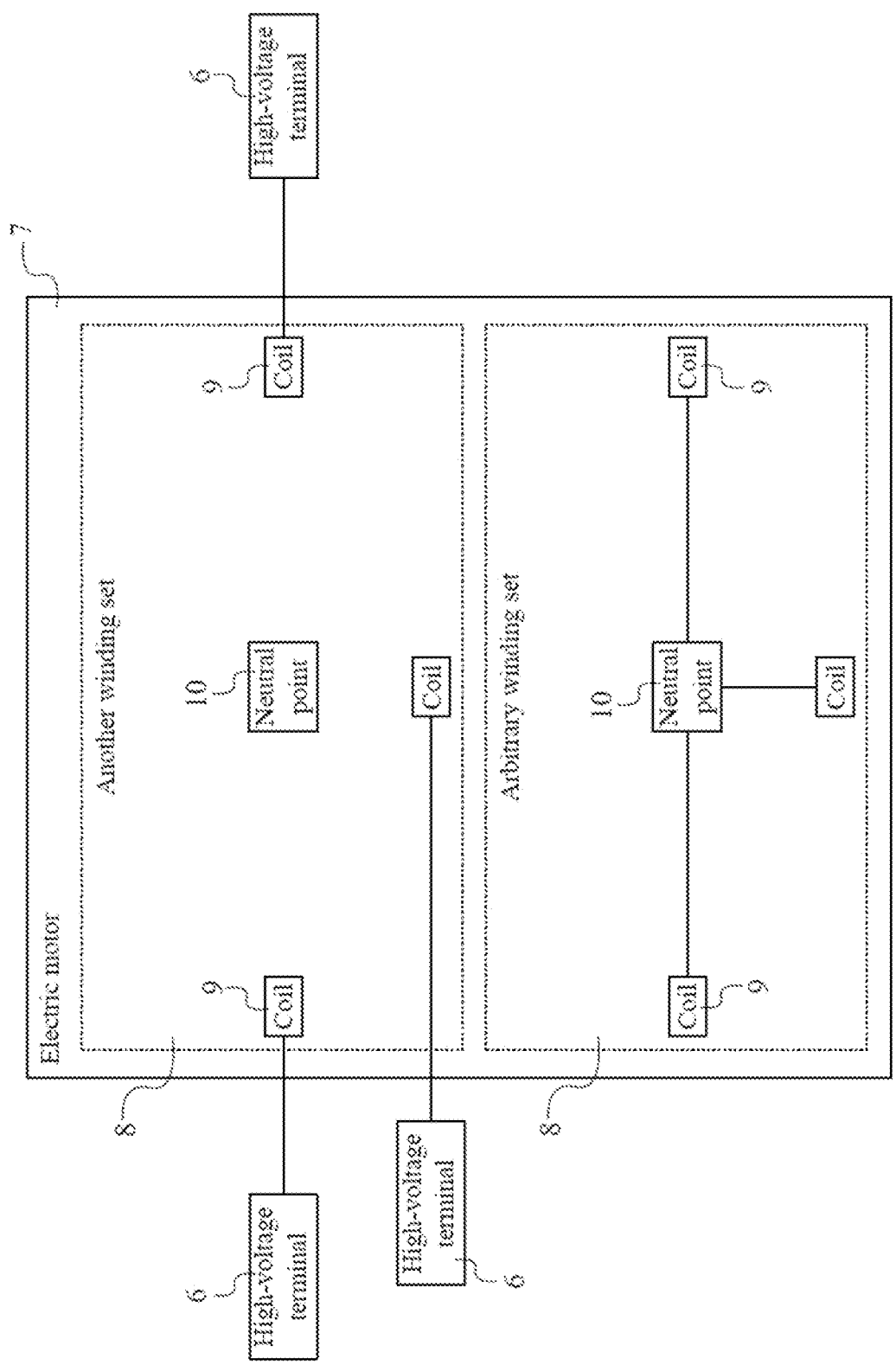
FIG. 8 is a schematic diagram illustrating the electric motor in the disconnected state.

With reference to FIG. 8, the present invention can be used to switch the electric motor 7 to a disconnected state. The disconnected state is a state of the electric motor 7 where the electric motor 7 is disconnected from the plurality of high-voltage terminals 6. In the disconnected state, the neutral point 10 for the arbitrary winding set is electrically connected to each of the plurality of coils 9 for the arbitrary winding set. Thus, the corresponding first switch between the neutral point 10 of the arbitrary winding set and the corresponding coil of the arbitrary winding set is in a closed position in order to electrically ground each of the plurality of coils 9 for the arbitrary winding set. Further, the neutral point 10 for the other winding set is electrically disconnected to each of the plurality of coils 9 for the other winding set. Thus, each of the plurality of coils 9 for the other winding set is not electrically grounded. For each of the plurality of coils 9 for the other winding set to not be electrically grounded, each of the plurality of first switches 13 between the neutral point 10 for the other winding set and each of the plurality of coils 9 for the other winding set is in an open position. Moreover, the corresponding coil for the arbitrary winding set is electrically disconnected with the corresponding high-voltage terminal, and the corresponding coil for the other winding set is electrically connected with the corresponding high-voltage terminal. As a result of this electrical connection, the corresponding second switch between the corresponding coil of the arbitrary winding set and the corresponding high-voltage terminal is in an open position, while the corresponding second switch between the corresponding coil of the other winding set and the corresponding high-voltage terminal is in a closed position. As another result of this electrical connection, the corresponding third switch between the corresponding coil of the arbitrary winding set and the corresponding coil of the other winding set is in an open position.

Figure 3:
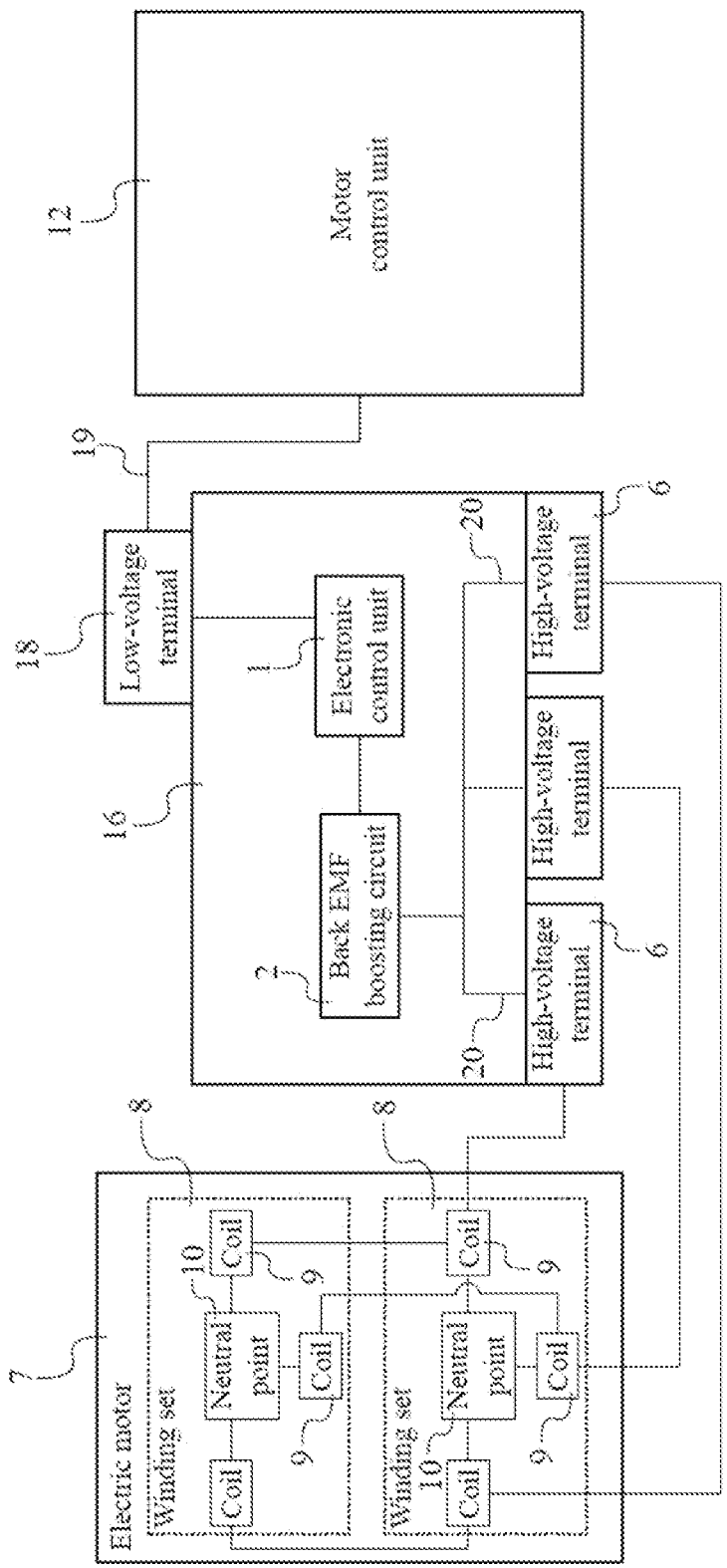
FIG. 3 is a schematic diagram illustrating the system of the present invention with the low-voltage terminal.
Figure 9:
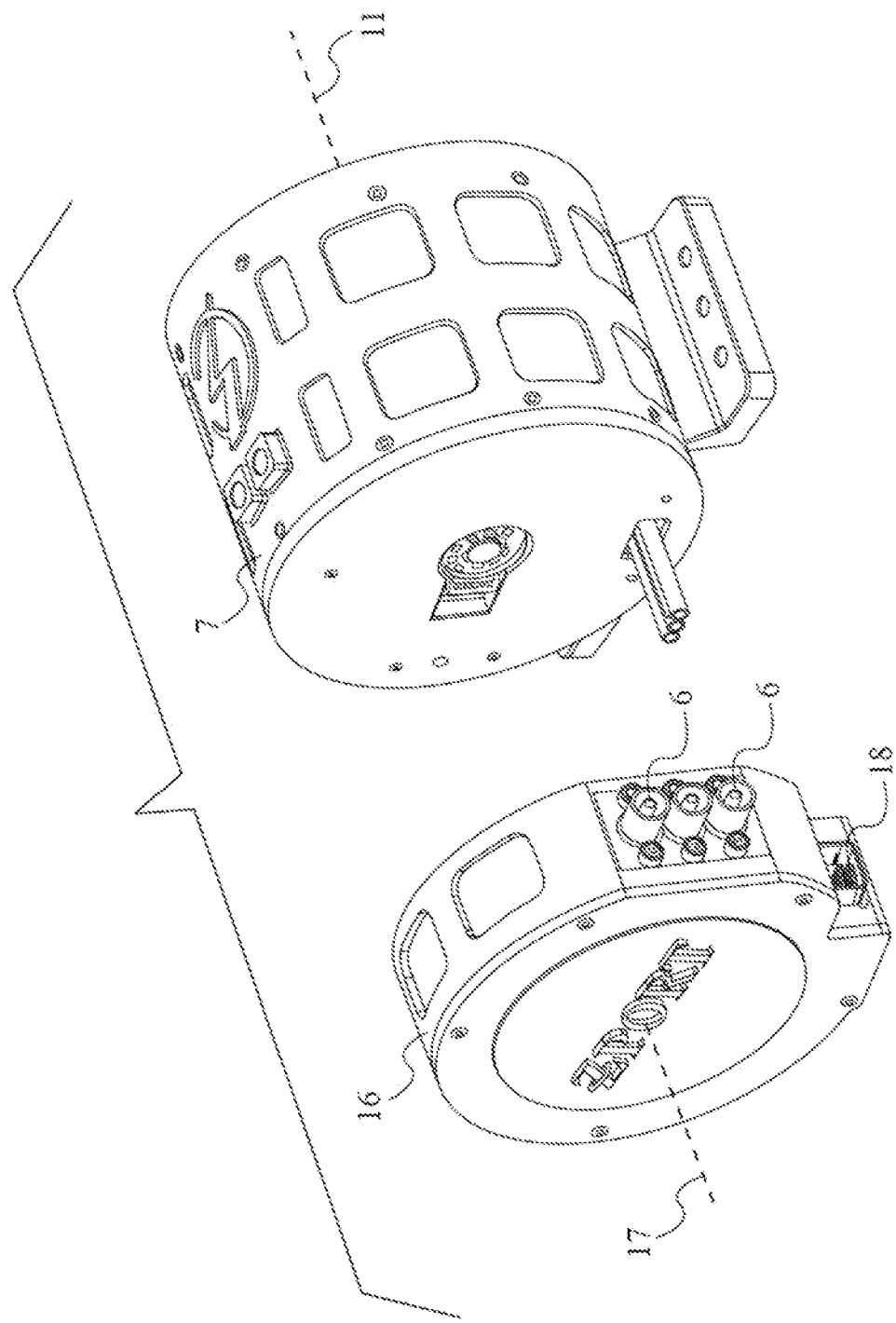
FIG. 9 is an exploded perspective view of present invention.
Figure 12:
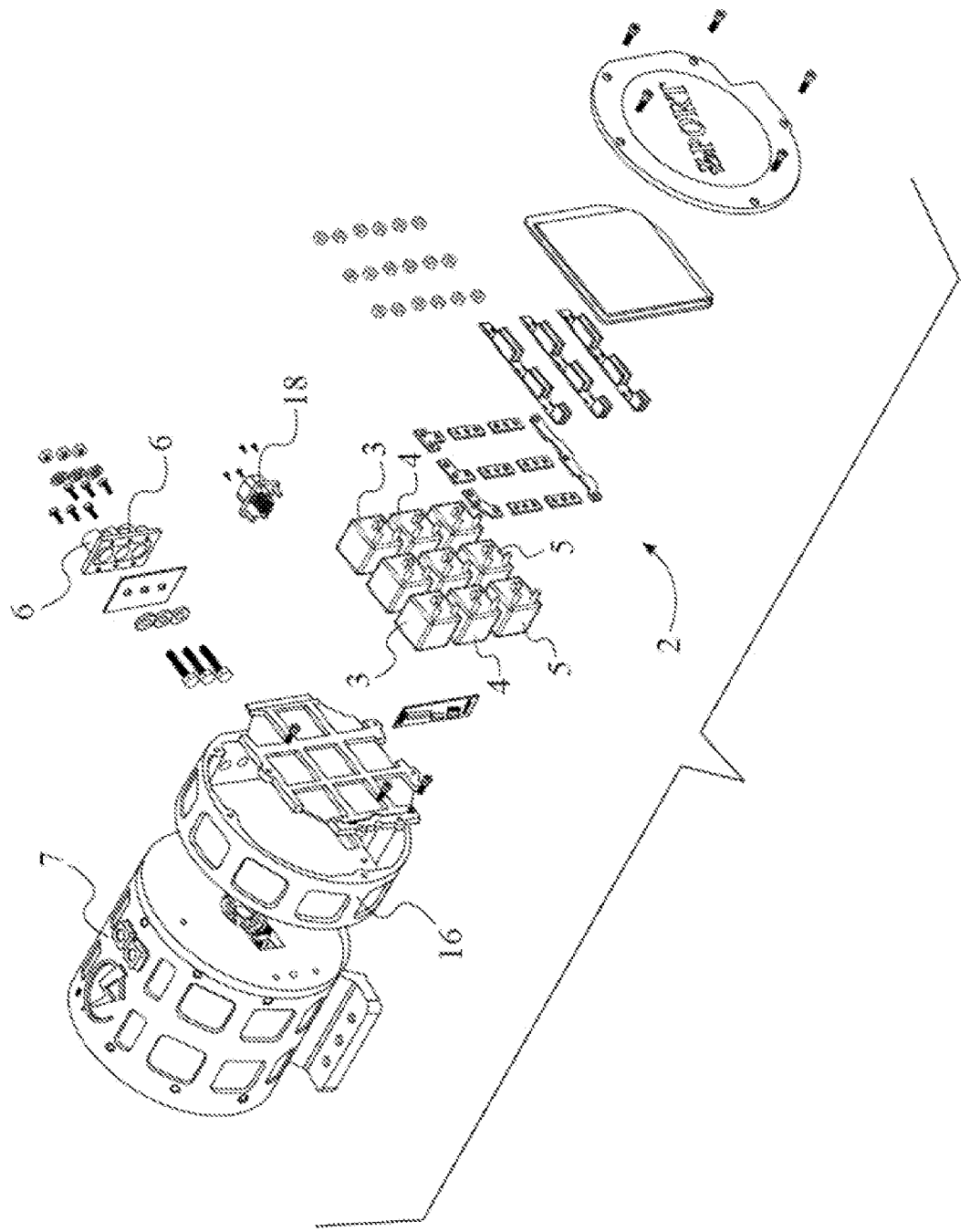
FIG. 12 is another exploded perspective view of the present invention.

With reference to FIGS. 3, 9, and 12, the present invention may further comprise a housing 16 in order to protect and conceal the electronic components and at least one low-voltage terminal 18 in order to establish the electrical connection between the motor control unit 12 and the electronic control unit 1. The electric motor 7 and the motor control unit 12 are externally positioned to the housing 16. In further detail, the electric motor 7 and the motor control unit 12 are standard components of an electric vehicle, and the present invention is preferably retrofitted into an electric vehicle. The at least one low-voltage terminal 18 and the plurality of high-voltage terminals 6 are mounted into the housing 16. Thus, the at least one low-voltage terminal 18 and the plurality of high-voltage terminals 6 are protected while still allowing feasible accessibility in order to establish electrical connections. The electronic control unit 1 and the back EMF boosting circuit 2 are mounted within the housing 16. Thus, the electronic control unit 1 and the back EMF boosting circuit 2 are protected and concealed by the housing 16. The at least one low-voltage terminal 18 is positioned offset from the plurality of high-voltage terminals 6 about the housing 16 in order to allow a user to easily access the at least one low-voltage terminal 18 and the plurality of high-voltage terminals 6 without electrical or physical obstructions. Further, the motor control unit 12 is electrically connected to the electronic control unit 1 by the at least one low-voltage terminal 18. This establishes a safe and efficient electrical connection between the electronic control unit 1 and the motor control unit 12.

In the preferred embodiment and with reference to FIG. 9, the housing 16 is externally mounted to the electric motor 7. In further detail, a set of fasteners is used to fully secure the housing 16 to the electric motor 7. Moreover, a central axis 17 of the housing 16 is positioned collinear to a rotation axis 11 of the electric motor 7. This arrangement allows the housing 16 and the electric motor 7 to form a rotational balanced structure.

In order for terminals of the motor control unit 12 to be accessed and with reference to FIG. 3, the present invention may further comprise at least one low-voltage wire 19. The at least one low-voltage terminal 18 is electronically connected to the motor control unit 12 by the at least one low-voltage wire 19. Thus, the terminals of the motor control unit 12 can be accessed in order for commands to be relayed from the motor control unit 12 to the electronic control unit 1.

In order for the plurality of high-voltage terminals 6 to be accessed and with reference to FIG. 1, the present invention may further comprise a plurality of high-voltage wires 20. Each of the electrical phases is associated to a corresponding high-voltage wire from the plurality of high-voltage wires 20. The corresponding high-voltage terminal is electrically connected to the back EMF boosting circuit 2 by the corresponding high-voltage wire. Thus, electrical energy can be transferred from the back EMF boosting circuit 2 to the plurality of high-voltage terminals 6.

Each of the plurality of first switches 13, each of the plurality of second switches 14, and each of the plurality of third switches 15 are preferably a high-voltage switch that is either a silicon, silicon carbide (SiC), or a gallium nitride (GaN) based power switch. Further, each of the plurality of first switches 13, each of the plurality of second switches 14, and each of the plurality of third switches 15 include an actuator relay and a low-voltage control gate in order to effectively open or close electrical connections. In electromechanical implementations, each of the plurality of first switches 13, each of the plurality of second switches 14, and each of the plurality of third switches 15 have a high-voltage circuit and a low-voltage circuit. The high voltage circuit contains two electrically conductive plates which physically may move toward each other and make a physical contact to conduct electricity or which may physically move away from each other to disconnect electricity. The mechanism of movement is provided by a mechanical actuator which may be controlled by a low-voltage terminal circuit such as solenoid.

Figure 11:
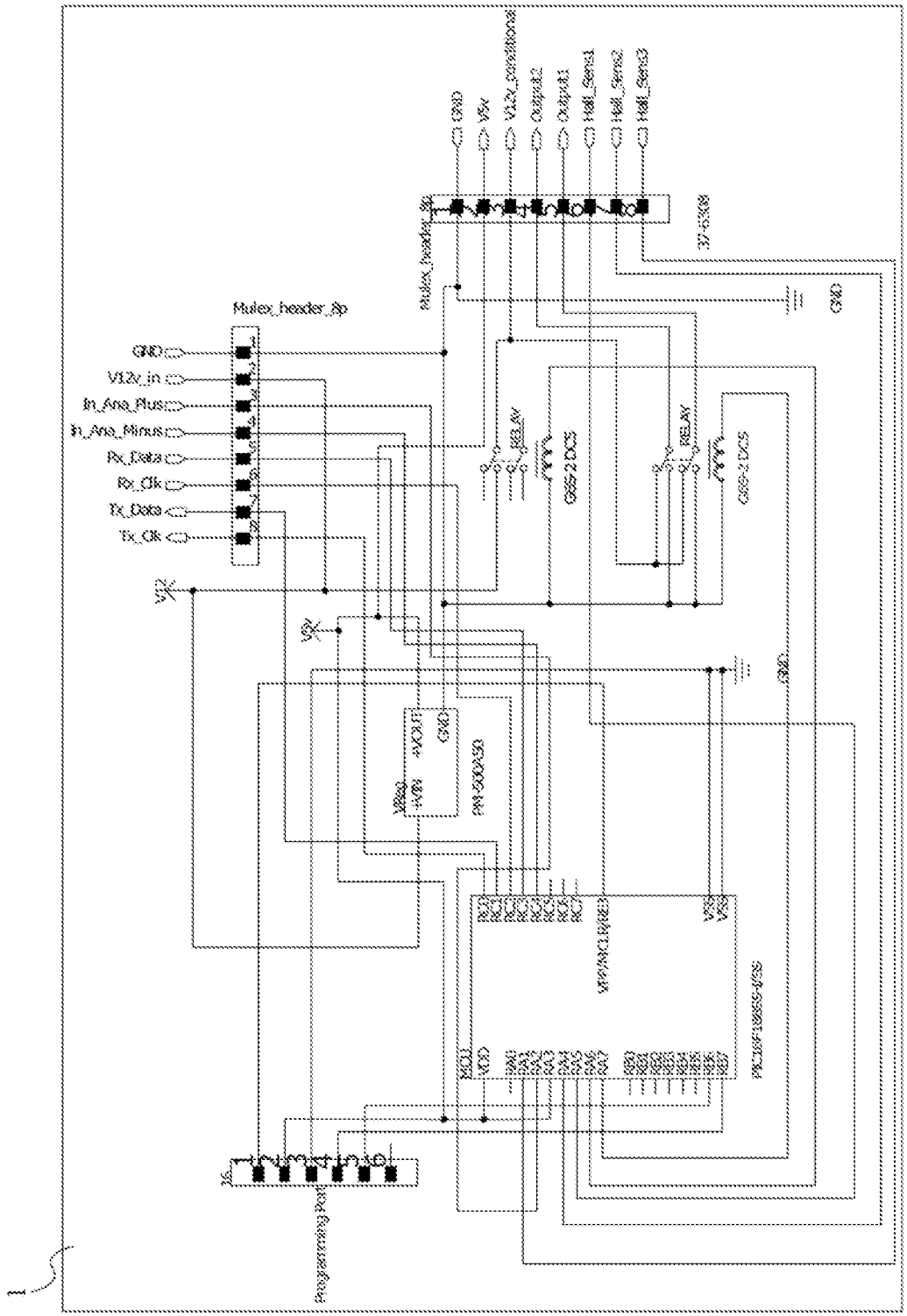
FIG. 11 is an exemplary schematic diagram of the electronic control unit.

With reference to FIG. 11, the electronic control unit 1 preferably includes a printed circuit board, a microcontroller, a DC voltage regulator, a serial communication circuit, a plurality of multi-function relays, an input terminal, an output terminal, a plurality of hall sensor inputs, a plurality of output command terminals, and a high-voltage terminal interlock circuit. The microcontroller is programmed to define the states of the electric motor 7 based on the commands received from the motor control unit 12, the state of signals received form a plurality of hall sensors, and the state of signals received from a plurality of thermal sensors. A DC supply may be supplied by the low-voltage battery of a vehicle. Voltage may be regulated and may be supplied to the microcontroller and the plurality of multi-function relays. The received commands from the motor control unit 12 board are relayed to the microcontroller. After processing the commands from the motor control unit 12, proper commands are sent to the plurality of multi-function relays. The plurality of multi-function relays configures the back EMF boosting circuit 2 in such a way that proper commands are received. The back EMF boosting circuit 2 transfers the commands to the each of the control gates of each of the plurality of first switches 13, each of the plurality of second switches 14, and each of the plurality of third switches 15.

As mentioned previously, the electronic control unit 1 is electronically connected to the back EMF boosting circuit 2 and to the motor control unit 12 by the at least one low-voltage terminal 18. Thus, high voltage may be supplied to the plurality of high-voltage terminals 6 from the motor control unit 12, and control commands may be supplied to the at least one low-voltage terminal 18 in order to configure the stage of base cell. Electrical energy from the plurality of high-voltage terminals 6 will transfer to plurality of bus bars of the back EMF boosting circuit 2 and may be received by a base cell. Accordingly, in some embodiments, the electric motor 7 may convert the electrical power of a high-voltage battery to mechanical power to drive and rotate an axle (and, thus, one or more wheels) of the vehicle. However, it will be appreciated that the electric motor 7 may be configured for a different use without departing from the scope of the present invention.

Supplemental Description

The following detailed description is merely exemplary in nature and is not intended to limit the present disclosure or the application and uses of the present disclosure. Furthermore, there is no intention to be bound by any theory presented in the preceding background or the following detailed description.

Broadly, example embodiments disclosed herein include a well-built, electric winding exchanger with different configurations with an integrated assembly into electric motors and/or electric drive modules that introduces noble performances and integration benefits to electric vehicles. The present invention is introduced for three phase powertrain systems including Phase A, Phase B, and Phase C. It is introduced with capability for connections to electric motors with two, three, or four parallel path windings. The present invention in the powertrain is specified between the electric motor 7 and the motor control unit 12. The present invention comprises a back EMF boosting circuit 2 that is isolated from control board circuit and the housing 16 using gaps and electrical insulators. The present invention may further comprise a plurality of first switches 13, a plurality of second switches 14, and a plurality of third switches 15. The control gate of each of the plurality of first switches 13, each of the plurality of second switches 14, and each of the plurality of third switches 15 is routed using solid copper bars to the terminals of the electric motor 7 and the motor control unit 12. The control gate of each of the plurality of first switches 13, the plurality of second switches 14, and the plurality of third switches 15 is connected to the circuit board of the back EMF boosting circuit 2. The electronic control unit 1 includes an internal processor and is electrically connected to low-voltage terminals for receiving commands from the motor control unit 12. Five basic commands may be received from motor control unit 12. These independent commands will be received by the at least one low-voltage terminal 18, relayed to the microprocessor of the electronic control unit 1, and the electronic control unit 1 then relays specific commands to the control gates of each of the plurality of first switches 13, each of the plurality of second switches 14, and each of the plurality of third switches 15. The commands configure each of the plurality of first switches 13, the plurality of second switches 14, and the plurality of third switches 15 in such a way that five different states can form corresponding to each specific command received from input terminals. Operation state 1 is a normal torque mode. Operation state 2 is a high-torque mode. Operation state 3 is a high-speed mode. Operation state 4 is a disconnected state. Operation state 5 is a transient state allowing transition from one state to another state. Each state, as will be discussed, this provides a number of performance benefits for overall powertrain torque speed profile. Also, the motor shaft provides higher efficiency operation, higher acceleration per electric current and higher speed per available DC bus voltage and other advantages.

In some embodiments, the back EMF boosting circuit 2 may include extra two or more phases (i.e., D, E, F, . . . ) that will be configured the same as Phase A, B, and C. The number of external high-voltage connections of the present invention for an electric motor 7, with two parallel winding, is minimum three per phase for a three phase motors and is one per phase for a 3-phase motor control unit 12. The number of external high-voltage connections of the present invention from an electric motor 7, with three parallel winding, is minimum five per phase for a three phase motors and is one per phase for a 3-phase motor control unit 12. The number of external high-voltage connections of the present invention from an electric motor 7, with four parallel winding, is minimum seven per phase for a three phase motors and is one per phase for a 3-phase motor control unit 12.

In some embodiments, the back EMF boosting circuit 2 may be external to the housing 16. In this case, the control commands may be directly received by the control gates each of the plurality of first switches 13, each of the plurality of second switches 14, and each of the plurality of third switches 15. The control commands are directly or indirectly sent by the motor control unit 12.

Also, the housing 16 may be isolated from the electric motor 7 and/or electric drive module. The housing 16 may be directly fixed to the vehicle body. The plurality of high-voltage terminals 6 may be connected to the motor terminals and to the motor control unit terminals using high-voltage cables.

The present invention can reconfigure an electric motor 7 to include a torque-speed profile with three states of a normal torque profile, a high-torque profile, and a high-speed profile. In multi-phase electric motors such as 3-phase electric motor, a torque-speed profile has a constant torque region and a constant power region, the Torque is proportional to the following equation at a constant mechanical speed of $\omega_m$.

$$T \propto \frac{E \times I}{\omega_m} \quad \text{(Eq. 1)}$$

where E is the back EMF, I is the input current [A], and $\omega_m$ is the mechanical speed. In multi-phase Permanent magnet motor the equation is further expanded to:

$$T \propto \frac{K_{pm} \times \omega_e \times N_s \times N_p \times \frac{I}{N_p}}{\omega_m} \quad \text{(Eq. 2)}$$

where $K_{pm}$ is a constant and depends on the motor airgap flux density in [Tesla], $\omega_e$ is the radian frequency of rotating magnetic field [rad/sec], and $N_s$ is the total number of series coils in a winding-set and $N_p$ is the number of winding-set in the motor (parallel paths). All of the winding sets are in parallel. It is mentioned that we might have up to several winding sets each having $$\frac{I}{N_p}$$

[Amps].

$$\frac{I}{N_p}$$

directly affects the cooling of the motor.

Using the electric winding exchanger system between an electric motor 7 and a motor control unit, the winding pattern of the electric motor 7 is reconfigured in order to change the back EMF in real time for converting a normal torque profile to a high-torque profile or a high-speed profile. The back EMF boosting is done by changing the ratio of $N_s$ and $N_p$. This is done by automatic reconfiguration of winding during operation in real-time using the electric winding exchanger system. In other words, the total series Amp turn of the motor $N_s \times I$, can be doubled, tripled, or other multiple resulting in the doubled, tripled, and multiple torque ratios. This needs to be done with certain consideration of the thermal duration limits. Similarly, in multi-phase induction motors, the equation is further expanded to:

$$T \propto \frac{K_{IN} \times I \times \omega_e \times N_s \times N_p \times \frac{I}{N_p}}{\omega_m} \quad \text{(Eq. 3)}$$

The total series Amp turn of the motor $N_s \times I$, can be doubled, tripled, or other multiple resulting in the doubled, tripled, and multiple torque ratios. Table 1 shows a typical electric motor winding pattern reconfiguration i.e. $N_p$ versus $N_s$ during the electric winding exchanger operation. For example for an electric motor 7 with two parallel winding set, normal torque will be converted to high torque profile by changing $N_s$ from $K_2$ to $2K_2$ and by changing $N_p$ from $K_1$ to $K_1/2$. This is done without the need for extra current [Amps] from the motor control unit. It is mentioned that in the electrical motor 7, the phase resistance of the electric motor 7 should be small enough (at least $$R < \left( \frac{\frac{VDC}{2\sqrt{2}} - E_{ph-n}}{N \times \max(I)} \right)$$

so that the peak current of the electric motor 7 does not significantly change when $N_s$ or corresponding electric motor resistance is increasing. $E_{ph-n}$ is the RMS of phase-neutral back EMF. In this case an increase in $E_{an}$ is always higher than decrease in max(I) and the power of the electric motor 7 increases.

TABLE 1

Configuration table of electric winding exchanger for achieving different ratio of torque profile

| $\text{Max} \frac{T(N \cdot m)}{I(A)}$ @ constant torque region | $T_m$ | $2T_m$ | $3T_m$ | ... | $NT_m$ |
|---|---|---|---|---|---|
| $N_s$ | $K_2$ | $2K_2$ | $3K_2$ | ... | $NK_2$ |
| $N_p$ | $K_1$ | $K_1/2$ | $K_1/3$ | ... | $K_1/N$ |
| $\text{Max} \frac{\omega_m(RPM)}{VDC(V)}$ @ constant Power region | $\omega_m$ | $\frac{\omega_m}{2}$ | $\frac{\omega_m}{3}$ | ... | $\frac{\omega_m}{N}$ |
| $N_s$ | $K_2$ | $2K_2$ | $3K_2$ | ... | $NK_2$ |
| $N_p$ | $K_1$ | $K_1/2$ | $K_1/3$ | ... | $K1/N$ |

Table 2 shows another typical electric motor winding pattern reconfiguration i.e. $N_p$ versus $N_s$ during the electric winding exchanger operation. For example for an electric motor 7 with two parallel winding set, normal torque is converted to low torque profile by changing $N_s$ from $K_2$ to $K_2/2$ and by changing $N_p$ from $K_1$ to $2K_1$. This is done without excessive the need for voltage from electric high voltage DC bus.

TABLE 2

Configuration table of electric winding exchanger for achieving wide-torque speed range

| $\text{Max} \frac{T(N \cdot m)}{\max I(A)}$ @ constant torque region | $T_m$ | $T_m/2$ | $T_m/3$ | ... | $T_m/N$ |
|---|---|---|---|---|---|
| $N_s$ | $K_2$ | $K_2/2$ | $K_2/3$ | ... | $K_2/N$ |
| $N_p$ | $K_1$ | $2K_1$ | $3K_1$ | ... | $NK_1$ |
| $\text{Max} \frac{\omega_m(RPM)}{VDC(V)}$ @ constant Power region | $\omega_m$ | $2\omega_m$ | $3\omega_m$ | ... | $N\omega_m$ |
| $N_s$ | $K_2$ | $K_2/2$ | $K_2/3$ | ... | $K_2/N$ |
| $N_p$ | $K_1$ | $2K_1$ | $3K_1$ | ... | $NK_1$ |

The torque-speed profile is the functional performance of an electric motor shaft located in a powertrain including 3-phase electric motor winding, the plurality of high-voltage terminals 6 of the present invention, the high-voltage terminals of the motor control unit 12, and the high-voltage terminals of a battery. Physical location of the plurality of high-voltage terminals 6 of the present invention is preferably in an electric motor high-voltage terminal box, in a motor control unit high-voltage terminal box, or external housing 16 between the electric motor 7 and motor control unit 12. From the motor control unit high-voltage terminals, the present invention and motor control unit 12 have an equal number of terminals. For example, for a 3-phase system, each have 3 terminals. From motor winding coils set, the present invention includes a maximum $2 \times P \times N_p$ terminals and minimum $((2 \times P \times N_p)-P)$ for a P-phase system. From the motor control unit high-voltage side, E-Glutch always has P terminals.

Figure 13:
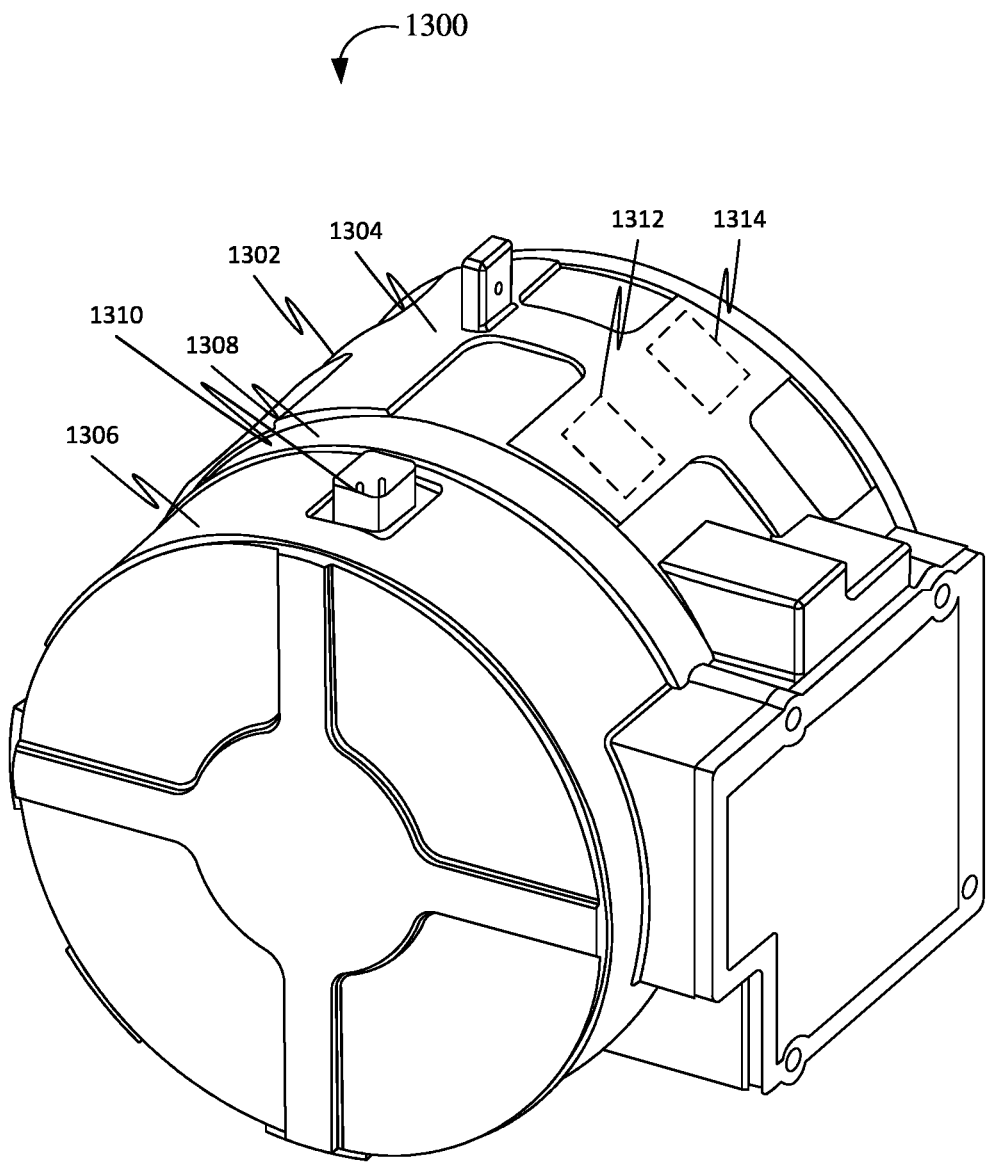
FIG. 13 is a top perspective view of an integrated assembly of an electric winding exchanger system and a multiphase electric motor, in accordance with some embodiments.

FIG. 13 is a top perspective view of an integrated assembly 1300 of an electric winding exchanger system 1408 and a multiphase electric motor 1406, in accordance with some embodiments. Accordingly, the integrated assembly 1300 may include a housing 1302, the multiphase electric motor 1406, and the electric winding exchanger system 1408.

Further, the housing 1302 may include a first housing portion 1304, a second housing portion 1306, and a partition 1308. Further, the first housing portion 1304 may include a first interior space 1402 and the second housing portion 1306 may include a second interior space 1404. Further, the partition 1308 separates the first interior space 1402 from the second interior space 1404. Further, the first housing portion 1304 may be configured for housing the multiphase electric motor 1406 in the first interior space 1402. Further, the second housing portion 1306 may be configured for housing the electric winding exchanger system 1408 in the second interior space 1404.

Further, the multiphase electric motor 1406 may include N number of neutrals.

Further, the electric winding exchanger system 1408 may include a back electromotive force (EMF) boosting circuit 1414. Further, the back EMF boosting circuit 1414 may include a plurality of switches 1522-1538 and a plurality of bus bars 1502-1520. Further, a state of each of the plurality of switches 1522-1538 may be transitionable between an on state and an off state. Further, the plurality of bus bars 1502-1520 may be configured for connecting the plurality of switches 1522-1538. Further, the plurality of switches 1522-1538 may be controllable. Further, the partition 1308 may include a plurality of openings 1410-1412 for facilitating integrating the multiphase electric motor 1406 with the electric winding exchanger system 1408. Further, a plurality of leads of a plurality of coils of the multiphase electric motor 1406 enters the second interior space 1404 through a first opening 1410 of the plurality of openings 1410-1412 for connecting a plurality of terminals of the plurality of leads of the plurality of coils to the plurality of bus bars 1502-1520.

In further embodiments, the integrated assembly 1300 may include a plurality of sensors 1312-1314. Further, the plurality of sensors 1312-1314 may be disposed in the first interior space 1402. Further, a plurality of leads of the plurality of sensors 1312-1314 enters the second interior space 1404 through a second opening 1412 of the plurality of openings 1410-1412 for connecting a plurality of terminals of the plurality of leads to at least one low-voltage terminal 1310 mounted on the second housing portion 1306. Further, the plurality of sensors 1312-1314 may include a thermal sensor and a rotor position sensor.

Further, in some embodiments, the plurality of switches 1522-1538 may include nine switches 1522-1538. Further, each of the nine switches 1522-1538 may include a first terminal (1540, 1544, 1548, 1552, 1556, 1560, 1564, 1568, and 1572) and a second terminal (1542, 1546, 1550, 1554, 1558, 1562, 1566, 1570, and 1574). Further, the nine switches 1522-1538 may include three sets of switches (1522-1526, 1528-1532, and 1534-1538) corresponding to three phases of the multiphase electric motor 1406. Further, each of the three sets of switches (1522-1526, 1528-1532, and 1534-1538) may include a first switch (1522, 1528, and 1534), a second switch (1524, 1530, and 1536), and a third switch (1526, 1532, and 1538). Further, in an embodiment, the electric winding exchanger system 1408 further may include three mechanical arms 1804-1808. Further, each of the three mechanical arms 1804-1808 may be coupled with each of the three sets of switches (1522-1526, 1528-1532, and 1534-1538). Further, each of the three mechanical arms 1804-1808 may be configurable for transitioning the state each of the first switch (1522, 1528, and 1534), the second switch (1524, 1530, and 1536), and the third switch (1526, 1532, and 1538) of each of the three sets of switches (1522-1526, 1528-1532, and 1534-1538) between the on state and the off state for enabling one or more sequence of states in the nine switches 1522-1538. Further, in an embodiment, the electric winding exchanger system 1408 may include a motorized electromechanical actuator 1802. Further, the motorized electromechanical actuator 1802 may be operably coupled with each of the three mechanical arms 1804-1808. Further, the motorized electromechanical actuator 1802 may be configured for transitioning at least one of the three mechanical arms 1804-1808 between a plurality of arms states. Further, the transitioning of at least one of the three mechanical arms 1804-1808 transitions the state of at least one of the first switch (1522, 1528, and 1534), the second switch (1524, 1530, and 1536), and the third switch (1526, 1532, and 1538) of at least one of the three sets of switches (1522-1526, 1528-1532, and 1534-1538) associated with at least one of the three mechanical arms 1804-1808 between the on state and the off state.

Further, in an embodiment, the plurality of bus bars 1502-1520 may include ten bus bars 1502-1520. Further, the ten bus bars 1502-1520 may include a neutral bus bar 1502 and three sets of bus bars (1504-1508, 1510-1514, and 1516-1520) corresponding to the three phases. Further, each of the three sets of bus bars (1504-1508, 1510-1514, and 1516-1520) may include a first bus bar (1504, 1510, and 1516), a second bus bar (1506, 1512, and 1518), and a third bus bar (1508, 1514, and 1520).

Further, in some embodiment, the first bus bar (1504, 1510, and 1516) of each of the three sets of bus bars (1504-1508, 1510-1514, and 1516-1520) may be attached to a second terminal (1542, 1554, and 1566) of the first switch (1522, 1528, and 1534) of each of the three sets of switches (1522-1526, 1528-1532, and 1534-1538) and a first terminal (1544, 1556, and 1568) of the second switch (1524, 1530, and 1536) of each of the three sets of switches (1522-1526, 1528-1532, and 1534-1538). Further, the second bus bar (1506, 1512, and 1518) of each of the three sets of bus bars (1504-1508, 1510-1514, and 1516-1520) may be attached to a second terminal (1546, 1558, and 1570) of the second switch (1524, 1530, and 1536) of each of the three sets of switches (1522-1526, 1528-1532, and 1534-1538) and a first terminal of the third switch (1526, 1532, and 1538) of each of the three sets of switches (1522-1526, 1528-1532, and 1534-1538). Further, the third bus bar (1508, 1514, and 1520) of each of the three sets of bus bars (1504-1508, 1510-1514, and 1516-1520) may be attached to a second terminal (1550, 1562, and 1574) of the third switch (1526, 1532, and 1538) of each of the three sets of switches (1522-1526, 1528-1532, and 1534-1538). Further, the neutral bus bar 1502 may be attached to a first terminal of the first switch (1522, 1528, and 1534) of each of the three sets of switches (1522-1526, 1528-1532, and 1534-1538).

Further, in an embodiment, the plurality of terminals of the plurality of leads may include three sets of terminals. Further, each of the three sets of terminals may include a first terminal, a second terminal, and a third terminal. Further, the first terminal of each of the three sets of terminals may be attached to the first bus bar (1504, 1510, and 1516) of each of the three sets of bus bars (1504-1508, 1510-1514, and 1516-1520). Further, the second terminal of each of the three sets of terminals may be attached to the second bus bar (1506, 1512, and 1518) of each of the three sets of bus bars (1504-1508, 1510-1514, and 1516-1520). Further, the third terminal of each of the three sets of terminals may be attached to the third bus bar (1508, 1514, and 1520) of each of the three sets of bus bars (1504-1508, 1510-1514, and 1516-1520).

Further, in an embodiment, the second housing portion 1306 may include at least one housing opening 1702 leading into the second interior space 1404. Further, a plurality of leads of a three phase electric motor controller disposed exterior to the housing 1302 enters the second interior space 1404 through the at least one housing opening 1702 for connecting a plurality of terminals of the plurality of leads of the three phase electric motor controller to the back EMF boosting circuit 1414. Further, the plurality of terminals may include three terminals. Further, each of the three terminals may be attached to the third bus bar (1508, 1514, and 1520) of each of the three sets of bus bars (1504-1508, 1510-1514, and 1516-1520).

Further, in some embodiments, the plurality of coils may be connected in parallel forming a plurality of parallel coil paths.

Further, in some embodiments, the plurality of coils may be connected in series forming a plurality of series coil paths.

Figure 14:
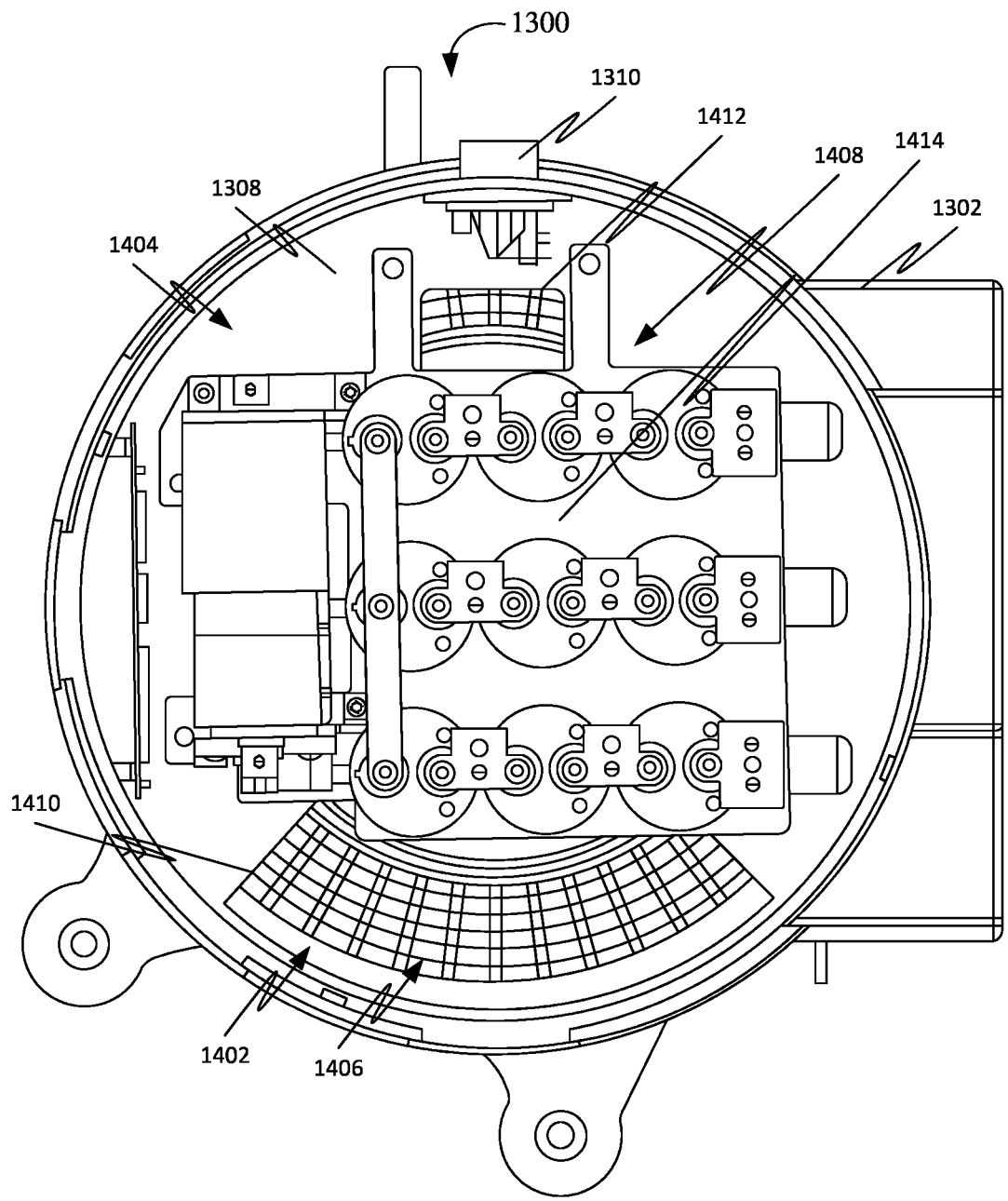
FIG. 14 is a front cross-sectional view of the integrated assembly, in accordance with some embodiments.

FIG. 14 is a front cross-sectional view of the integrated assembly 1300, in accordance with some embodiments.

Figure 15:
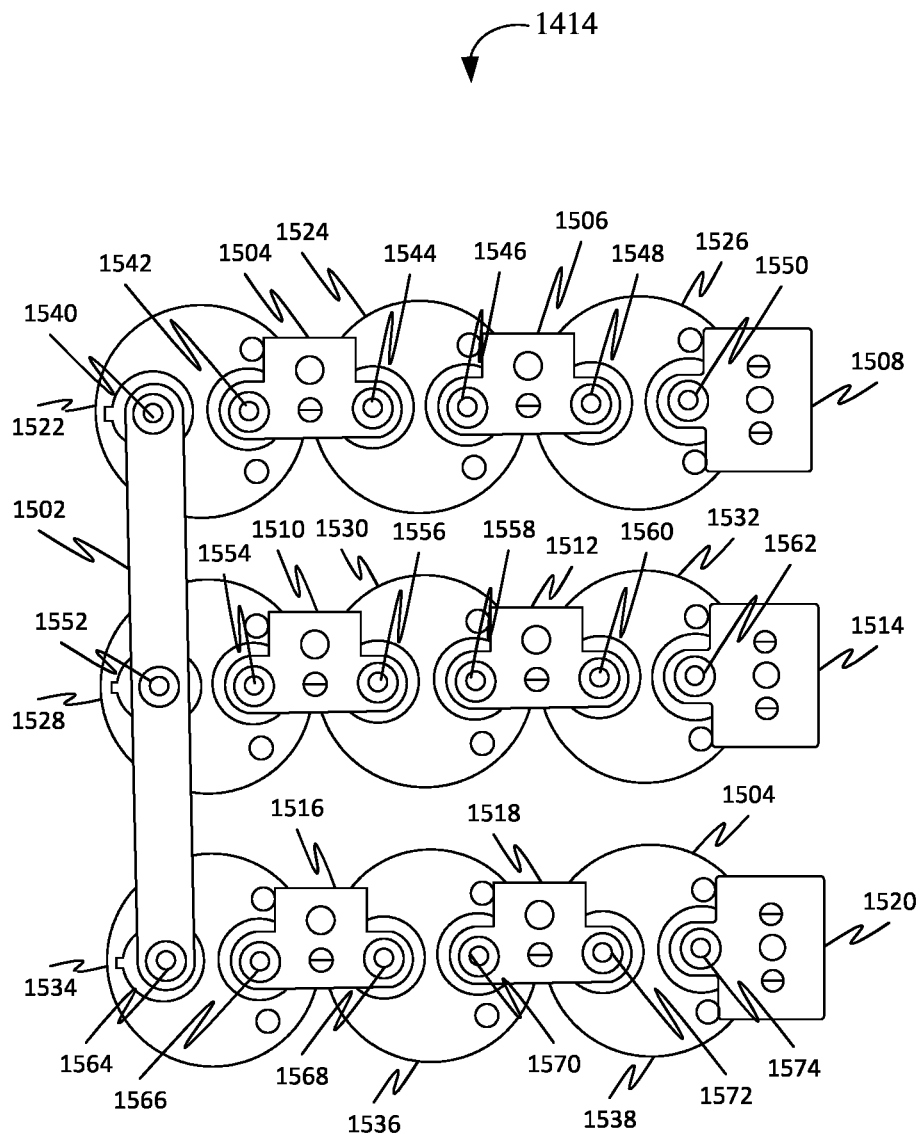
FIG. 15 is a top view of the back EMF boosting circuit, in accordance with some embodiments.

FIG. 15 is a top view of the back EMF boosting circuit 1414, in accordance with some embodiments.

Figure 16:
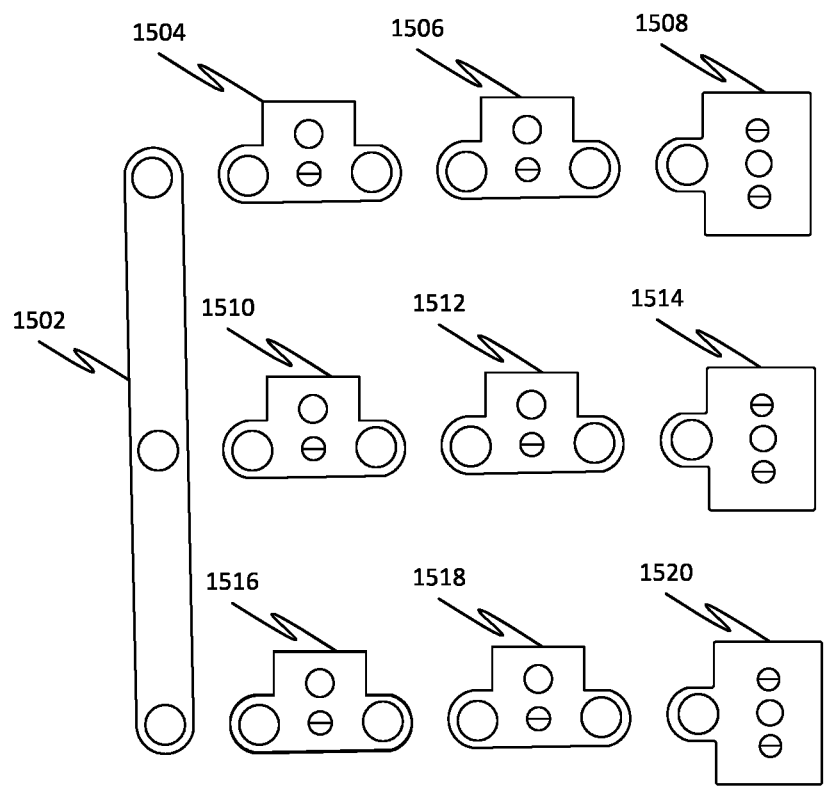
FIG. 16 is a top view of the plurality of bus bars, in accordance with some embodiments.

FIG. 16 is a top view of the plurality of bus bars 1502-1520, in accordance with some embodiments.

Figure 17:
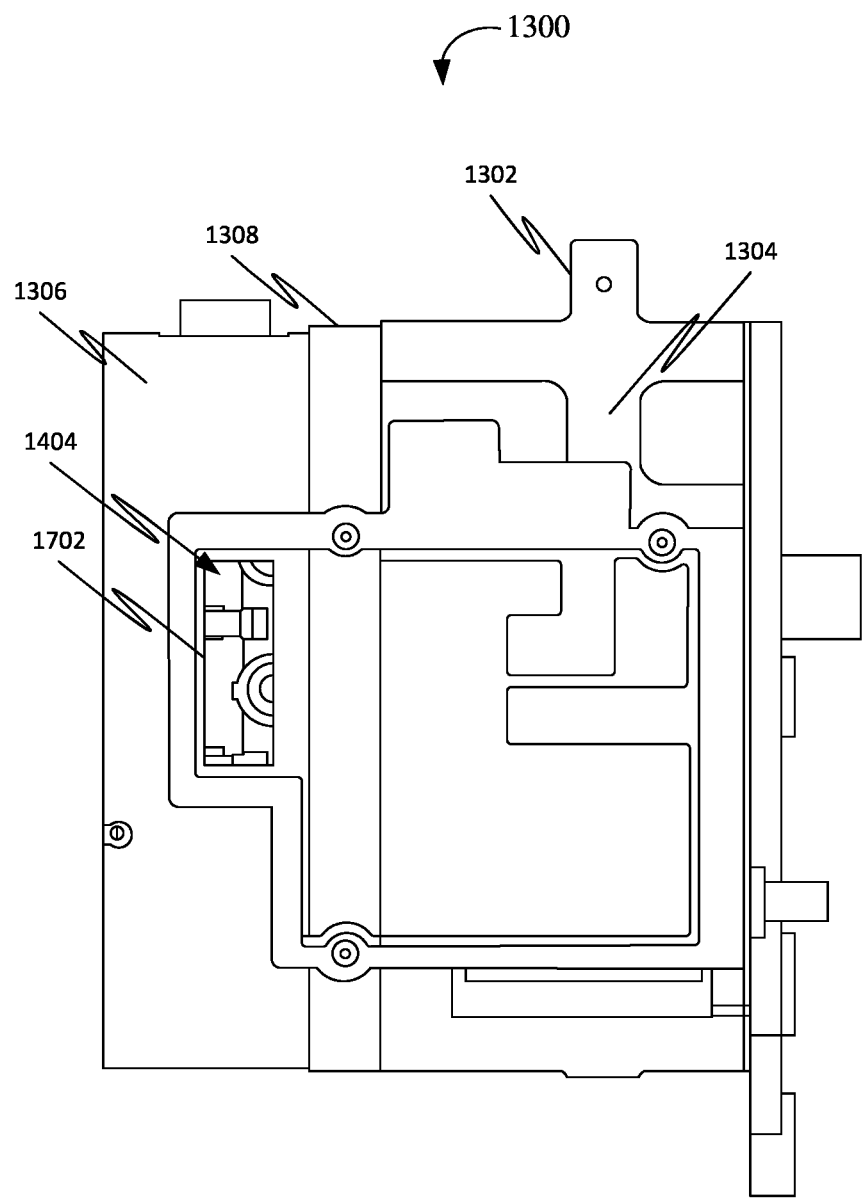
FIG. 17 is a right side view of the integrated assembly, in accordance with some embodiments.

FIG. 17 is a right side view of the integrated assembly 1300, in accordance with some embodiments.

Figure 18:
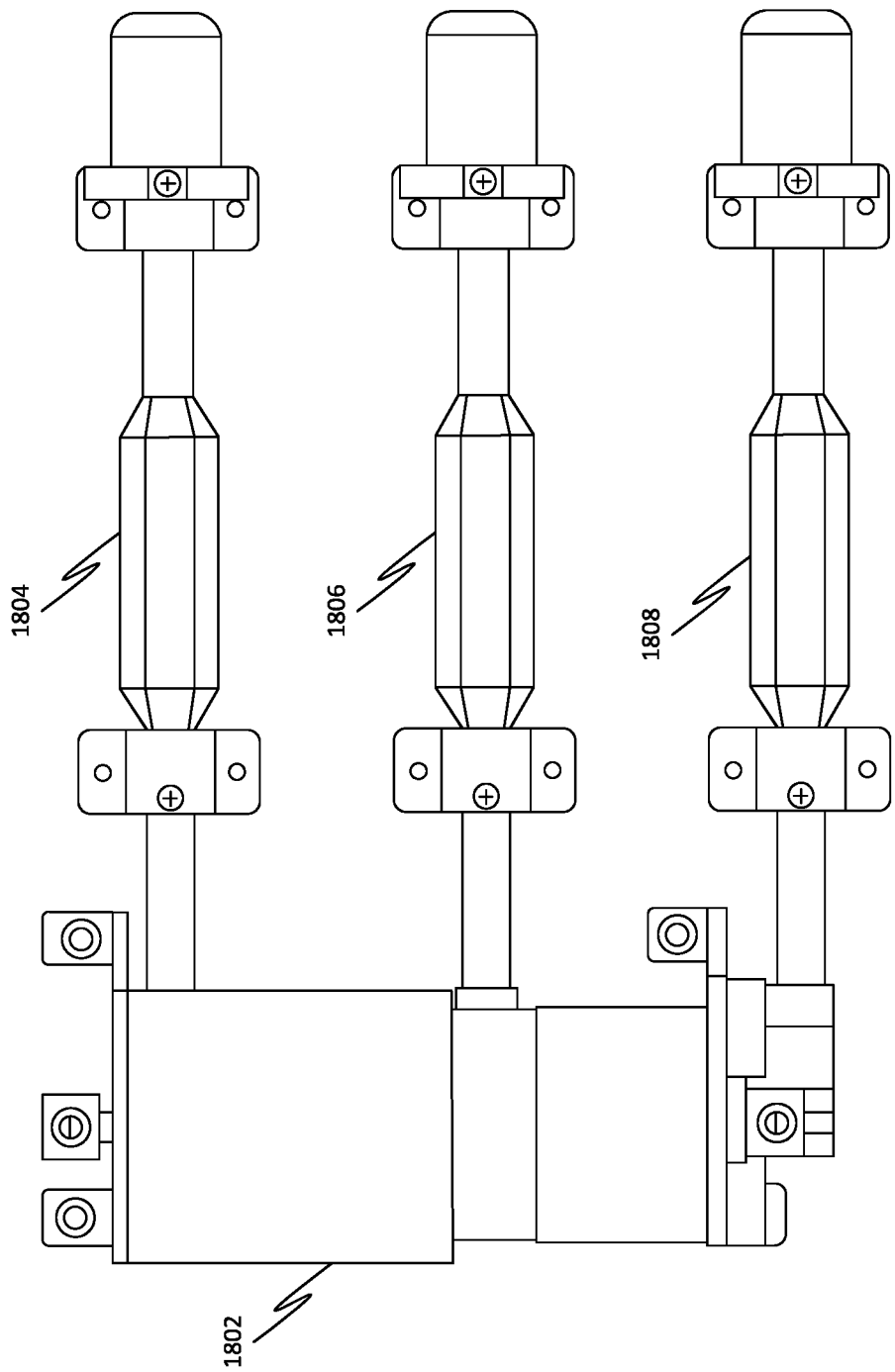
FIG. 18 is a top view of the three mechanical arms and the motorized electromechanical actuator, in accordance with some embodiments.

FIG. 18 is a top view of the three mechanical arms 1804-1808 and the motorized electromechanical actuator 1802, in accordance with some embodiments.

Figure 19:
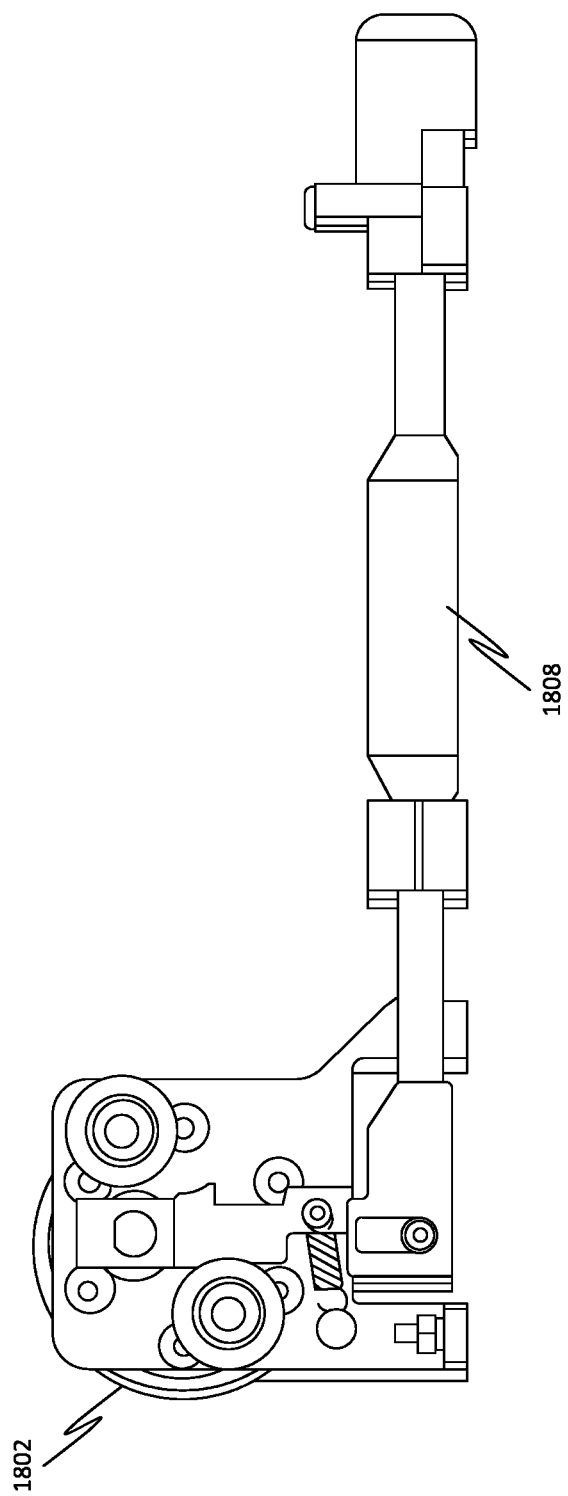
FIG. 19 is a side view of the three mechanical arms and the motorized electromechanical actuator, in accordance with some embodiments.

FIG. 19 is a side view of the three mechanical arms 1804-1808 and the motorized electromechanical actuator 1802, in accordance with some embodiments.

Figure 20:
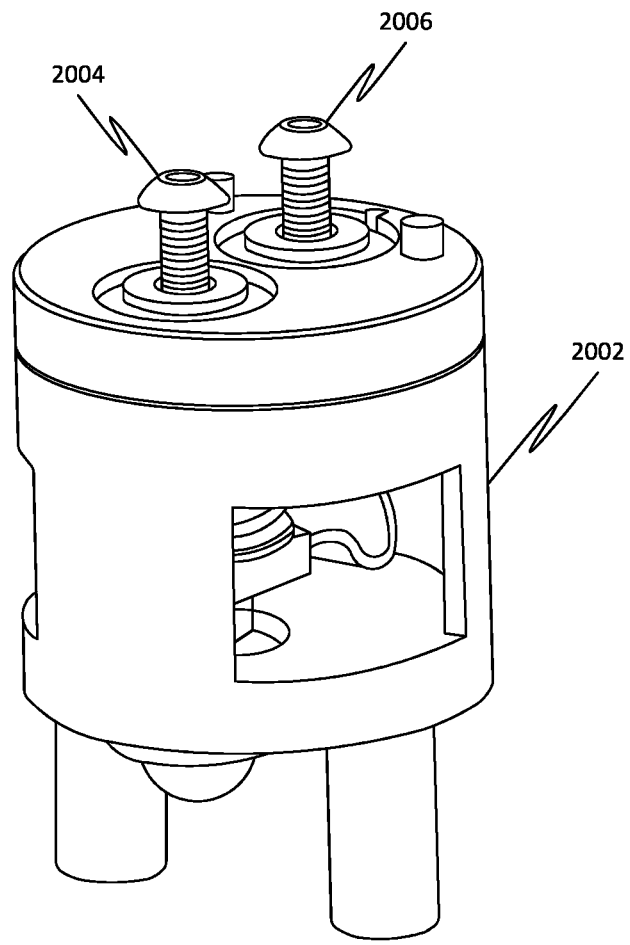
FIG. 20 is a top perspective view of a switch of the back EMF boosting circuit, in accordance with some embodiments.

FIG. 20 is a top perspective view of a switch 2002 of the back EMF boosting circuit 1414, in accordance with some embodiments. Further, the switch 2002 may include two terminals 2004-2006.

Figure 21:
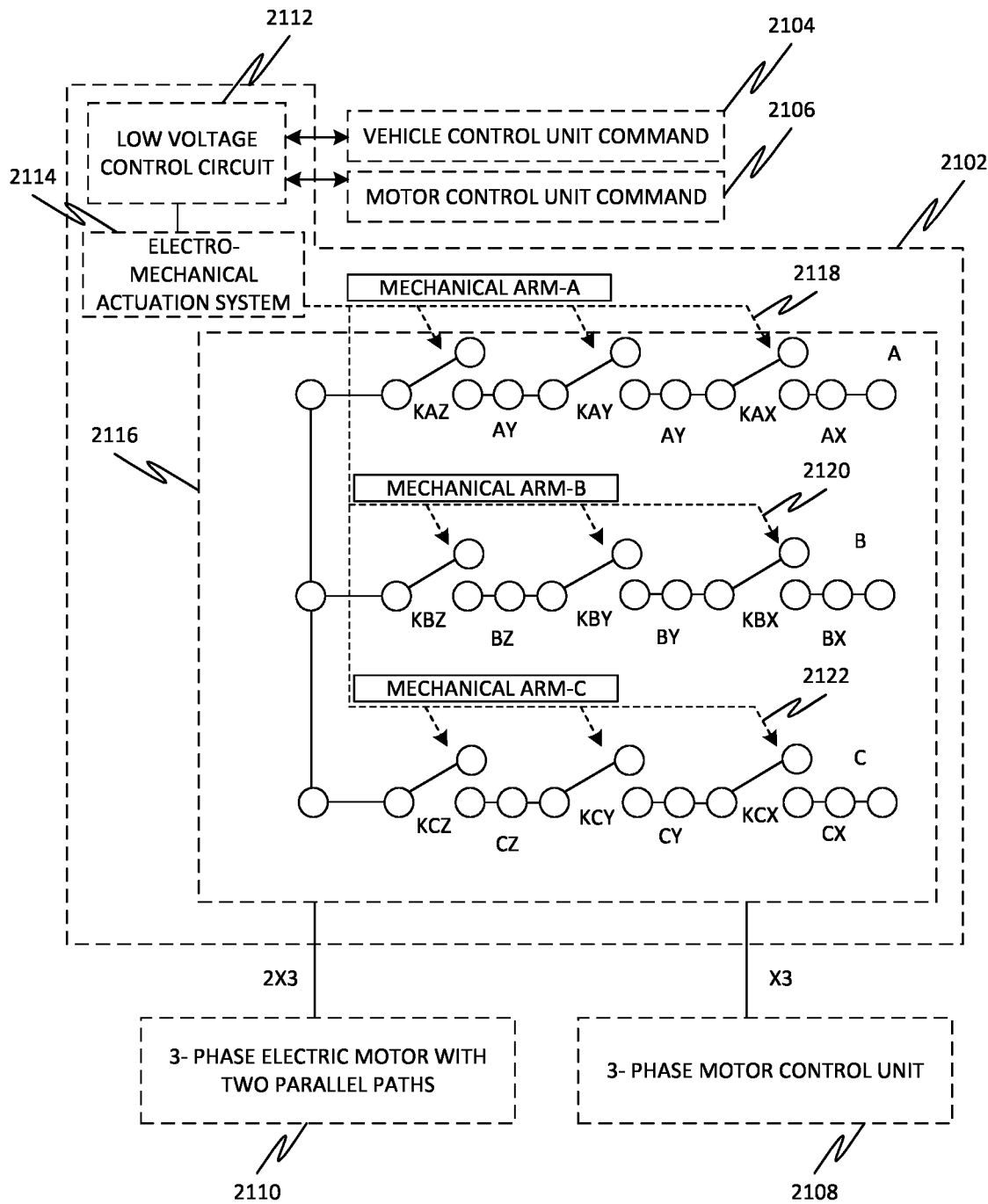
FIG. 21 is a block diagram of an integrated assembly of an electric winding exchanger system and a three-phase electric motor, in accordance with some embodiments.

FIG. 21 is a block diagram of an integrated assembly 2100 of an electric winding exchanger system 2102 and a three-phase electric motor 2110, in accordance with some embodiments. Further, the integrated assembly 2100 may include the electric winding exchanger system 2102, the three-phase electric motor 2110, and three-phase motor control unit. Further, the electric winding exchanger system 2102 may include a back EMF boosting circuit 2116, an electromechanical actuation system 2114, and a low voltage control circuit 2112. Further, the low voltage control circuit 2112 may be electrically coupled with the electromechanical actuation system 2114. Further, the low voltage control circuit 2112 may be electrically coupled with a vehicle control unit command 2104 and a motor control unit command 2106. Further, the electromechanical actuation system 2114 may be electrically coupled with mechanical arms 2118-2122 associated with the back EMF boosting circuit 2116. Further, the mechanical arms 2118-2122 may be operation coupled with one or more high voltage controllable switches associated with the back EMF boosting circuit 2116. Further, the back EMF boosting circuit 2116 may be electrically coupled with the three-phase electric motor 2110 through two 3-phase parallel paths. Further, the back EMF boosting circuit 2116 may be electrically coupled with a three-phase motor control unit 2108 through a single 3-phase parallel path.

Figure 22:
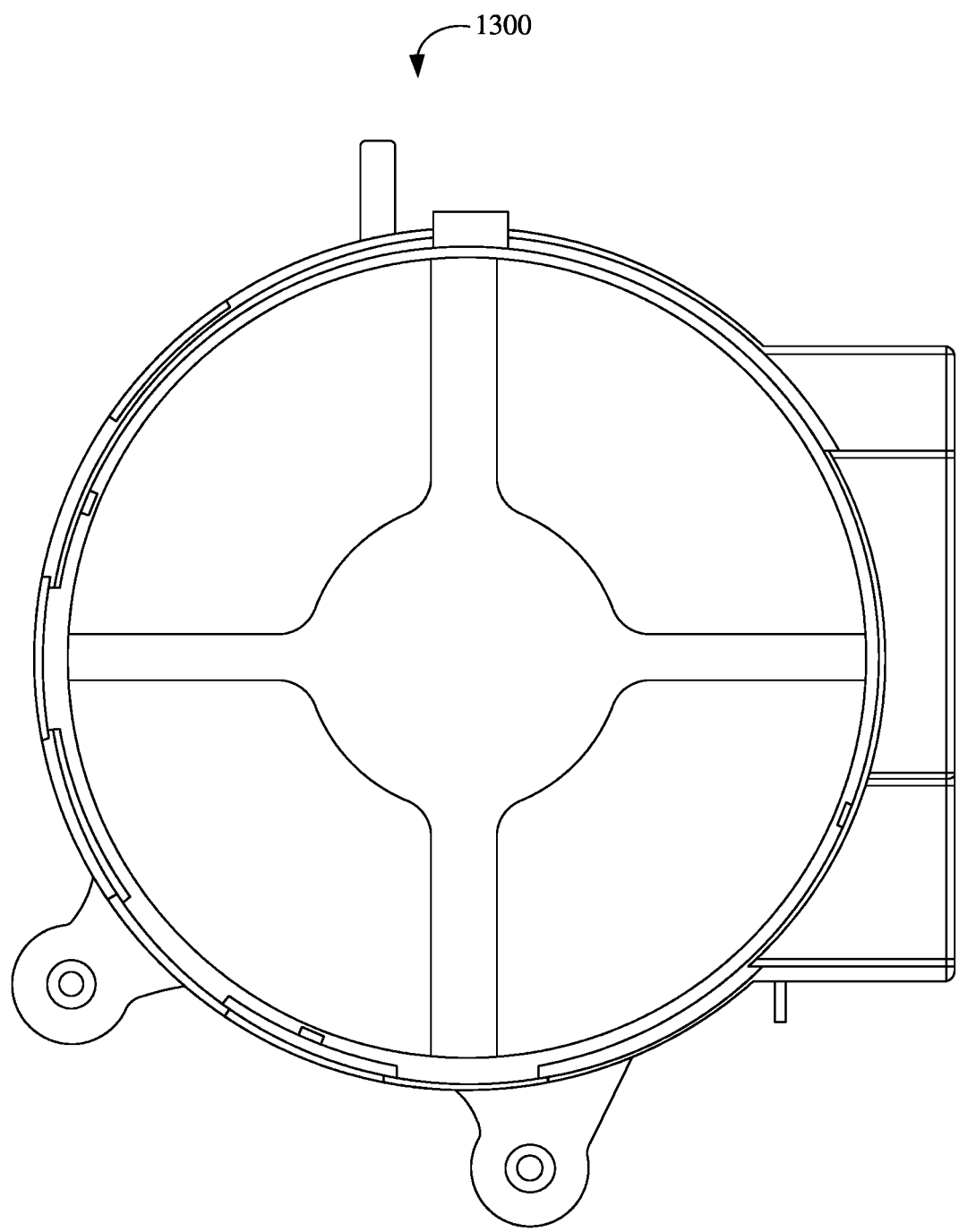
FIG. 22 is a front view of the integrated assembly, in accordance with some embodiments.

FIG. 22 is a front view of the integrated assembly 1300, in accordance with some embodiments.

Figure 23:
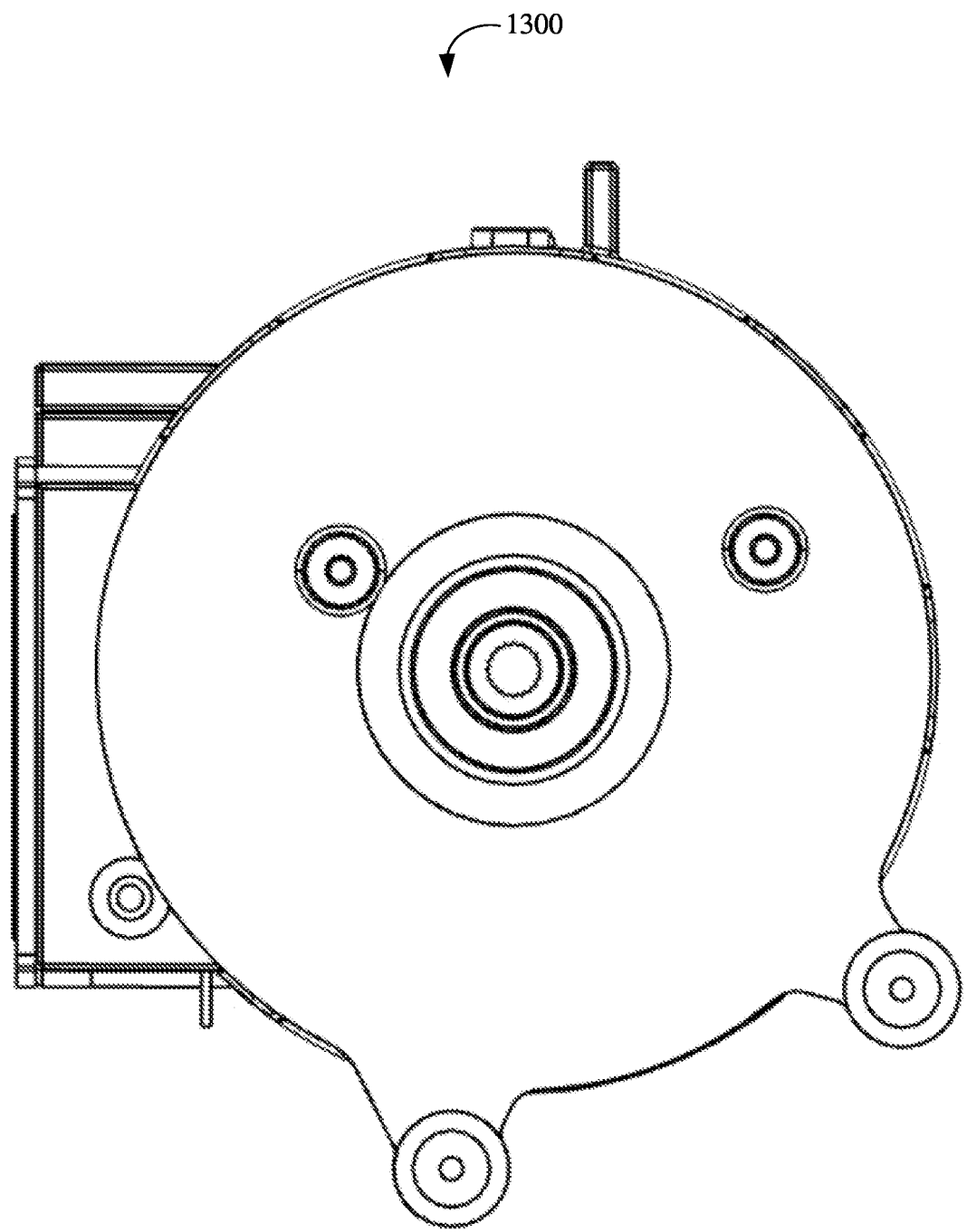
FIG. 23 is a rear view of the integrated assembly, in accordance with some embodiments.

FIG. 23 is a rear view of the integrated assembly 1300, in accordance with some embodiments.

Figure 24:
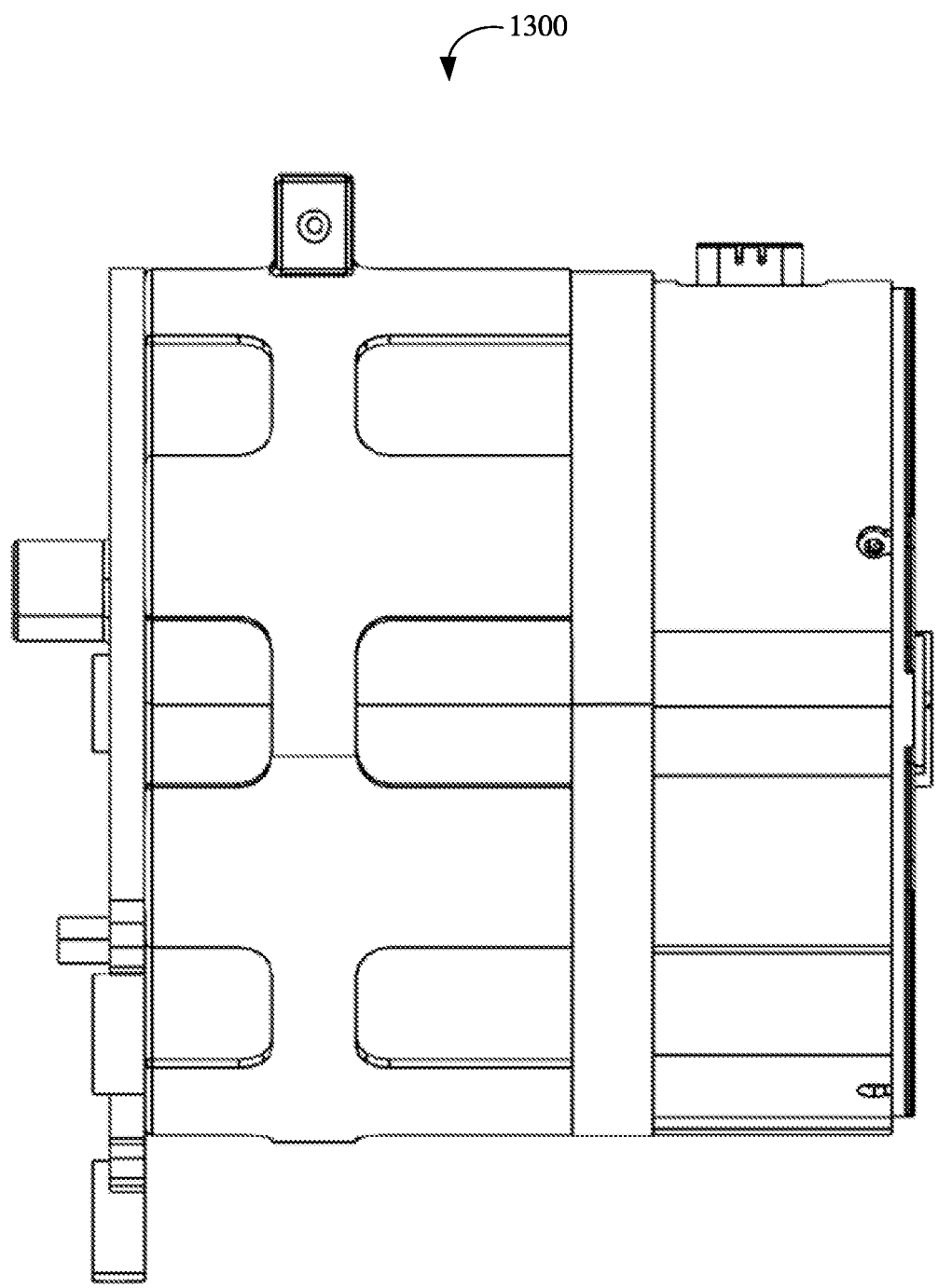
FIG. 24 is a left side view of the integrated assembly, in accordance with some embodiments.

FIG. 24 is a left side view of the integrated assembly 1300, in accordance with some embodiments.

Figure 25:
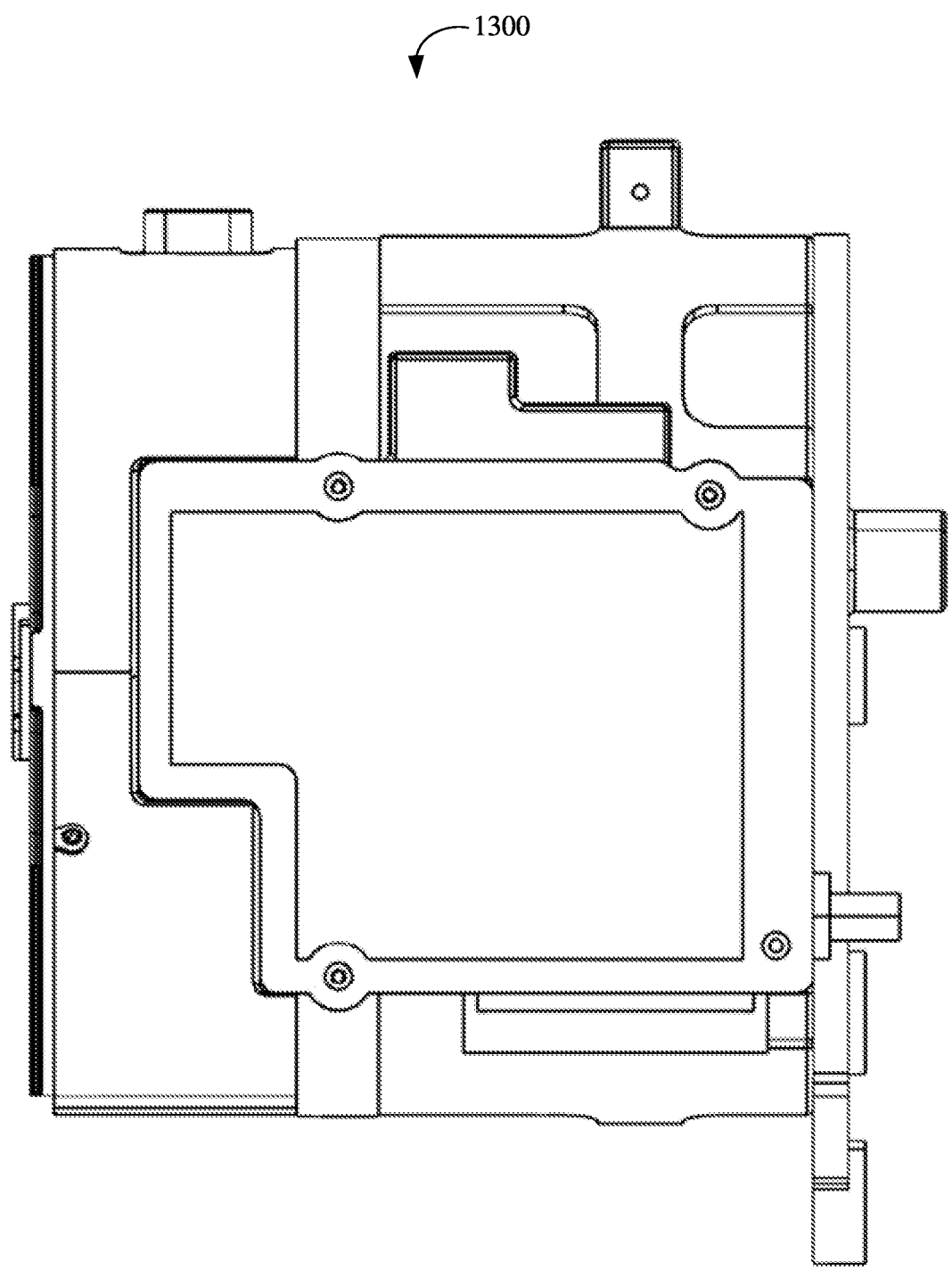
FIG. 25 is a right side view of the integrated assembly, in accordance with some embodiments.

FIG. 25 is a right side view of the integrated assembly 1300, in accordance with some embodiments.

Figure 26:
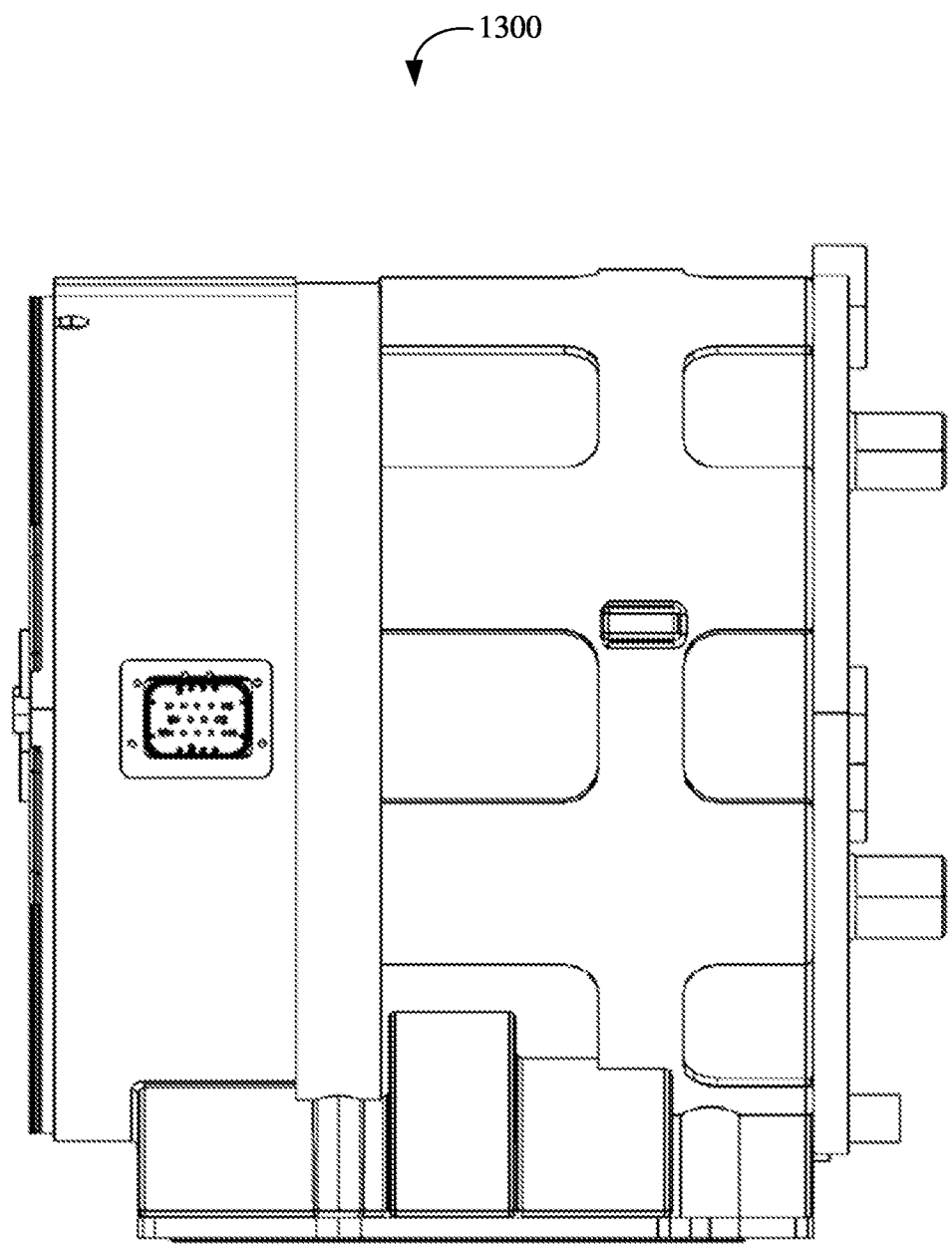
FIG. 26 is a top view of the integrated assembly, in accordance with some embodiments.

FIG. 26 is a top view of the integrated assembly 1300, in accordance with some embodiments.

Figure 27:
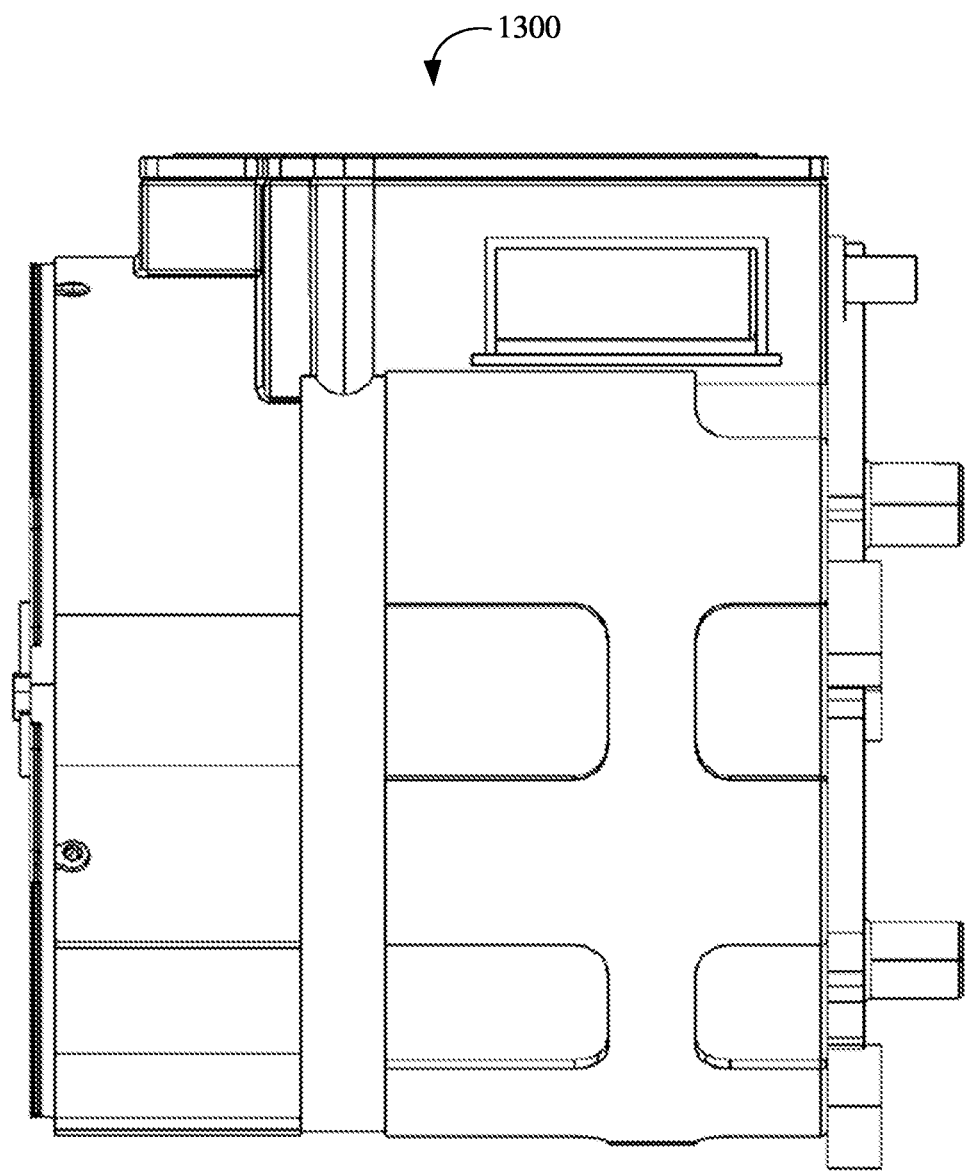
FIG. 27 is a bottom view of the integrated assembly, in accordance with some embodiments.

FIG. 27 is a bottom view of the integrated assembly 1300, in accordance with some embodiments.

Figure 28:
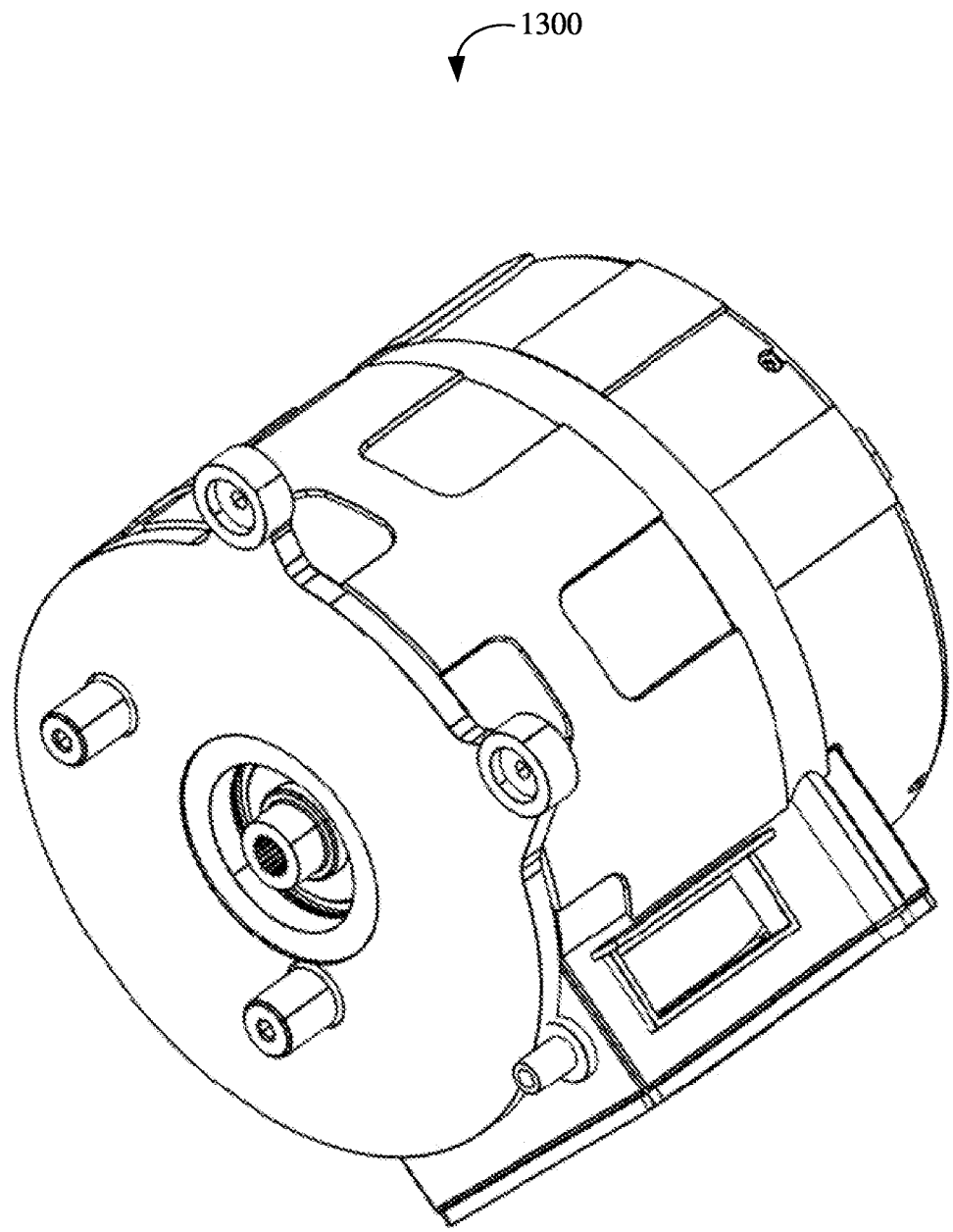
FIG. 28 is a bottom perspective view of the integrated assembly, in accordance with some embodiments.

FIG. 28 is a bottom perspective view of the integrated assembly 1300, in accordance with some embodiments.

Figure 29:
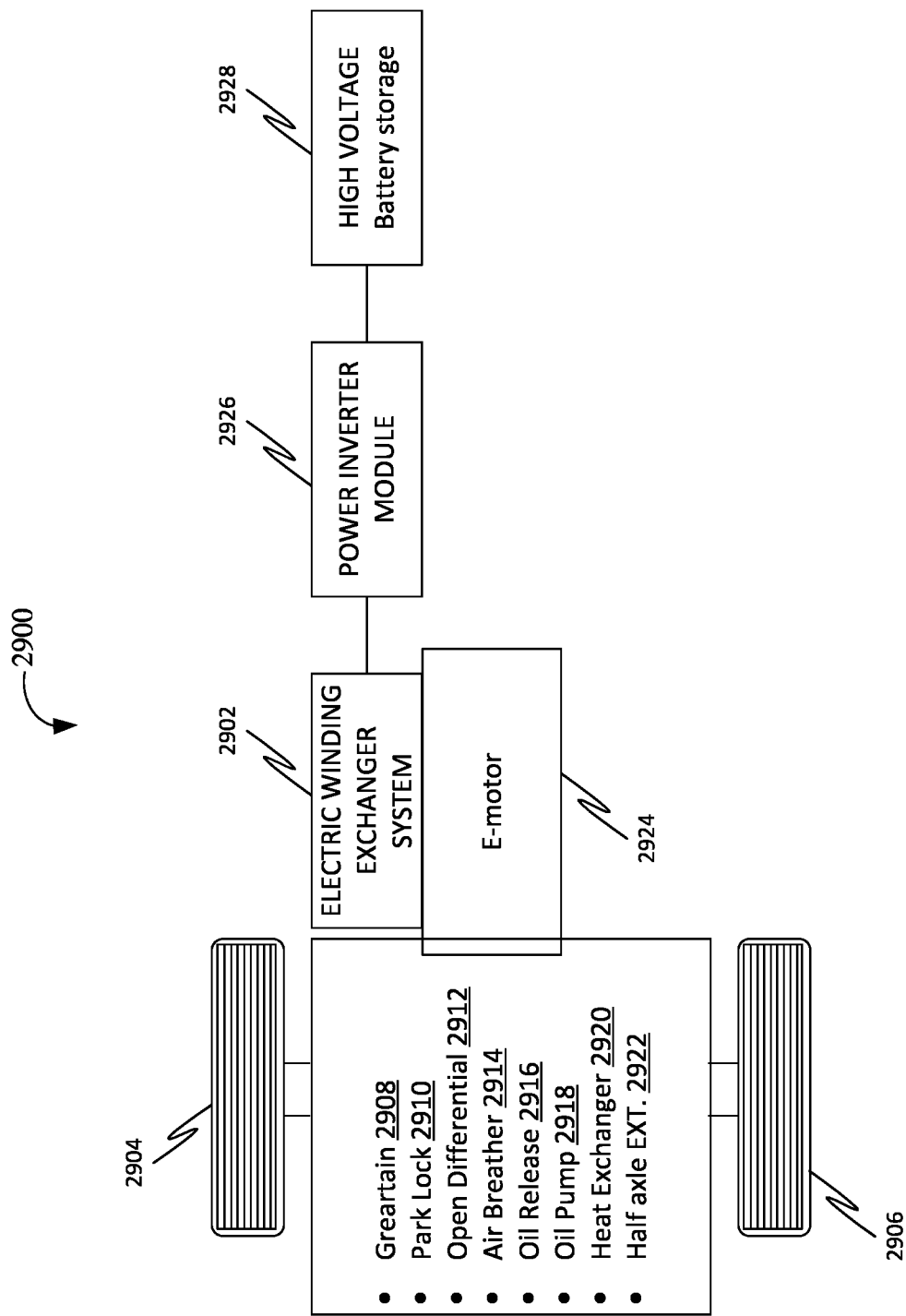
FIG. 29 is a block diagram of an electric winding exchanger system integrated into an electric vehicle electric drive unit, in accordance with some embodiments.

FIG. 29 is a block diagram of an electric winding exchanger system 2902 integrated into an electric vehicle electric drive unit 2900, in accordance with some embodiments. Further, the electric vehicle electric drive unit 2900 may include at least one wheel 2904-2906, a geartrain 2908, a park lock 2910, an open differential 2912, an air breather 2914, an oil release 2916, an oil pump 2918, a heat exchanger 2920, a half axle extension 2922, an electric motor 2924, a power inverter module 2926, and a high voltage battery storage 2928. Further, the electric winding exchanger system 2902 may interface with the electric motor 2924 and the power inverter module 2926.

Figure 30:
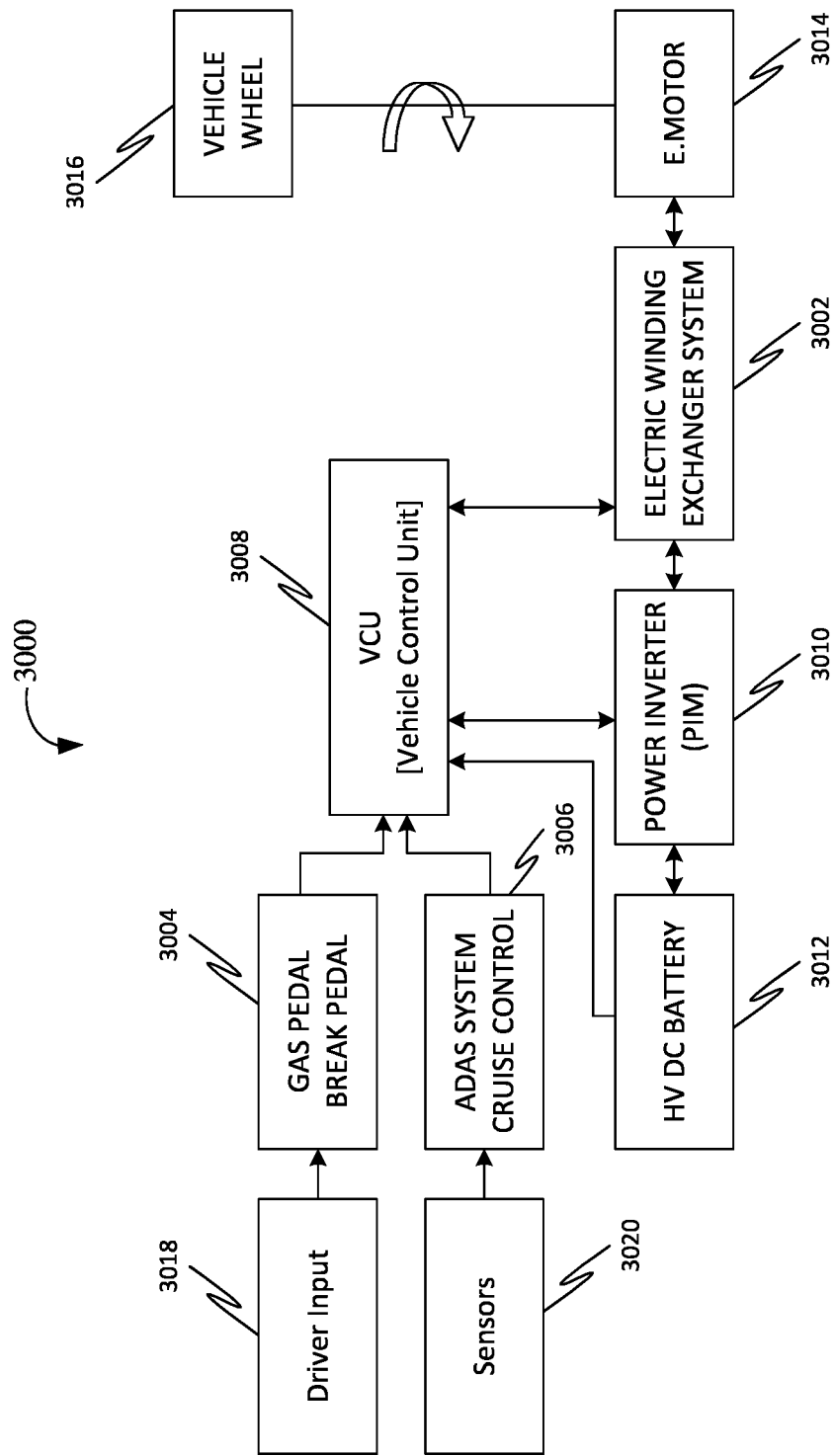
FIG. 30 is a block diagram of an electric winding exchanger system with an electric vehicle system, in accordance with some embodiments.

FIG. 30 is a block diagram of an electric winding exchanger system 3002 with an electric vehicle system 3000, in accordance with some embodiments. Further, the electric vehicle system 3000 may include a gas pedal and brake pedal 3004, an ADAS system cruise control 3006, a vehicle control unit (VCU) 3008, a power inverter (PIM) 3010, an HV DC battery 3012, an electric motor 3014, and at least one vehicle wheel 3016. Further, the gas pedal and brake pedal 3004, the ADAS system cruise control 3006, the HV DC battery 3012, and the power inverter 3010 may be coupled with the VCU 3008. Further, the electric winding exchanger system 3002 interfaces with the VCU 3008, the power inverter 3010, and the electric motor 3014. Further, the electric motor 3014 may be mechanically coupled with the at least one vehicle wheel 3016. Further, the gas pedal and brake pedal 3004 receive an input from a driver 3018. Further, the ADAS system cruise control 3006 receives an input from sensors 3020.

Figure 31:
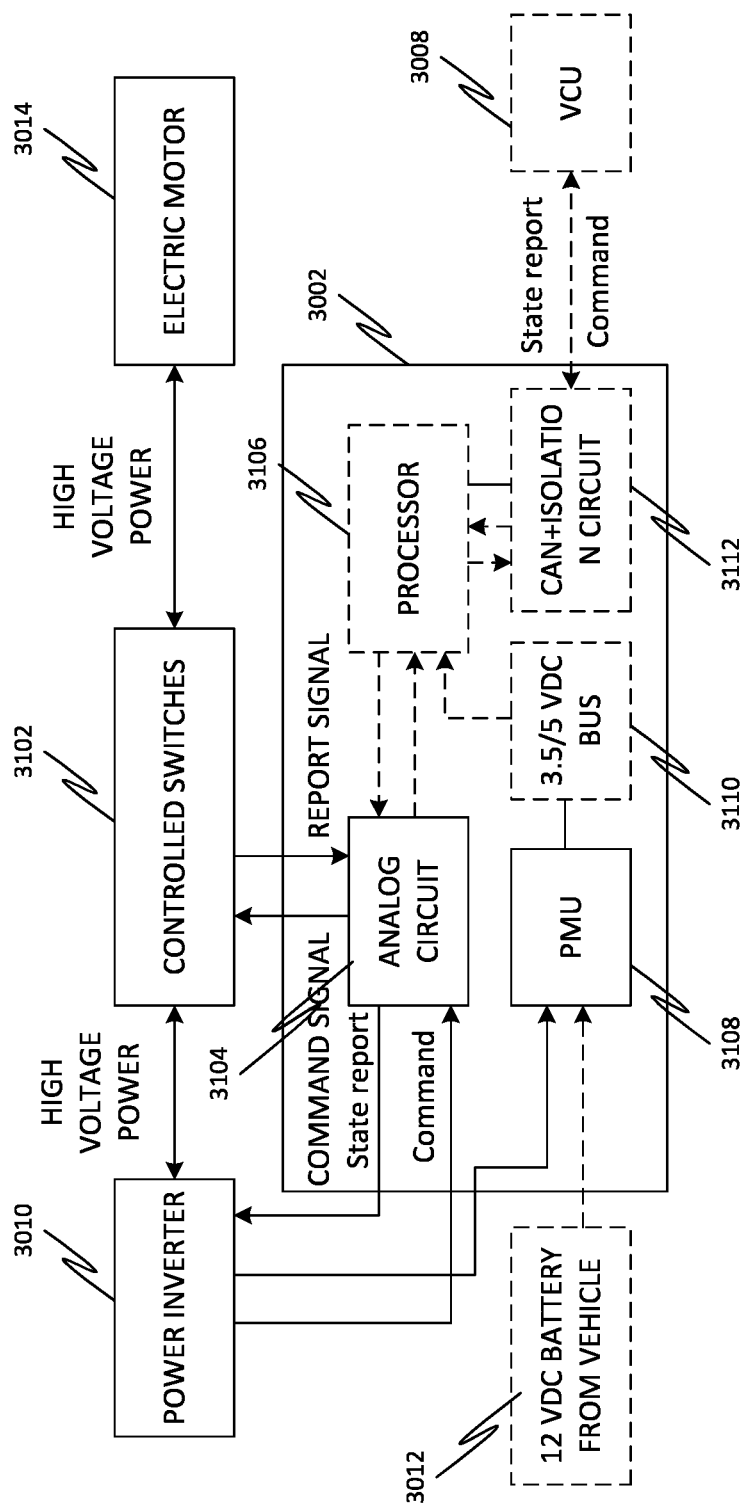
FIG. 31 is a block diagram of the electric winding exchanger system with controlled switches, in accordance with some embodiments.

FIG. 31 is a block diagram of the electric winding exchanger system 3002 with controlled switches 3102, in accordance with some embodiments. Further, the electric winding exchanger system 3002 may include an analog circuit 3104, a processor 3106, a PMU 3108, 3.5/5 VDC bus 3110, a CAN+ISOLATION circuit 3112. Further, the analog circuit 3104 may be coupled with the controlled switches 3102 for transmitting a command signal and receiving a report signal. Further, the controlled switches 3102 may be coupled with the power inverter 3010 and the electric motor 3014 for transmitting and receiving high voltage power. Further, the analog circuit 3104 may be coupled with the power inverter 3010 for transmitting a state report and receiving a command. Further, the PMU 3108 may be coupled with the power inverter 3010 and the HV DC battery 3012. Further, the analog circuit 3104 may be coupled with the processor 3106. Further, the 3.5/5 VDC bus 3110 may be coupled with the PMU 3108 and the processor 3106. Further, the CAN+ISOLATION circuit 3112 may be coupled with the processor 3106. Further, the CAN+ISOLATION circuit 3112 may be coupled with the VCU 3008 for transmitting and receiving a state report and a command.

Figure 32:
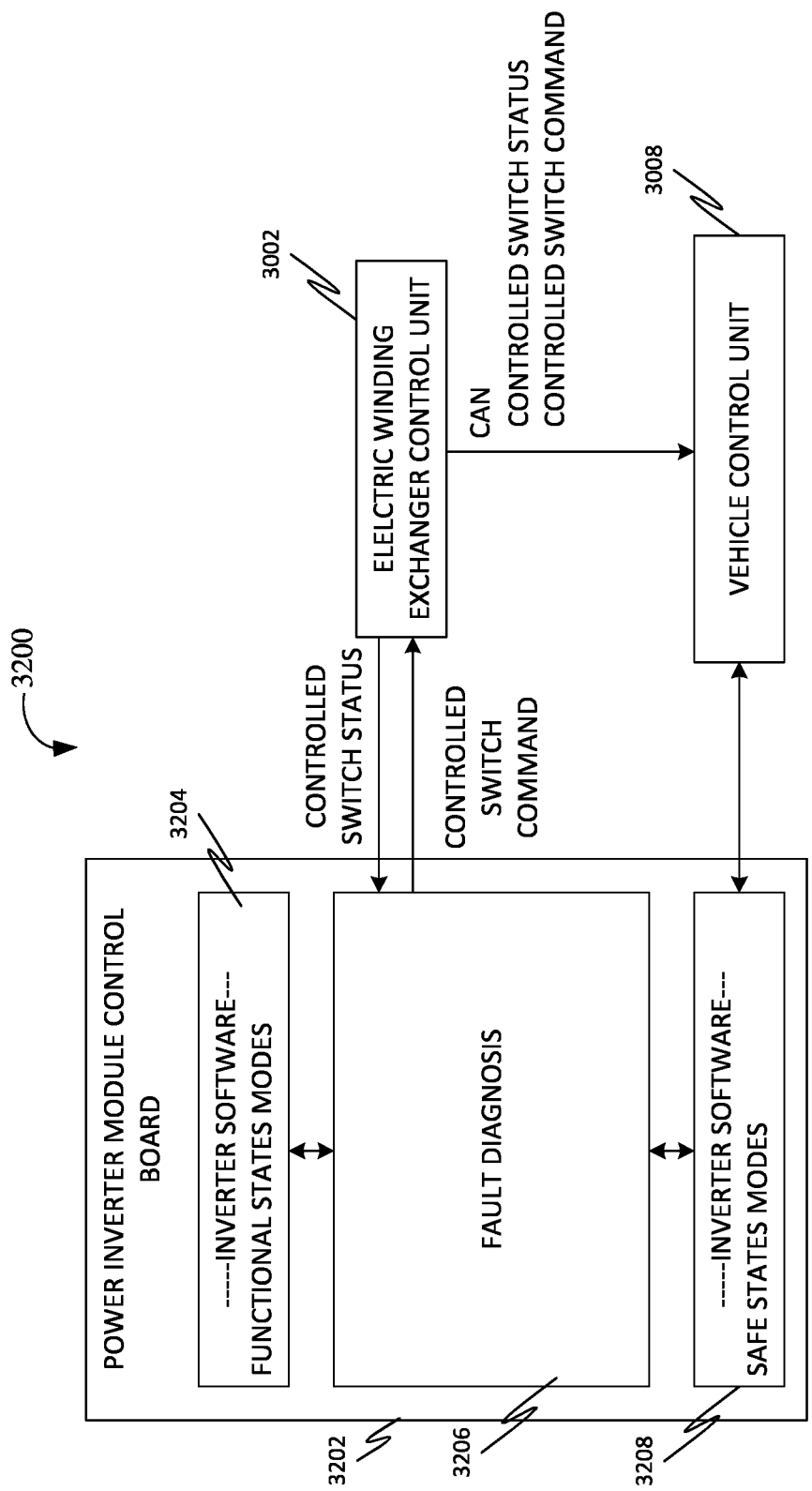
FIG. 32 is a block diagram of a software unit for commanding the controlled switches associated with the electric vehicle system and the electric winding exchanger system, in accordance with some embodiments.

FIG. 32 is a block diagram of a software unit 3200 for commanding the controlled switches 3102 associated with the electric vehicle system 3000 and the electric winding exchanger system 3002, in accordance with some embodiments. Further, the software unit 3200 may include a power inverter module control board 3202 comprising an inverter software of functional states modes 3204, a fault diagnosis 3206, and an inverter software of safe states mode 3208. Further, the inverter software of functional states modes 3204 and the inverter software of safe states mode 3208 communicate with the fault diagnosis 3206. Further, the fault diagnosis 3206 may be configured for receiving a controlled switch status and transmitting a controlled switch command to the electric winding exchanger system 3002. Further, the electric winding exchanger system 3002 communicates the controlled switch states and the controlled switch command with the VCU 3008. Further, the VUC 3008 may be coupled with the power inverter module control board 3202.

Figure 33:
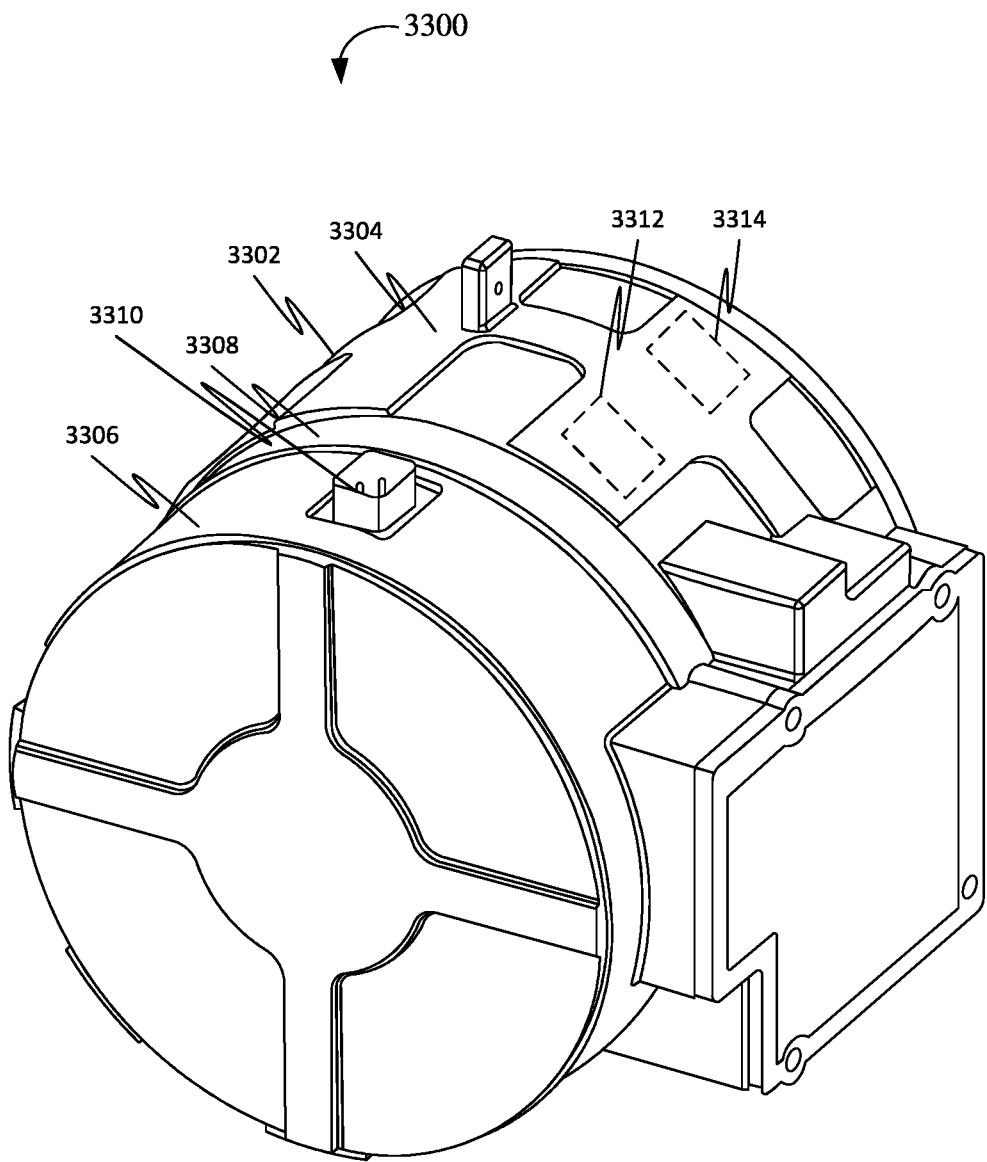
FIG. 33 is a top perspective view of an integrated assembly of an electric winding exchanger system and a multiphase electric motor, in accordance with some embodiments.

FIG. 33 is a top perspective view of an integrated assembly 3300 of an electric winding exchanger system 3408 and a multiphase electric motor 3406, in accordance with some embodiments. Accordingly, the integrated assembly 3300 may include a housing 3302, the multiphase electric motor 3406, the electric winding exchanger system 3408, and a plurality of sensors 3312-3314.

Further, the housing 3302 may include a first housing portion 3304, a second housing portion 3306, and a partition 3308. Further, the first housing portion 3304 may include a first interior space 3402 and the second housing portion 3306 may include a second interior space 3404. Further, the partition 3308 separates the first interior space 3402 from the second interior space 3404. Further, the first housing portion 3304 may be configured for housing the multiphase electric motor 3406 in the first interior space 3402. Further, the second housing portion 3306 may be configured for housing the electric winding exchanger system 3408 in the second interior space 3404.

Further, the multiphase electric motor 3406 may include N number of neutrals.

Further, the electric winding exchanger system 3408 may include a back electromotive force (EMF) boosting circuit 3414. Further, the back EMF boosting circuit 3414 may include a plurality of switches and a plurality of bus bars. Further, a state of each of the plurality of switches may be transitionable between an on state and an off state. Further, the plurality of bus bars may be configured for connecting the plurality of switches. Further, the partition 3308 may include a plurality of openings 3410-3412 for facilitating integrating the multiphase electric motor 3406 with the electric winding exchanger system 3408. Further, a plurality of leads of a plurality of coils of the multiphase electric motor 3406 enters the second interior space 3404 through a first opening of the plurality of openings 3410-3412 for connecting a plurality of terminals of the plurality of leads of the plurality of coils to the plurality of bus bars.

Further, the plurality of sensors 3312-3314 may be disposed in the first interior space 3402. Further, a plurality of leads of the plurality of sensors 3312-3314 enters the second interior space 3404 through a second opening of the plurality of openings 3410-3412 for connecting a plurality of terminals of the plurality of leads to at least one low-voltage terminal 3310 mounted on the second housing portion 3306.

Further, in some embodiments, the plurality of switches may include nine switches. Further, each of the nine switches may include a first terminal and a second terminal. Further, the nine switches may include three sets of switches corresponding to three phases of the multiphase electric motor 3406. Further, each of the three sets of switches may include a first switch, a second switch, and a third switch. Further, in an embodiment, the electric winding exchanger system 3408 further may include three mechanical arms. Further, each of the three mechanical arms may be coupled with each of the three sets of switches. Further, each of the three mechanical arms may be configurable for transitioning the state each of the first switch, the second switch, and the third switch of each of the three sets of switches between the on state and the off state for enabling one or more sequence of states in the nine switches. Further, in an embodiment, the electric winding exchanger system 3408 may include a motorized electromechanical actuator. Further, the motorized electromechanical actuator may be operably coupled with each of the three mechanical arms. Further, the motorized electromechanical actuator may be configured for transitioning at least one of the three mechanical arms between a plurality of arms states. Further, the transitioning of at least one of the three mechanical arms transitions the state of at least one of the first switch, the second switch, and the third switch of at least one of the three sets of switches associated with at least one of the three mechanical arms between the on state and the off state.

Further, in an embodiment, the plurality of bus bars may include ten bus bars. Further, the ten bus bars may include a neutral bus bar and three sets of bus bars corresponding to the three phases. Further, each of the three sets of bus bars may include a first bus bar, a second bus bar, and a third bus bar.

Further, in some embodiment, the first bus bar of each of the three sets of bus bars may be attached to a second terminal of the first switch of each of the three sets of switches and a first terminal of the second switch of each of the three sets of switches. Further, the second bus bar of each of the three sets of bus bars may be attached to a second terminal of the second switch of each of the three sets of switches and a first terminal of the third switch of each of the three sets of switches. Further, the third bus bar of each of the three sets of bus bars may be attached to a second terminal of the third switch of each of the three sets of switches. Further, the neutral bus bar may be attached to a first terminal of the first switch of each of the three sets of switches.

Further, in an embodiment, the plurality of terminals of the plurality of leads may include three sets of terminals. Further, each of the three sets of terminals may include a first terminal, a second terminal, and a third terminal. Further, the first terminal of each of the three sets of terminals may be attached to the first bus bar of each of the three sets of bus bars. Further, the second terminal of each of the three sets of terminals may be attached to the second bus bar of each of the three sets of bus bars. Further, the third terminal of each of the three sets of terminals may be attached to the third bus bar of each of the three sets of bus bars.

Further, in an embodiment, the second housing portion 3306 may include at least one housing opening leading into the second interior space 3404. Further, a plurality of leads of a three phase electric motor controller disposed exterior to the housing 3302 enters the second interior space 3404 through the at least one housing opening for connecting a plurality of terminals of the plurality of leads of the three phase electric motor controller to the back EMF boosting circuit 3414. Further, the plurality of terminals may include three terminals. Further, each of the three terminals may be attached to the third bus bar of each of the three sets of bus bars.

Figure 34:
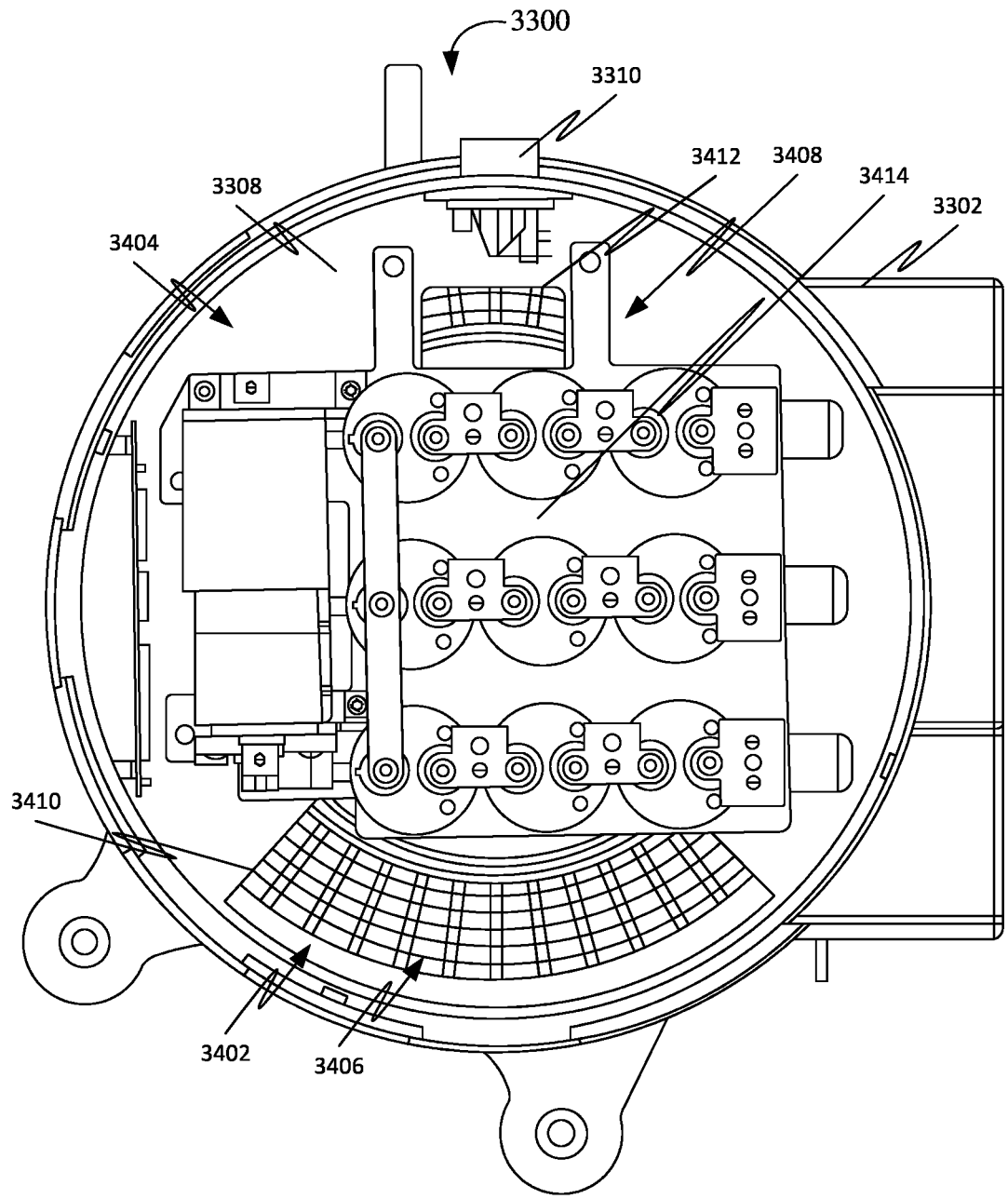
FIG. 34 is a front cross-sectional view of the integrated assembly, in accordance with some embodiments.

FIG. 34 is a front cross-sectional view of the integrated assembly 3300, in accordance with some embodiments.

Figure 35:
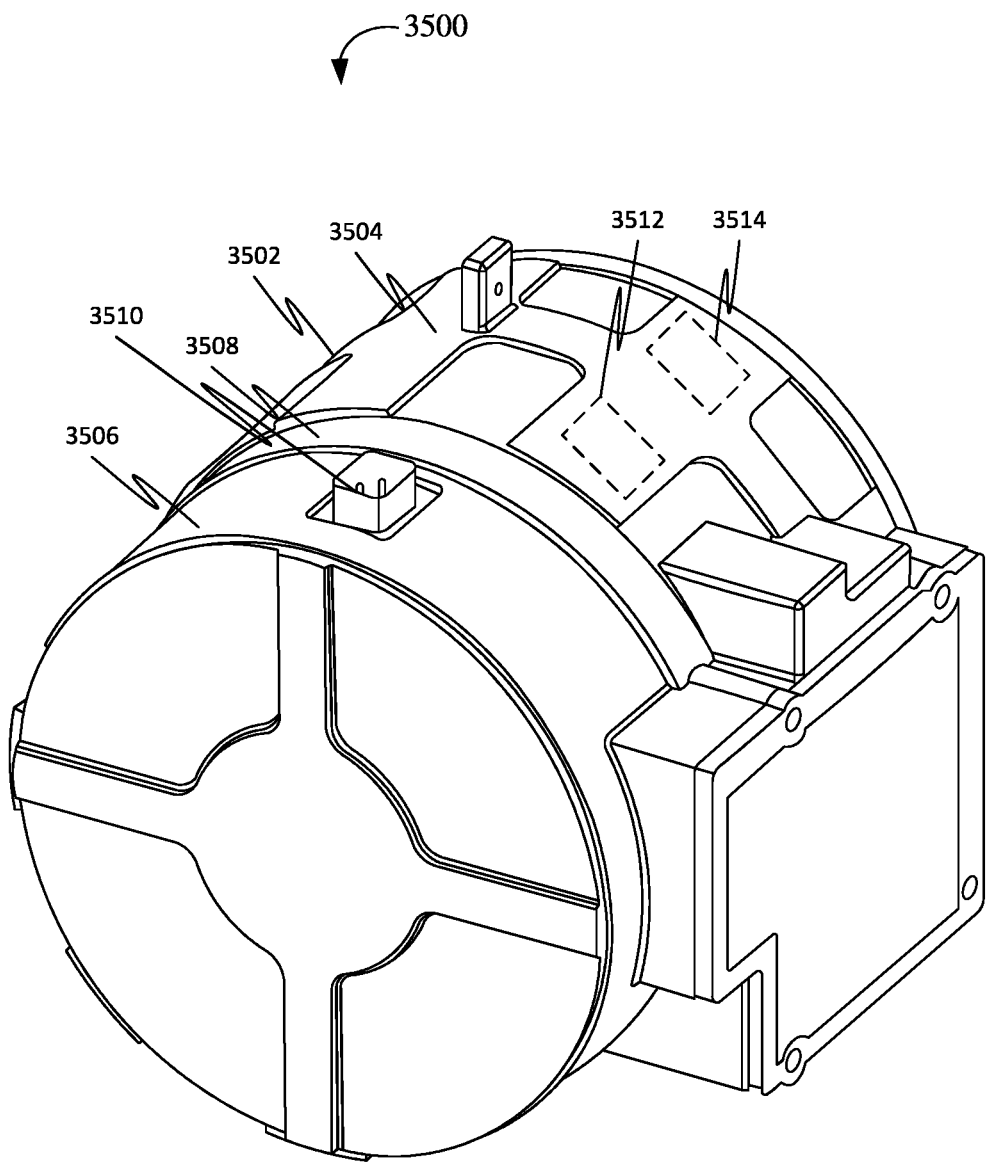
FIG. 35 is a top perspective view of an integrated assembly of an electric winding exchanger system and a multiphase electric motor, in accordance with some embodiments.

FIG. 35 is a top perspective view of an integrated assembly 3500 of an electric winding exchanger system 3608 and a multiphase electric motor 3606, in accordance with some embodiments. Accordingly, the integrated assembly 3500 may include a housing 3502, the multiphase electric motor 3606, the electric winding exchanger system 3608, and a plurality of sensors 3512-3514.

Further, the housing 3502 may include a first housing portion 3504, a second housing portion 3506, and a partition 3508. Further, the first housing portion 3504 may include a first interior space 3602 and the second housing portion 3506 may include a second interior space 3604. Further, the partition 3508 separates the first interior space 3602 from the second interior space 3604. Further, the first housing portion 3504 may be configured for housing the multiphase electric motor 3606 in the first interior space 3602. Further, the second housing portion 3506 may be configured for housing the electric winding exchanger system 3608 in the second interior space 3604.

Further, the multiphase electric motor 3606 may include N number of neutrals.

Further, the electric winding exchanger system 3608 may include a back electromotive force (EMF) boosting circuit 3614. Further, the back EMF boosting circuit 3614 may include a plurality of switches and a plurality of bus bars. Further, a state of each of the plurality of switches may be transitionable between an on state and an off state. Further, the plurality of bus bars may be configured for connecting the plurality of switches. Further, the partition 3508 may include a plurality of openings 3610-3612 for facilitating integrating the multiphase electric motor 3606 with the electric winding exchanger system 3608. Further, a plurality of leads of a plurality of coils of the multiphase electric motor 3606 enters the second interior space 3604 through a first opening of the plurality of openings 3610-3612 for connecting a plurality of terminals of the plurality of leads of the plurality of coils to the plurality of bus bars. Further, the second housing portion 3506 may include at least one housing opening leading into the second interior space 3604. Further, a plurality of leads of a three phase electric motor controller disposed exterior to the housing 3502 enters the second interior space 3604 through the at least one housing opening for connecting a plurality of terminals of the plurality of leads of the three phase electric motor controller to the back EMF boosting circuit 3614. Further, the plurality of terminals may include three terminals. Further, each of the three terminals may be attached to the third bus bar of each of the three sets of bus bars.

Further, the plurality of sensors 3512-3514 may be disposed in the first interior space 3602. Further, a plurality of leads of the plurality of sensors 3512-3514 enters the second interior space 3604 through a second opening of the plurality of openings 3610-3612 for connecting a plurality of terminals of the plurality of leads to at least one low-voltage terminal 3510 mounted on the second housing portion 3506.

Figure 36:
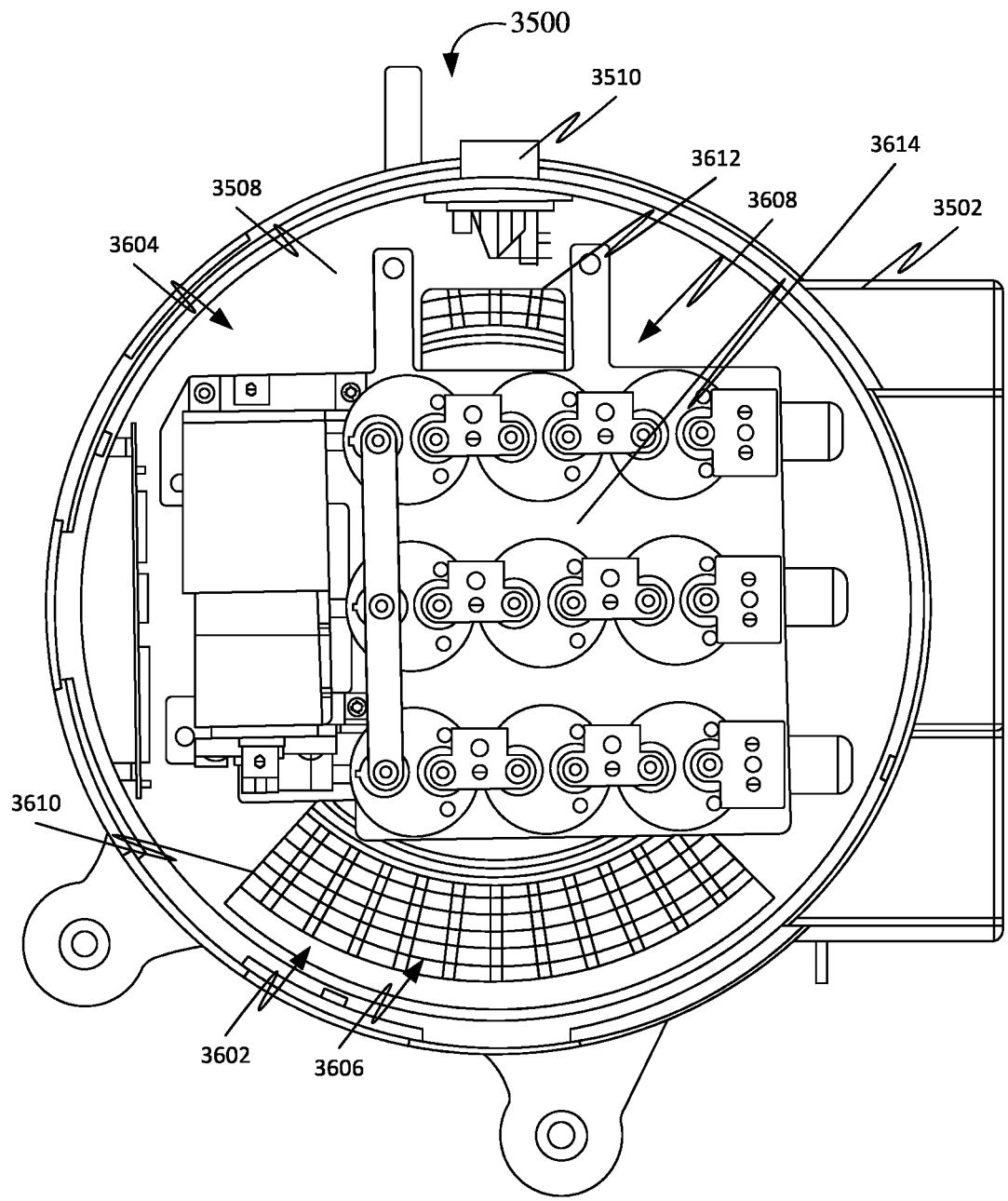
FIG. 36 is a front cross-sectional view of the integrated assembly, in accordance with some embodiments.

FIG. 36 is a front cross-sectional view of the integrated assembly 3500, in accordance with some embodiments.

According to some aspects, an electric winding exchanger system is disclosed. Further, the electric winding exchanger system may include an electronic control unit, a back electromotive force (EMF) boosting circuit, a plurality of high-voltage terminals, an electric motor, and a motor control unit. Further, the electric motor comprises a plurality of winding sets. Further, each of the plurality of winding sets comprises a plurality of coils and a neutral point. Further, the motor control unit may be electronically connected to the electronic control unit. Further, the electronic control unit may be electronically connected to the back EMF boosting circuit. Further, the electric motor may be configured to operate through a plurality of electrical phases. Further, each of the plurality of electrical phases is associated to a corresponding high-voltage terminal from the plurality of high-voltage terminals and a corresponding coil from the plurality of coils. Further, the neutral point may be selectively and electrically connected to each of the plurality of coils. Further, the corresponding coil may be selectively and electrically connected to the back EMF boosting circuit by the corresponding high-voltage terminal. Further, the corresponding coil for an arbitrary winding set may be selectively and electrically connected to the corresponding coil for another winding set. Further, the arbitrary winding set and the other winding set are from the plurality of winding sets.

Further, in some aspects, the electric winding exchanger system may include a plurality of first switches. Further, the neutral point may be electrically connected to the corresponding coil by a corresponding first switch from the plurality of first switches. Further, the back EMF boosting circuit may be electronically connected to each of the plurality of first switches.

Further, in an aspect, the back EMF boosting circuit comprises a plurality of first switch-controlling modules. Further, the electronic control unit may be electronically connected to each of the plurality of first switch-controlling modules. Further, each of the plurality of first switch-controlling modules may be electronically connected to a corresponding first switch from the plurality of first switches.

Further, in some aspects, the electric winding exchanger system may include a plurality of second switches. Further, the corresponding coil may be electrically connected to the corresponding high-voltage terminal by a corresponding second switch from the plurality of second switches. Further, the back EMF boosting circuit may be electronically connected to each of the plurality of first switches.

Further, in an aspect, the back EMF boosting circuit may include a plurality of second switch-controlling modules. Further, the electronic control unit may be electronically connected to each of the plurality of second switch-controlling modules. Further, each of the plurality of second switch-controlling modules may be electronically connected to a corresponding second switch from the plurality of second switches.

Further, in some aspects, the electric winding exchanger system may include a plurality of third switches. Further, the corresponding coil for the arbitrary winding set may be electrically connected to the corresponding coil for the other winding set by a corresponding third switch from the plurality of third switches. Further, the back EMF boosting circuit may be electronically connected to each of the plurality of third switches.

Further, in an aspect, the back EMF boosting circuit may include a plurality of third switch-controlling modules. Further, the electronic control unit may be electronically connected to each of the plurality of third switch-controlling modules. Further, each of the plurality of third switch-controlling modules may be electronically connected to a corresponding third switch from the plurality of third switches.

Further, in an aspect, the electric motor may be in a normal state. Further, the neutral point for the arbitrary winding set may be electrically connected to each of the plurality of coils for the arbitrary winding set. Further, the neutral point for the other winding set may be electrically connected to each of the plurality of coils for the other winding set. Further, the corresponding coil for the arbitrary winding set and the corresponding coil for the other winding set may be electrically connected in parallel with the corresponding high-voltage terminal.

Further, in an aspect, the electric motor may be in a high-torque state. Further, the neutral point for the arbitrary winding set may be electrically connected to each of the plurality of coils for the arbitrary winding set. Further, the neutral point for the other winding set may be electrically disconnected to each of the plurality of coils for the other winding set. Further, the corresponding coil for the arbitrary winding set and the corresponding coil for the other winding set may be electrically connected in series with the corresponding high-voltage terminal.

Further, in an aspect, the electric motor may be in a transient state. Further, the neutral point for the arbitrary winding set may be electrically connected to each of the plurality of coils for the arbitrary winding set. Further, the neutral point for the other winding set may be electrically disconnected to each of the plurality of coils for the other winding set. Further, the corresponding coil for the arbitrary winding set and the corresponding coil for the other winding set may be electrically connected in parallel with the corresponding high-voltage terminal.

Further, in an aspect, the electric motor may be in a disconnected state. Further, the neutral point for the arbitrary winding set may be electrically connected to each of the plurality of coils for the arbitrary winding set. Further, the neutral point for the other winding set may be electrically disconnected to each of the plurality of coils for the other winding set. Further, the corresponding coil for the arbitrary winding set may be electrically disconnected with the corresponding high-voltage terminal. Further, the corresponding coil for the other winding set may be electrically connected with the corresponding high-voltage terminal.

Further, in some aspects, the electric winding exchanger system may include a housing and at least one low-voltage terminal. Further, the electric motor and the motor control unit may be externally positioned to the housing. Further, the at least one low-voltage terminal and the plurality of high-voltage terminals may be mounted into the housing. Further, the electronic control unit and the back EMF boosting circuit may be mounted within the housing. Further, the at least one low-voltage terminal may be positioned offset from the plurality of high-voltage terminals about the housing. Further, the motor control unit may be electronically connected to the electronic control unit by the at least one low-voltage terminal.

Further, in an aspect, the housing may be externally mounted to the electric motor. Further, a central axis of the housing may be positioned collinear to a rotation axis of the electric motor.

Further, in some aspects, the electric winding exchanger system may include at least one low-voltage wire. Further, the at least low-voltage terminal may be electronically connected to the motor control unit by the at least one low-voltage wire.

Further, in some aspects, the electric winding exchanger system may include a plurality of high-voltage wires. Further, each of the plurality of electrical phases is associated to a corresponding high-voltage wire from the plurality of high-voltage wires. Further, the corresponding high-voltage terminal may be electrically connected to the back EMF boosting circuit by the corresponding high-voltage wire.

Although the present disclosure has been explained in relation to its preferred embodiment, it is to be understood that many other possible modifications and variations can be made without departing from the spirit and scope of the disclosure.

What is claimed is:

1. An integrated assembly of an electric winding exchanger system and a multiphase electric motor, the integrated assembly comprising:
    a housing comprising a first housing portion, a second housing portion, and a partition;
    the first housing portion comprises a first interior space;
    the second housing portion comprises a second interior space;
    the partition separates the first interior space from the second interior space;
    the first housing portion is configured for housing the multiphase electric motor in the first interior space;
    the second housing portion is configured for housing the electric winding exchanger system in the second interior space;
    the multiphase electric motor comprising a predefined number of neutrals; and
    the electric winding exchanger system comprising a back electromotive force (EMF) boosting circuit;
    the back EMF boosting circuit comprises a plurality of switches and a plurality of bus bars;
    a state of each of the plurality of switches is transitionable between an on state and an off state;
    the plurality of bus bars is configured for connecting the plurality of switches;
    the partition comprises a plurality of openings for facilitating integrating the multiphase electric motor with the electric winding exchanger system; and
    a plurality of leads of a plurality of coils of the multiphase electric motor enters the second interior space through a first opening of the plurality of openings for connecting a plurality of terminals of the plurality of leads of the plurality of coils to the plurality of bus bars.

2. The integrated assembly of claim 1 further comprising:
    a plurality of sensors disposed in the first interior space; and
    a plurality of leads of the plurality of sensors enters the second interior space through a second opening of the plurality of openings for connecting a plurality of terminals of the plurality of leads to at least one low-voltage terminal mounted on the second housing portion.

3. The integrated assembly of claim 1 further comprising:
    the plurality of switches comprises nine switches;
    each of the nine switches comprises a first terminal and a second terminal;
    the nine switches comprise three sets of switches corresponding to three phases of the multiphase electric motor; and
    each of the three sets of switches comprises a first switch, a second switch, and a third switch.

4. The integrated assembly of claim 3 further comprising:
    the electric winding exchanger system further comprises three mechanical arms;
    each of the three mechanical arms is coupled with each of the three sets of switches; and
    each of the three mechanical arms is configurable for transitioning the state each of the first switch, the second switch, and the third switch of each of the three sets of switches between the on state and the off state for enabling one or more sequence of states in the nine switches.

5. The integrated assembly of claim 4 further comprises:
the electric winding exchanger system comprises a motorized electromechanical actuator;
the motorized electromechanical actuator is operably coupled with each of the three mechanical arms;
the motorized electromechanical actuator is configured for transitioning at least one of the three mechanical arms between a plurality of arms states; and
the transitioning of at least one of the three mechanical arms transitions the state of at least one of the first switch, the second switch, and the third switch of at least one of the three sets of switches associated with at least one of the three mechanical arms between the on state and the off state.

6. The integrated assembly of claim 3 further comprises:
the plurality of bus bars comprises ten bus bars;
the ten bus bars comprise a neutral bus bar and three sets of bus bars corresponding to the three phases; and
each of the three sets of bus bars comprises a first bus bar, a second bus bar, and a third bus bar.

7. The integrated assembly of claim 6 further comprises:
the first bus bar of each of the three sets of bus bars is attached to a second terminal of the first switch of each of the three sets of switches and a first terminal of the second switch of each of the three sets of switches;
the second bus bar of each of the three sets of bus bars is attached to a second terminal of the second switch of each of the three sets of switches and a first terminal of the third switch of each of the three sets of switches;
the third bus bar of each of the three sets of bus bars is attached to a second terminal of the third switch of each of the three sets of switches; and
the neutral bus bar is attached to a first terminal of the first switch of each of the three sets of switches.

8. The integrated assembly of claim 6 further comprises:
the plurality of terminals of the plurality of leads comprises three sets of terminals;
each of the three sets of terminals comprises a first terminal, a second terminal, and a third terminal;
the first terminal of each of the three sets of terminals is attached to the first bus bar of each of the three sets of bus bars;
the second terminal of each of the three sets of terminals is attached to the second bus bar of each of the three sets of bus bars; and
the third terminal of each of the three sets of terminals is attached to the third bus bar of each of the three sets of bus bars.

9. The integrated assembly of claim 6 further comprises:
the second housing portion comprises at least one housing opening leading into the second interior space;
a plurality of leads of a three phase electric motor controller disposed exterior to the housing enters the second interior space through the at least one housing opening for connecting a plurality of terminals of the plurality of leads of the three phase electric motor controller to the back EMF boosting circuit;
the plurality of terminals comprises three terminals; and
each of the three terminals is attached to the third bus bar of each of the three sets of bus bars.

10. The integrated assembly of claim 1, wherein the plurality of coils are connected in parallel forming a plurality of parallel coil paths.

11. The integrated assembly of claim 1, wherein the plurality of coils are connected in series forming a plurality of series coil paths.

12. An integrated assembly of an electric winding exchanger system and a multiphase electric motor, the integrated assembly comprising:
a housing comprising a first housing portion, a second housing portion, and a partition;
the first housing portion comprises a first interior space and the second housing portion comprises a second interior space;
the partition separates the first interior space from the second interior space;
the first housing portion is configured for housing the multiphase electric motor in the first interior space;
the second housing portion is configured for housing the electric winding exchanger system in the second interior space;
the multiphase electric motor comprising a predefined number of neutrals;
the electric winding exchanger system comprising a back electromotive force (EMF) boosting circuit;
the back EMF boosting circuit comprises a plurality of switches and a plurality of bus bars;
a state of each of the plurality of switches is transitionable between an on state and an off state;
the plurality of bus bars is configured for connecting the plurality of switches;
the partition comprises a plurality of openings for facilitating integrating the multiphase electric motor with the electric winding exchanger system;
a plurality of leads of a plurality of coils of the multiphase electric motor enters the second interior space through a first opening of the plurality of openings for connecting a plurality of terminals of the plurality of leads of the plurality of coils to the plurality of bus bars;
a plurality of sensors disposed in the first interior space; and
a plurality of leads of the plurality of sensors enters the second interior space through a second opening of the plurality of openings for connecting a plurality of terminals of the plurality of leads to at least one low-voltage terminal mounted on the second housing portion.

13. The integrated assembly of claim 12 further comprises:
the plurality of switches comprises nine switches;
each of the nine switches comprises a first terminal and a second terminal;
the nine switches comprise three sets of switches corresponding to three phases of the multiphase electric motor; and
each of the three sets of switches comprises a first switch, a second switch, and a third switch.

14. The integrated assembly of claim 13 further comprises:
the electric winding exchanger system further comprises three mechanical arms;
each of the three mechanical arms is coupled with each of the three sets of switches; and
each of the three mechanical arms is configurable for transitioning the state of each of the first switch, the second switch, and the third switch of each of the three sets of switches between the on state and the off state for enabling one or more sequence of states in the nine switches.

15. The integrated assembly of claim 14 further comprises:
the electric winding exchanger system comprises a motorized electromechanical actuator;
the motorized electromechanical actuator is operably coupled with each of the three mechanical arms;
the motorized electromechanical actuator is configured for transitioning at least one of the three mechanical arms between a plurality of arms states; and
the transitioning of at least one of the three mechanical arms transitions the state of at least one of the first switch, the second switch, and the third switch of at least one of the three sets of switches associated with at least one of the three mechanical arms between the on state and the off state.

16. The integrated assembly of claim 13 further comprises:
the plurality of bus bars comprises ten bus bars;
the ten bus bars comprise a neutral bus bar and three sets of bus bars corresponding to the three phases; and
each of the three sets of bus bars comprises a first bus bar, a second bus bar, and a third bus bar.

17. The integrated assembly of claim 16 further comprises:
the first bus bar of each of the three sets of bus bars is attached to a second terminal of the first switch of each of the three sets of switches and a first terminal of the second switch of each of the three sets of switches;
the second bus bar of each of the three sets of bus bars is attached to a second terminal of the second switch of each of the three sets of switches and a first terminal of the third switch of each of the three sets of switches;
the third bus bar of each of the three sets of bus bars is attached to a second terminal of the third switch of each of the three sets of switches; and
the neutral bus bar is attached to a first terminal of the first switch of each of the three sets of switches.

18. The integrated assembly of claim 16 further comprises:
the plurality of terminals of the plurality of leads comprises three sets of terminals;
each of the three sets of terminals comprises a first terminal, a second terminal, and a third terminal;
the first terminal of each of the three sets of terminals is attached to the first bus bar of each of the three sets of bus bars;
the second terminal of each of the three sets of terminals is attached to the second bus bar of each of the three sets of bus bars; and
the third terminal of each of the three sets of terminals is attached to the third bus bar of each of the three sets of bus bars.

19. The integrated assembly of claim 16 further comprises:
the second housing portion comprises at least one housing opening leading into the second interior space;
a plurality of leads of a three phase electric motor controller disposed exterior to the housing enters the second interior space through the at least one housing opening for connecting a plurality of terminals of the plurality of leads of the three phase electric motor controller to the back EMF boosting circuit; and
the plurality of terminals comprises three terminals, wherein each of the three terminals is attached to the third bus bar of each of the three sets of bus bars.

20. An integrated assembly of an electric winding exchanger system and a multiphase electric motor, the integrated assembly comprising:
a housing comprising a first housing portion, a second housing portion, and a partition;
the first housing portion comprises a first interior space and the second housing portion comprises a second interior space;
the partition separates the first interior space from the second interior space;
the first housing portion is configured for housing the multiphase electric motor in the first interior space;
the second housing portion is configured for housing the electric winding exchanger system in the second interior space;
a multiphase electric motor comprising a predefined number of neutrals;
the electric winding exchanger system comprising a back electromotive force (EMF) boosting circuit;
the back EMF boosting circuit comprises a plurality of switches and a plurality of bus bars;
a state of each of the plurality of switches is transitionable between an on state and an off state;
the plurality of bus bars is configured for connecting the plurality of switches;
the partition comprises a plurality of openings for facilitating integrating the multiphase electric motor with the electric winding exchanger system;
a plurality of leads of a plurality of coils of the multiphase electric motor enters the second interior space through a first opening of the plurality of openings for connecting a plurality of terminals of the plurality of leads of the plurality of coils to the plurality of bus bars;
the second housing portion comprises at least one housing opening leading into the second interior space;
a plurality of leads of a three phase electric motor controller disposed exterior to the housing enters the second interior space through the at least one housing opening for connecting a plurality of terminals of the plurality of leads of the three phase electric motor controller to the back EMF boosting circuit;
the plurality of terminals comprises three terminals;
each of the three terminals is attached to the third bus bar of each of the three sets of bus bars;
a plurality of sensors disposed in the first interior space; and
a plurality of leads of the plurality of sensors enters the second interior space through a second opening of the plurality of openings for connecting a plurality of terminals of the plurality of leads to at least one low-voltage terminal mounted on the second housing portion.

* * * * *